(12) United States Patent
Wohlert et al.

(10) Patent No.: US 10,477,016 B2
(45) Date of Patent: *Nov. 12, 2019

(54) COMMUNICATION ROUTING BASED ON PRESENCE IN A CONFINED WIRELESS ENVIRONMENT

(71) Applicant: AT&T Intellectual Property I, L.P., Atlanta, GA (US)

(72) Inventors: Randolph Wohlert, Austin, TX (US); Steven Frew, Round Rock, TX (US); Milap Majmundar, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/200,355

(22) Filed: Jul. 1, 2016

(65) Prior Publication Data
US 2016/0316055 A1    Oct. 27, 2016

Related U.S. Application Data

(63) Continuation of application No. 12/756,481, filed on Apr. 8, 2010, now Pat. No. 9,413,836.

(51) Int. Cl.
*H04M 3/42* (2006.01)
*H04W 4/029* (2018.01)
(Continued)

(52) U.S. Cl.
CPC ........ *H04M 3/42263* (2013.01); *H04L 67/26* (2013.01); *H04M 3/42374* (2013.01);
(Continued)

(58) Field of Classification Search
CPC ........... H04M 3/42263; H04M 7/1235; H04M 3/42374; H04W 40/20; H04W 4/16;
(Continued)

(56) References Cited

U.S. PATENT DOCUMENTS

| | | |
|---|---|---|
| 5,235,633 A | 8/1993 | Dennison et al. |
| 6,038,451 A | 3/2000 | Syed et al. |

(Continued)

FOREIGN PATENT DOCUMENTS

| | | |
|---|---|---|
| WO | 2004031488 | 4/2004 |
| WO | 2008123835 | 10/2008 |

OTHER PUBLICATIONS

Office Action dated Jun. 4, 2013 for U.S. Appl. No. 12/756,473, 19 pages.

(Continued)

*Primary Examiner* — Jackie Zuniga Abad
*Assistant Examiner* — Justin T Van Roie
(74) *Attorney, Agent, or Firm* — Amin, Turocy & Watson, LLP

(57) ABSTRACT

An incoming communication (e.g., a voice call, a data call) can be routed to a wireless devices or a wireline device, based in part on a routing preference and a presence condition of a mobile device in a confined wireless environment served by a confined-coverage access point (AP). The routing preference can be subscriber-specific and configurable by the subscriber linked to the mobile device, whereas the presence condition reveals whether the mobile device is attached to the confined-coverage AP and is automatically detected. A routing server acquires the routing preference and the presence condition for the mobile device. Based on routing logic applied to the routing preference and the presence information, the routing server directs the incoming communication to a set of wireline devices, a set of wireless devices, or a combination thereof.

20 Claims, 27 Drawing Sheets

(51) Int. Cl.
  *H04W 4/16* (2009.01)
  *H04L 29/08* (2006.01)
  *H04M 7/12* (2006.01)
  *H04W 40/20* (2009.01)
  *H04W 84/04* (2009.01)
  *H04W 76/10* (2018.01)

(52) U.S. Cl.
  CPC ......... *H04M 7/1235* (2013.01); *H04W 4/029* (2018.02); *H04W 4/16* (2013.01); *H04W 40/20* (2013.01); *H04W 76/10* (2018.02); *H04W 84/045* (2013.01)

(58) Field of Classification Search
  CPC ..... H04W 84/045; H04W 76/02; H04W 4/02; H04L 67/26
  See application file for complete search history.

(56) References Cited

U.S. PATENT DOCUMENTS

| | | |
|---|---|---|
| 6,320,534 B1 | 11/2001 | Goss |
| 6,324,404 B1 | 11/2001 | Dennison et al. |
| 6,870,851 B1 | 3/2005 | Leinwand et al. |
| 7,139,587 B2 | 11/2006 | Ishii |
| 7,162,237 B1 | 1/2007 | Silver et al. |
| 7,171,216 B1 | 1/2007 | Choksi |
| 7,177,632 B1 | 2/2007 | Ringen et al. |
| 7,196,630 B2 | 3/2007 | Baker |
| 7,245,913 B1 | 7/2007 | Nguyen et al. |
| 7,336,945 B2 | 2/2008 | Ringen et al. |
| 7,653,191 B1 | 1/2010 | Glasser et al. |
| 7,822,188 B1 | 10/2010 | Kirchhoff et al. |
| 7,894,807 B1 | 2/2011 | Drennan |
| 8,068,854 B2 | 11/2011 | Contractor |
| 8,219,080 B2 | 7/2012 | Sokondar |
| 8,223,941 B2 | 7/2012 | White et al. |
| 8,229,431 B2 | 7/2012 | Buckley et al. |
| 8,265,239 B2 | 9/2012 | Narayan et al. |
| 8,443,063 B1 | 5/2013 | Nelson et al. |
| 8,526,977 B2 | 9/2013 | Pearson et al. |
| 8,787,917 B1 | 7/2014 | Barrett et al. |
| 8,792,419 B2 | 7/2014 | Wohlert et al. |
| 8,976,952 B2 | 3/2015 | Lyman |
| 9,338,637 B2 | 5/2016 | Reuhkala et al. |
| 9,413,836 B2* | 8/2016 | Wohlert .................. H04W 4/16 |
| 2001/0023446 A1 | 9/2001 | Balogh |
| 2002/0089985 A1 | 7/2002 | Wahl et al. |
| 2002/0164979 A1 | 11/2002 | Mooney et al. |
| 2002/0193107 A1* | 12/2002 | Nascimento, Jr. ................ H04L 29/06027 455/423 |
| 2003/0148774 A1 | 8/2003 | Naghian et al. |
| 2004/0192306 A1 | 9/2004 | Elkarat et al. |
| 2005/0101323 A1 | 5/2005 | De Beer |
| 2005/0159184 A1 | 7/2005 | Kerner et al. |
| 2006/0068786 A1 | 3/2006 | Florence |
| 2006/0121916 A1 | 6/2006 | Abom et al. |
| 2006/0217153 A1 | 9/2006 | Coles et al. |
| 2007/0019670 A1 | 1/2007 | Falardeau |
| 2007/0032225 A1 | 2/2007 | Konicek et al. |
| 2007/0147391 A1 | 6/2007 | Wilhoite et al. |
| 2007/0201428 A1 | 8/2007 | Morita et al. |
| 2008/0292074 A1 | 11/2008 | Boni et al. |
| 2008/0299954 A1 | 12/2008 | Wright et al. |
| 2009/0059814 A1 | 3/2009 | Nixon et al. |
| 2009/0094680 A1 | 4/2009 | Gupta et al. |
| 2010/0029272 A1 | 2/2010 | McCann et al. |
| 2010/0208663 A1 | 8/2010 | Hirano et al. |
| 2011/0188496 A1* | 8/2011 | Schaade .................. H04L 12/12 370/352 |

OTHER PUBLICATIONS

Office Action dated Jun. 3, 2013 for U.S. Appl. No. 12/756,481, 38 pages.
Office Action dated Nov. 20, 2013 for U.S. Appl. No. 12/756,481, 39 pages.
Office Action dated Nov. 8, 2013 for U.S. Appl. No. 12/756,473, 19 pages.
Office Action dated Mar. 24, 2014 U.S. Appl. No. 12/756,481, 44 pages.
Notice of Allowance dated Mar. 10, 2014 for U.S. Appl. No. 12/756,473, 27 pages.
Office Action dated Oct. 21, 2014 for U.S. Appl. No. 12/756,481, 48 pages.
Office Action dated Nov. 4, 2015 for U.S. Appl. No. 14/300,105, 22 pages.
Notice of Allowance dated Apr. 4, 2016 for U.S. Appl. No. 12/756,481, 29 pages.
Office Action dated Apr. 21, 2017 for U.S. Appl. No. 15/214,713, 44 pages.
Office Action dated Aug. 1, 2017 for U.S. Appl. No. 15/214,713, 19 pages.
Notice of Allowance dated Dec. 18, 2017 for U.S. Appl. No. 15/214,713, 19 pages.

* cited by examiner

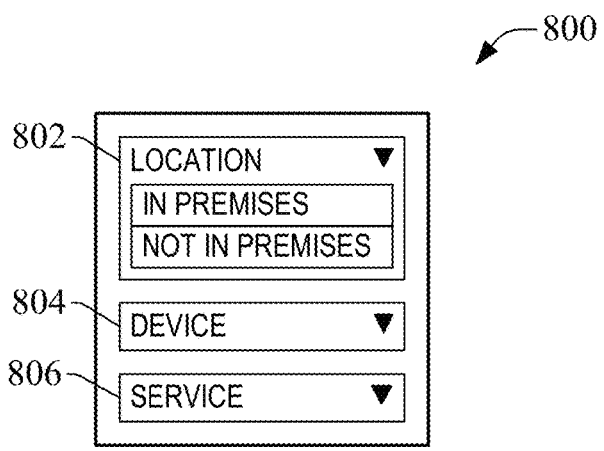
FIG. 8A
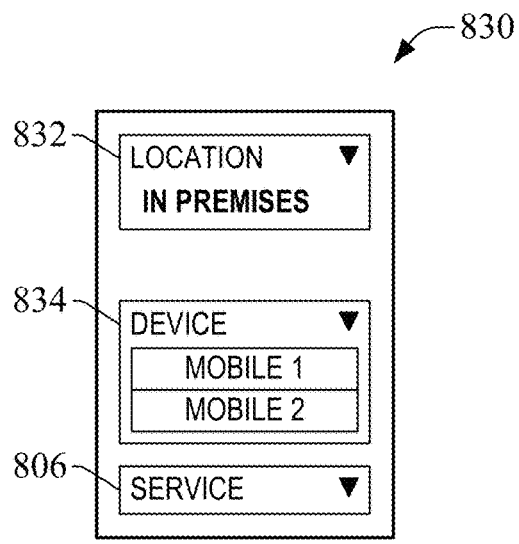 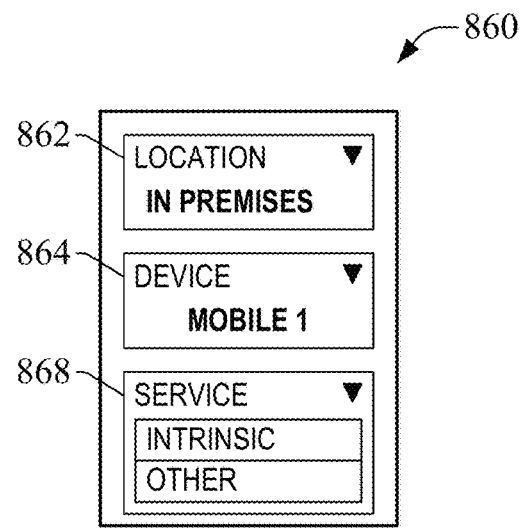
FIG. 8B        FIG. 8C

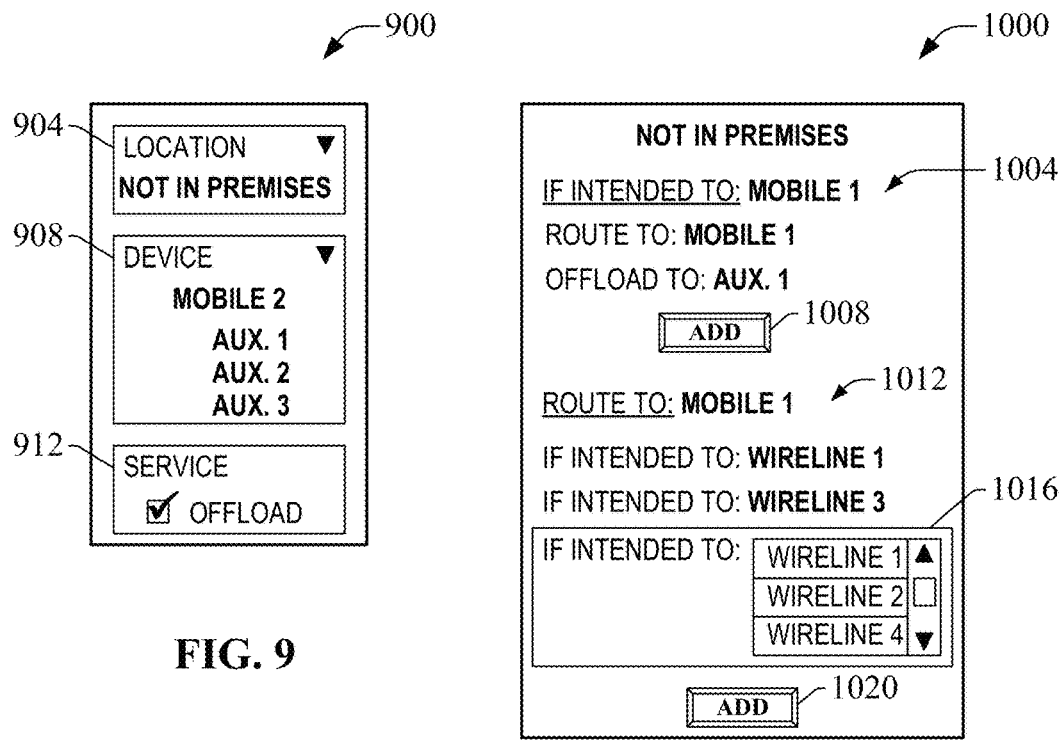
FIG. 9
FIG. 10
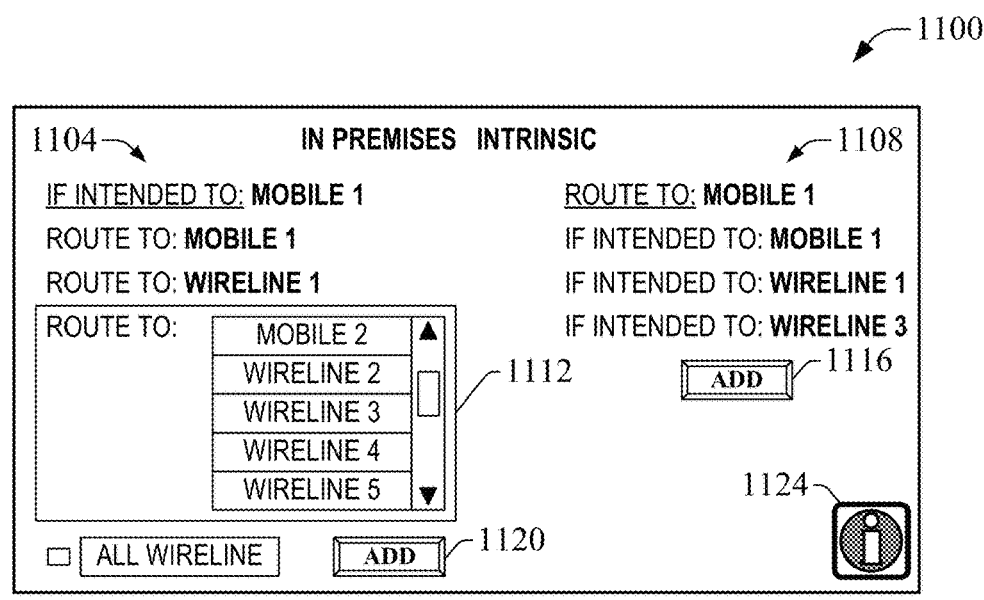
FIG. 11

COMMUNICATION ROUTING BASED ON PRESENCE IN A CONFINED WIRELESS ENVIRONMENT

CROSS-REFERENCE TO RELATED APPLICATION

This application is a continuation of, and claims priority to, U.S. patent application Ser. No. 12/756,481, filed on Apr. 8, 2010, now issued as U.S. Pat. No. 9,413,836, and entitled "COMMUNICATION ROUTING BASED ON PRESENCE IN A CONFINED WIRELESS ENVIRONMENT." The entirety of the foregoing listed application is hereby incorporated by reference herein.

TECHNICAL FIELD

The subject disclosure relates to wireless and wireline communications and, more particularly, to routing of communications amongst wireless and wireline devices based on subscriber preferences and presence information of a mobile device in a confined wireless environment.

BACKGROUND

Wireless communication offers an array of services that allow substantive personalization of mobile devices employed for telecommunication; thus, a significant segment of wireless service subscribers employ their mobile devices as primary point of contact with other parties, even when the mobile devices operate indoors. Available wireline services, such as digital television, internet protocol (IP) television, media on demand, broadband internet access, voice over internet protocol (VoIP) communications, also can provide highly customized services and can satisfy the communication needs of the wireless service subscribers—particularly within the confined environment in which the various devices that provide the wireline services are deployed. Even though a wireless subscriber has access to highly personalized service in both the wireless service domain and the wireline service domain, a calling party to a wireless subscriber generally originates a communication without knowledge of communication mechanism preference (e.g., wireless service or wireline service) of the wireless subscriber. In addition, the calling party typically does not know a current location of the wireless subscriber (at home, at the workplace, in transit in a vehicle, out of wireless service area, etc.), which can dictate election of a specific called device (e.g., cellular telephone, VoIP device) associated with the wireless subscriber. As a result, connectivity amongst the calling party and the wireless subscriber can suffer due to various usage pitfalls, with the ensuing perceived quality of service degradation. For example, the wireless subscriber may not be reached because the wireless subscriber was distanced from his mobile device when an important communication was directed to the mobile device; thus, the important communication can be directed to a voice mail inbox that is accessed at a time the communication has become irrelevant. As another example, the wireless subscriber may not be reached because the calling party directed her call to a wireline telephone in the wireless subscriber's office while the wireless subscriber was outside the office.

While wireline networks can be integrated with network elements that provide wireless services in indoor and outdoor environments, integration of wireless service domain and wireline service domain within indoor environments has been directed primarily to provision of certain control functions of specific devices, and telecommunication enhancement and continuity (e.g., call session preservation during handover from macrocell coverage to femtocell coverage). Generally, network integration has not been exploited to pursue robust connectivity that mitigates common usage pitfalls amongst other wireless service deficiencies that can lead to low perceived quality of service and related subscriber attrition.

SUMMARY

The following presents a simplified summary of the subject disclosure in order to provide a basic understanding of some aspects thereof. This summary is not an extensive overview of the various embodiments of the subject disclosure. It is intended to neither identify key or critical elements of the subject disclosure nor delineate any scope thereof. Its sole purpose is to present some concepts in a simplified form as a prelude to the more detailed description that is presented hereinafter.

One or more embodiments of the subject disclosure provide system(s) and method(s) that enable routing of an incoming communication (e.g., a voice call, a data call) to wireless device(s) or wireline device(s) based in part on at least one routing preference and presence information of a mobile device in a confined wireless environment served by an access point. The spatial boundaries of the confined wireless environment are determined by the coverage range, or radius, of the access point, and thus the confined wireless environment can correspond to a confined coverage area, which can include indoor space, outdoor space, or a combination thereof. The at least one routing preference is specific to a subscriber who owns (or leases) and operates the mobile device, and thus is a personalized routing preference. A routing server retrieves or receives, or otherwise accesses, the at least one routing preference and the presence information for the mobile device. Based on routing logic applied to the at least one routing preference and the presence information, the routing server directs the incoming communication to a set of wireline devices, a set of wireless devices, or a combination thereof.

In an aspect, a customization server manages (e.g., retrieves, receives, generates, modifies, or commits) a set of routing preferences linked to a subscriber that consumes personalized communication routing; the routing preferences in the set are personalized routing preferences. In one or more embodiments, a configuration component that is part of the customization server provides a configuration environment (e.g., a graphical user interface, a user interface . . . ) to collect data that defines, at least in part, a routing preference that is personalized or specific to a subscriber. An interface component can render the configuration environment to receive the data; the interface component conveys the data to the customization component, which can commit the data in routing preference storage, or process (e.g., decode, modify) the data prior to data commitment in the routing preference storage. The configuration component is remote to the customization component and communicates thereto via an interface that can include at least one of wired links, wireless links, or network functional elements. In alternative or additional embodiments, the interface component and the customization component can be integrated in a subscriber device (e.g., a mobile device). Collected data that defines a routing preference is delivered to the customization server for management of at least one routing preference.

In another aspect, a client-server architecture enables generation of presence information of the mobile device based in part on processing of attachment signaling exchanged with a confined-coverage access point; generation can include detection, processing, and reporting of a presence condition of the mobile device. The confined-coverage AP provides wireless service to the confined wireless environment. Based on deployment (e.g., installation, configuration, testing, and acceptance), the client-server architecture can implement various procedures to ascertain a presence condition of the mobile device. The procedures include (a) network-based procedures, wherein a presence client component embodied in a network element executes at least part of the procedures; (b) access-network-based procedures, wherein the presence client component resides in a confined-coverage access point and executes at least part of procedures; and (c) mobile device procedures, wherein the presence client component in the mobile device executes at least part of the procedures. For the various procedures, a presence server in the telecommunication network platform of a wireless service provider supplies, e.g., produces and stores, one or more presence condition records based on attachment notification(s) and related location data; such records can be retained in a memory, and reveal whether a mobile device is attached to a femtocell access point or not.

Aspects, features, or advantages of the subject disclosure are network and radio technology agnostic, and can be exploited in substantially any network and through most any or any wireless communication technology. For example, Wi-Fi (wireless fidelity), Worldwide Interoperability for Microwave Access (WiMAX); IS-95; Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA), or LTE Advanced. Additionally, substantially all or all aspects of the subject disclosure can include legacy telecommunication technologies.

While various aspects, features, or advantages of the subject disclosure are illustrated in reference to femtocell (femto) access point(s), such aspects and features also can be exploited in other types of confined-coverage access points (e.g., home-based access point(s), enterprise-based access point(s)) that provide wireless coverage to a confined wireless environment through substantially any or any disparate telecommunication technologies such as, but not limited to, Wi-Fi or picocell telecommunication.

To the accomplishment of the foregoing and related ends, the subject disclosure, then, comprises the features hereinafter fully described. The following description and the annexed drawings set forth in detail certain illustrative aspects of one or more embodiments of the disclosure. However, these aspects are indicative of but a few of the various ways in which the principles of the subject disclosure may be employed. Other aspects, advantages and novel features of the subject disclosure will become apparent from the following detailed description of various example embodiments of the subject disclosure when considered in conjunction with the drawings.

BRIEF DESCRIPTION OF DRAWINGS

FIGS. 8A-8C illustrate a set of three example user interfaces that can be rendered as part of configuration of a communication routing service(s) in accordance with aspects described herein.

FIGS. 9-11 illustrate example user interfaces that can be rendered as part of configuration of a communication routing service in accordance with aspects described in the subject disclosure.

DETAILED DESCRIPTION

Figure 1:
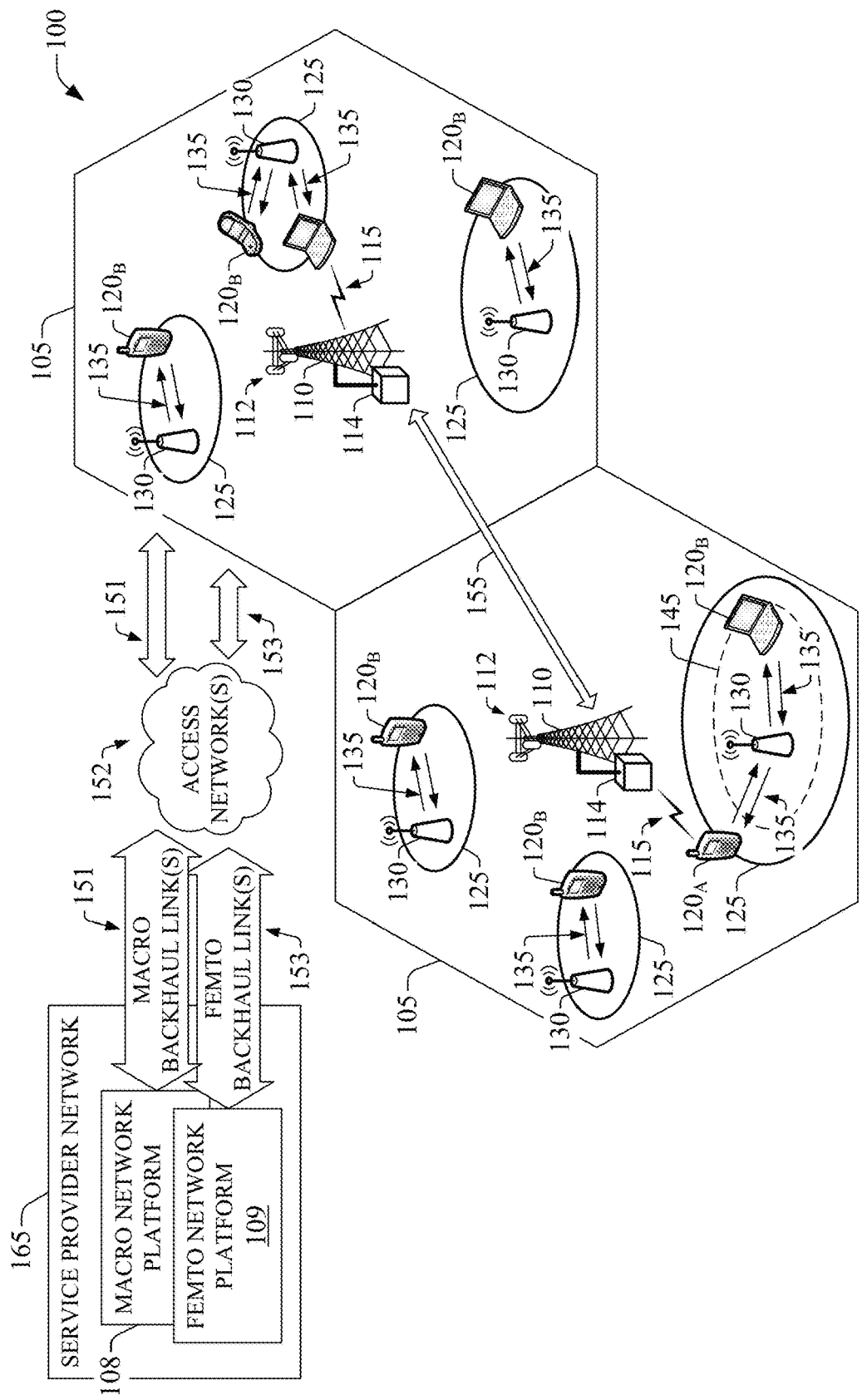
FIG. 1 illustrates a schematic deployment of a macrocells and femtocells for wireless service coverage in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the present disclosure. It may be evident, however, that the present innovation may be practiced without these specific details. In other instances, well-known structures and devices are shown in block diagram form in order to facilitate describing the present disclosure.

As employed in this specification and annexed drawings, the terms "component," "system," "platform," "interface," "node," "driver," "coder," "decoder" "layer," and the like are intended to refer to a computer-related entity or an entity related to an operational apparatus with one or more specific functionalities, wherein the such entities can be either hardware, a combination of hardware and software, software, or software in execution. One or more of such entities are also referred to herein as "functional elements." As an example, a component may be, but is not limited to being, a process running on a processor, a processor, a memory, a code object, an executable code instruction, a thread of execution, a program, and/or a computer. By way of illustration, both an application running on a server and the server can be a component. One or more components may reside within a process and/or thread of execution and a component may be localized on one computer and/or distributed between two or more computers. In addition, these components can execute from various computer readable media having various data structures or code instructions stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, node, driver, coder, decoder, layer, and the like.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP);" "base station," "Node B;" "evolved Node B (eNode B);" "home Node B (HNB)" or "home access point (HAP)," which include femtocell access point, picocell access point, Wi-Fi base station . . . ; and the like, are utilized interchangeably in the subject application, and refer to a wireless network component or apparatus that at least delivers and receives data, control, voice, video, sound, gaming, or substantially any or any data stream or signaling stream. Sources or recipients of such data, control, voice, video, sound, gaming, or substantially any or any data stream or signaling stream can be at least a set of network components such as, but not limited to, user equipment, customer premises equipment, or network servers, controllers, gateways or management components. Data and signaling streams can be packetized or frame-based flows. It is noted that context in the subject specification generally distinguishes amongst a base station that provides or is intended to provide primarily outdoor wireless coverage and a facility-based access point (e.g., femtocell AP) that provides or is intended to provide primarily indoor wireless coverage or outdoor wireless coverage within a confined range. Explicit distinction between indoor-serving AP and outdoor-serving base station is made when context may be insufficient to distinguish the utilized terms.

Furthermore, the terms "user," "subscriber," "customer," "consumer," and the like are employed interchangeably throughout the subject specification, unless context warrants particular distinction(s) among the terms. It should be appreciated that such terms can refer to human agent(s) or automated component(s) supported through artificial intelligence (e.g., a capacity to make inference based on complex mathematical formalisms) which can provide simulated vision, sound recognition and so forth.

Further yet, the term "set" as employed herein excludes the empty set. Thus, a "set" in the subject disclosure includes one or more elements or entities. As an illustration, a set of devices includes one or more devices; a set of access points includes K access points with K a natural number greater than or equal to unity; a set of attributes spans one or more attributes; etc.

As described in detail below, the subject disclosure provides system(s) and method(s) that enable routing of an incoming communication, or incoming call, to wireless device(s) or wireline device(s) based in part on at least one routing preference and presence information of a mobile device in a confined wireless environment served by a confined-coverage access point. The at least one routing preference is specific to a subscriber who owns (or leases) and operates the mobile device, and thus the at least one routing preference is personalized to the subscriber. A routing server retrieves or receives, or otherwise accesses, the at least one routing preference and the presence information for the mobile device. In an aspect, the routing server is functionally coupled to or integrated, at least in part, with one or more functional elements of a telecommunication network platform that enable standard call processing. Based on routing logic applied to the at least one routing preference and the presence information, the routing server directs the incoming communication to a set of wireline devices, a set of wireless devices, or a combination thereof.

Calls referred to and described in the subject disclosure, e.g., incoming calls or call sessions, include voice communications and data communications, such as multimedia communications (video call, text message, audio communication, data communication, etc.) In addition, the various devices referred to and described herein include any communication devices, such as cellphones, wireline telephones, personal computers, portable computers (e.g., netbooks or laptops), personal digital assistants (PDAs), Moving Picture Experts Group (MPEG)-1 Audio Layer 3 (MP3) players, set top boxes, television sets (TVs), stereo players, radio tuners (satellite-signal based or conventional), gaming boxes (set top or portable), digital video recorders (DVRs), or the like.

Features or aspects described in the subject disclosure can rely, at least in part, on delivery or reception of directive(s), indication(s), request(s), or the like, and information or payload data (e.g., content(s)) associated therewith. Directive(s) can be embodied in multi-bit words (e.g., P-bit words, with P a positive integer) and coded to specifically convey a request to a particular functional element (e.g., a femtocell AP) in order to execute one or more specific operation. Information or payload data within signaling, and request(s) or indication(s) conveyed therein, can be embodied, for example, in one or more reserved bits in a packet header, a light-payload (e.g., of the order of 1 byte) data packet, a predetermined multi-bit word conveyed in a control channel, a lightweight file (e.g., a cookie), an email communication, an instant message, or the like. In addition, directive(s), request(s), indication(s), or the like, as described herein, can be delivered in accordance with various communication protocols. As an example, the various protocols can include at least one of file transfer protocol (FTP), secure shell FTP (SFTP), FTP over secure socket layer (FTPS), short message service (SMS) protocol, multimedia messaging service (MMS) protocol, unstructured supplementary service data (USSD) standard, simple network management protocol (SNMP), lightweight directory access protocol (LDAP), session initiation protocol (SIP), SIP for Instant Messaging and Presence Leveraging Extensions (SIMPLE), Open Mobile Alliance (OMA) device management (DM) protocol, Technical Report 069 (TR-069) protocol, also referred to as Customer Premise Equipment (CPE) Wide Area Network (WAN) Management Protocol or CWMP, or the like.

While aspects or features of the subject disclosure are illustrated in terms of applicability to femtocell access points, such aspects and features are also applicable to, and can be exploited in, other radio access points such as Wi-Fi APs, picocell base station, microcell base stations, or the like, which may provide greater radio access capacity.

Various illustrative scenarios are set forth herein to represent example operational environments that exploit one or more features of communication routing based on femtocell present intelligence as described herein, and reveal the utility of such one or more features. The various illustrative scenarios are, of course, not exhaustive of the multiple operational environments in which the one or more features described in the subject disclosure can be exploited. In addition, the various illustrative scenarios and related examples are intended to be non-limiting, without restricting the applicability or utility of the various embodiments of systems and methods described herein, or any modification or variations thereof.

With respect to the drawings, FIG. 1 illustrates a schematic deployment of a macrocells and femtocells for wireless service coverage in accordance with aspects of the subject disclosure. In wireless environment 100, two areas 105 represent macrocell (macro) coverage; each macrocell is served by a base station 110, which includes a set of one or more antennas 112 and various equipment or apparatuses 114 that enable operation of the base station. It should be appreciated that macrocells 105 are illustrated as hexagons; however, macrocells can adopt other geometries generally dictated by the deployment or floor plan, geographic areas to be covered (e.g., a metropolitan statistical area (MSA) or rural statistical area (RSA)), and so on. Macro coverage is generally intended to serve mobile wireless devices, like UE $120_A$, in primarily outdoor locations. An over-the-air wireless link 115 provides such coverage; the wireless link 115 comprises a downlink (DL) and an uplink (UL), and utilizes a predetermined band of the radio frequency (RF) spectrum. As an example, UE $120_A$ can be a Third Generation Partnership Project (3GPP) Universal Mobile Telecommunication System (UMTS) mobile phone. It is noted that a base station, its associated electronics, circuitry or components, and a wireless link operated in accordance to the base station form a radio access network (RAN). In addition, base station 110 communicates with macro network platform 108 via backhaul link(s) 151 through one or more components (e.g., radio network controller(s), aggregator component(s) . . . ) that are part of access network(s) 152; aspects and deployment of the one or more components are dictated by the underlying radio technology employed for telecommunication. In cellular wireless technologies (e.g., 3rd Generation Partnership Project (3GPP) Universal Mobile Telecommunication System (UMTS), Global System for Mobile Communication (GSM)), macro network platform 108 represents a core network. In an aspect, macro network platform 108 controls a set of base stations 110 that serve either respective cells or a number of sectors within such cells. Macro network platform 108 also communicates with other base stations (not shown) that serve other cells (not shown). Backhaul link(s) 151 can include a wired backbone link (e.g., optical fiber backbone, twisted-pair line, T1/E1 phone line, a digital subscriber line (DSL) either synchronous or asynchronous, an asymmetric ADSL, or a coaxial cable . . . ). Backhaul pipe(s) 155 link disparate base stations 110.

In wireless environment 100, within one or more macrocells 105, a set of femtocells 125 served by respective femtocell (femto) access points (APs) 130 can be deployed. While in illustrative wireless environment 100 three femtocells are deployed per macrocell, aspects of the subject innovation are geared to femtocell deployments with substantive femto AP density, e.g., $10^4$-$10^8$ femto APs 130 per base stations 110. A femtocell 125 typically covers an area that includes confined area 145, which is determined, at least in part, by transmission power allocated to femto AP 130, path loss, shadowing, and so forth. While coverage area associated with femtocell 125 and confined area 145 typically coincide, it should be appreciated that in certain deployment scenarios, confined coverage area 125 can include an outdoor portion (e.g., a parking lot, a patio deck, a recreation area such as a swimming pool and nearby space) while area 145 spans an enclosed living space or residence space. The coverage area associated with femtocell 125 typically is spanned by a coverage radius, or coverage range, that ranges from 20 to 100 meters. The confined coverage area 125 can encompass a setting that can span about 5000 sq. ft., and can include a residential dwelling, a business space, an entertainment area, a worship area, an educational facility, a wellness area, a hospital, etc., and access to wireless service typically is regulated. In addition or in the alternative, instead of being stationary, the confined coverage area 125 can be mobile; for example, it can be part of a vehicle (a car, an elevator, an aircraft, a vessel, etc.). It should be noted that the confined coverage area is substantially smaller, e.g., 1-3 orders of magnitude smaller, than a macrocell 105.

In the subject disclosure, a confined coverage area, such as confined coverage area 125, embodies a confined wireless environment, which, as indicated supra, can include indoor space, outdoor space, or a combination thereof. In addition, femtocell AP (e.g., 130) or any other type of access point (e.g., Wi-Fi AP, picocell AP) that serves the confined coverage area (e.g., 125) is referred to as confined-coverage AP, to denote that such an AP provides wireless service coverage to a confined wireless environment. Moreover, a confined-coverage AP transmits electromagnetic radiation (e.g., radiates) at lower power than a base station intended for outdoor coverage and that serves a macrocell. In an aspect, an AP (e.g., femtocell AP, picocell, Wi-Fi AP) that serves the confined coverage area (e.g., 125) can be deployed within the indoor space (e.g., within a building or structure) that the AP serves; outdoor space that is part of the confined coverage area (e.g., confined coverage area 125) also is served by the AP. In yet another aspect, an AP that covers the confined coverage area (e.g., 125) can be deployed in the outdoor space that the AP serves; in certain deployments the AP can be mounted on or attached to non-residential structure present in the outdoor space that is part of the confined area. A confined coverage area (e.g., confined coverage area 125) referred to in the subject disclosure is owned or leased by the owner or lessee of the AP that serves the confined coverage area; where the AP is deployed as part of structure (mobile or stationary) within the confined-coverage area.

A femto AP 130 typically serves a few (for example, 1-5) wireless devices (e.g., subscriber station $120_B$) within confined coverage area 125 via a wireless link 135 which encompasses a downlink (DL) and an uplink (UL). A femto network platform 109 can control such service, in addition to mobility handover from macro-to-femto handover and vice versa, and registration and provisioning of femto APs. Control, or management, is facilitated by backhaul link(s) 153 that connect deployed femto APs 130 with femto network platform 109 through one or more components of access network(s) 152. The one or more components can include a network interface device (NID), a gateway node, a digital subscriber line (DSL) access multiplexer (DSLAM), or the like. In addition, the one or more components of access network(s) 152 can be functionally coupled to an access aggregator node, which can be embodied in a broadband remote access server (B-RAS); such aggregator node generally is functionally coupled to a femtocell gateway node (not shown) deployed (e.g., installed, configured, and active) within femto network platform 109. Backhaul pipe(s) 153 are substantially the same as backhaul link(s) 151. In UMTS-based radio technology, backhaul link 150 is embodied, at least in part, in Iuh interface.

In an aspect of the subject innovation, part of the control effected by femto AP 130 is based on measurements of radio link conditions and other performance metrics. Femto network platform 109 also includes components, e.g., nodes, gateways, and interfaces, that facilitates packet-switched (PS) (e.g., internet protocol (IP)) traffic and signaling generation for networked telecommunication. It should be appreciated that femto network platform 109 can be femto AP 130 can integrate seamlessly with substantially any packet switched (PS)-based and circuit switched (CS)-based network such as macro network platform 108. Thus, operation with a wireless device such as $120_A$ is substantially straightforward and seamless when handover from femto-to-macro, or vice versa, takes place. As an example, femto AP 130 can integrate into an existing 3GPP Core Network via conventional interfaces, or reference links, such as Iu-CS, Iu-PS, Gi, or Gn. In addition, femto AP 130 can serve a mobile device that operates in accordance with 3GPP radio technology(ies) without dedicated functionality, such as Wi-Fi transceivers.

It is to be noted that substantially all voice or data active sessions associated with subscribers within femtocell wireless coverage (e.g., area 125) are terminated once the femto AP 130 is shut down; in case of data sessions, data can be recovered at least in part through a buffer (e.g., a memory) associated with a femto gateway at the femto network platform. Coverage of a suspended or hotlined subscriber station or associated account can be blocked over the air-interface. However, if a suspended or hotlined customer who owns a femto AP 130 is in Hotline/Suspend status, there is no substantive impact to the customers covered through the subject femto AP 130. In another aspect, femto AP 130 can exploit high-speed downlink packet access either via an interface with macro network platform 108 or through femto network platform 109 in order to accomplish substantive bitrates.

In addition, in yet another aspect, femto AP 130 has cell identifier(s) (e.g., in UMTS-based radio technology, a LAC (location area code) or a RAC (routing area code)) that is different from the underlying macro network. It should be appreciated that in macro networks, cell identifiers (IDs) such as LAC and RAC are reused over several base stations, or Node Bs, and large areas so location information, or intelligence, accuracy and attachment procedure(s) (e.g., LAU or RAU) frequency are relatively low. It should be noted that based at least in part on radio technology deployment for macro networks, cell ID reuse granularity may differ, wherein radio technologies with distributed processing and more signaling capacity may afford more granular cell ID (e.g., LAC and RAC) assignments.

Femto LAC and RAC are used to identify subscriber station location for a variety of reasons, most notably to direct incoming voice and data traffic to appropriate paging transmitters, and emergency calls as well. As a subscriber station (e.g., UE $120_A$) that exploits macro coverage (e.g., cell 105) enters femto coverage (e.g., area 125), the subscriber station (e.g., UE $120_A$) attempts to attach to the femto AP 130 through transmission and reception of attachment signaling. The signaling is effected via DL/UL 135; in an aspect of the subject innovation, the attachment signaling can include a Location Area Update (LAU) and/or Routing Area Update (RAU). As an example of attachment procedure and mechanism(s) associated therewith, UMTS handsets monitor network pilots, e.g., generated through a femtocell, or femtocell AP, while in the idle mode; each pilot includes LAC and/or RAC. As a subscriber station moves between pilots, e.g., moves within a macro sector and reaches vicinity of a femtocell, the subscriber station probes for a change in LAC or RAC. When a change in LAC or RAC is detected, the subscriber station performs LAU and/or RAU so mobile network(s) becomes aware of subscriber station location in order to properly route incoming call pages. Attachment attempts are thus a part of procedures to ensure mobility, so voice calls and data sessions can be initiated even after a macro-to-femto transition or vice versa.

It is to be noted that UE $120_A$ can be employed seamlessly after either of the foregoing transitions. In addition, femto networks typically are designed to serve stationary or slow-moving traffic with reduced signaling loads compared to macro networks. A service provider network 165 (e.g., an entity that commercializes, deploys, or utilizes femto access point 130 and macro base stations 110) is therefore inclined to minimize unnecessary LAU/RAU signaling activity at substantially any opportunity to do so, and through substantially any available means. It is to be noted that substantially any mitigation of unnecessary attachment signaling/control is advantageous for femtocell, or femtocell AP, operation. Conversely, if not successful, UE $120_A$ is generally commanded (through a variety of communication means) to select another LAC/RAC or enter "emergency calls only" mode. It is to be appreciated that this attempt and handling process can occupy significant UE battery, and femto AP capacity and signaling resources (e.g., communication of pilot sequences) as well.

When an attachment attempt is successful, UE $120_A$ is allowed on femtocell 125, and incoming voice and data traffic are paged and routed to the subscriber through the femto AP 130. To facilitate voice and data routing, and control signaling as well, successful attachment can be recorded in a memory register, e.g., a Visited Location Register (VLR), or substantially any data structure stored in a network memory. It is to be noted also that packet communication (e.g., voice and data traffic, and signaling) typically paged/routed through a backhaul broadband wired network backbone 153 (e.g., optical fiber backbone, twisted-pair line, T1/E1 phone line(s), T3 phone line(s), digital level zero line (DS0), digital subscriber line (DSL) either synchronous or asynchronous, an asymmetric DSL, a coaxial cable . . . ). To this end, femto AP 130 is typically connected to the broadband backhaul network backbone 140 via a broadband modem (not shown). In an aspect of the subject innovation, femto AP 130 can display status indicators for power, active broadband/DSL connection, gateway connection, and generic or specific malfunction. In another aspect, no landline is necessary for femto AP 130 operation.

Figure 2:
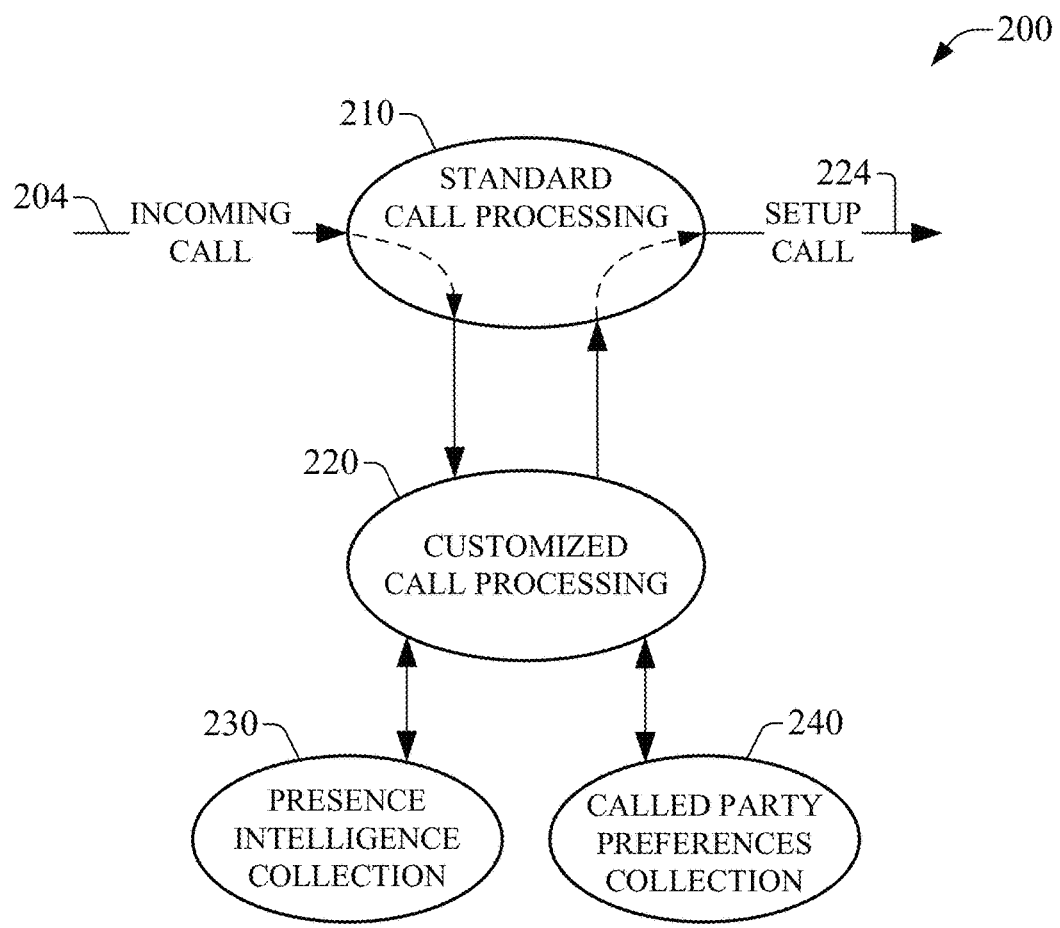
FIG. 2 illustrates displays a diagram that illustrates logic that provides communication routing service based on femtocell presence condition in accordance with aspects of the subject disclosure.

FIG. 2 displays a diagram 200 that illustrates logic that provides customized communication routing service of calls in accordance with aspects described herein. The customized communication routing service can based in part on at least one of a femtocell presence condition and one or more routing preferences. In addition or in the alternative, the communication routing service can exploit one of the femtocell presence condition or the one or more routing preferences. Calls referred to and described in the subject disclosure, e.g., incoming calls or call sessions, include voice communications and data communications, such as multimedia communications (video call, text message, audio communication, data communication, etc.). The subject logic can be represented in one or more example methods described herein. One or more systems in accordance with aspects of the subject disclosure implement, e.g., execute, the one or more example methods to effect the subject logic.

An incoming call 204 is initially processed in accordance with standard call processing logic 210, which in an aspect of the subject disclosure is configured, e.g., adapted or modified, to enable processing of the incoming call 204 in accordance with customized call processing logic 220—such enablement illustrated with a dashed arrow outgoing from block 210 to block 220. The incoming call 204 can be a wireless call or a wireline call. Customized call processing logic 220 consumes information generated as part of presence intelligence collection logic 230 and called-party routing preferences collection logic 240. In the subject specification and annexed drawings, routing preferences are also referred to as preferences. A subscriber that utilizes the customized communication routing service can configure at least one routing preference. The presence intelligence collection logic 230 produces a femtocell presence condition associated with a location of a destination mobile device (e.g., UE $120_B$). The femtocell presence condition can be embodied in a record (e.g., a logical variable or a field entry in table) retained in a memory or memory element, such as a database or a memory register. Based on at least one of a presence condition and a routing preference, customized call processing logic 220 determines appropriate call handling to apply and, after applying such handling, it provides signaling, and related payload data, to standard call processing logic 210—such provision is illustrated in the subject drawing as an outgoing dashed arrow. Standard call processing logic 210 consumes such signaling, and related payload data, and completes call session establishment resulting in setup call 224, which can be consumed in a wireline device or a wireless device, or any combination thereof.

The various aspects disclosed herein in connection with customized call processing do not affect adversely the operational features of wireless devices and wireline devices that establish a call session 224 according to aspects described herein. A subscriber that consumes the customized routing service set forth in the subject disclosure continues to be able to utilize their wired and wireless devices to communicate without operation features thereof being degraded.

Implementation of the logic described in connection with diagram 200 enables at least the communication scenario illustrated in FIG. 3. In diagram 300, a confined area 302 is afforded wireless service through femtocell AP 320, also referred to herein and annexed drawings as femto AP 320. The femtocell AP 320 is connected to an access network (e.g., 152) via network interface device (NID) 330. The confined area 302 is illustrated as a residential dwelling, such as a single-family home or an apartment, with four living areas $315_1$-$315_4$ and one exterior space $315_5$ (e.g., a deck, patio, veranda, garage, or combination thereof) covered by femtocell AP 320. It should be appreciated that while a single femto AP 320 is illustrated, features of the subject communication scenario are also realized in dwelling areas covered by a plurality of two or more femtocell access points. It should further be appreciated that the confined area 302 can be embodied in other locations such as a business space (e.g., a hotel); an enterprise place of operation; a factory; an entertainment area which can include bars, night-clubs, or the like; a worship area such as a church or mosque; an educational facility, which can include open and semi-open spaces as it may be the case in a college campus; a wellness area, e.g., a health club; a hospital or nursing home; etc. In addition, femto AP 320 or one femto AP in the plurality of one or more femtocell APs can supply wireless service to more or less than four indoor areas and one exterior space.

In an aspect of the subject first scenario, mobile device 310 can be located in living area $315_3$, within an enclosure (e.g., a purse located in an upstairs bedroom) or deposited in a piece of furniture (e.g., dresser in the upstairs bedroom). A subscriber linked to the mobile device 310, e.g., the mobile device's owner, can roam throughout the residential dwelling 302 without carrying mobile device 306. In particular, the subscriber, illustrated with a solid star, can be at living area $315_1$ (e.g., the kitchen of residential dwelling 302) conducting a specific activity (e.g., cooking with grandchildren, or cooking and watching television) when an incoming call 204 directed to mobile device 310 is effected. As an example, incoming call 204 can be a voice call placed by the subscriber's neighbor to alert the subscriber that the subscriber's dog is loose in the neighbor's backyard. In conventional communication scenarios that do not exploit customized call processing logic 220, the subscriber misses the established call session 224. In contrast, if customized call processing logic 220 is configured, in instances the subscriber is at the residential dwelling 302, incoming call 204 intended for mobile device 310 can be automatically routed as a call session 224 (e.g., voice call) to one or more devices, wireless or wireline, within residential dwelling 302; e.g., devices 306, 308, 312, or 314, or a combination thereof. In particular, call session 224 can be established through wireline telephone 312 placed in living area $315_1$ and thus the subscriber can answer the call session 224. Such communication behavior has at least the following advantages with respect to conventional communication scenarios: (i) Improved service experience for the subscriber and related customer satisfaction with the ensuing enhanced service provider stickiness (e.g., lessened churn reduction), and (ii) increased connectivity and related service delivery.

In the foregoing communication scenario, the instances in which the subscriber is within confined area 302 can be asserted based at least on a presence condition extracted from data on attachment to femtocell AP 320. Likewise, instances in which the subscriber is outside area of femtocell service coverage also can be asserted based at least on a presence condition gleaned from data on attachment to a macrocell base station (not shown in FIG. 3). As described in greater detail below, changes in presence conditions associated with mobility of mobile device 310 outside femtocell service coverage can result in incoming calls 204 intended to mobile device 310 no longer being routed to one or more devices within the confined area 302.

Figure 3:
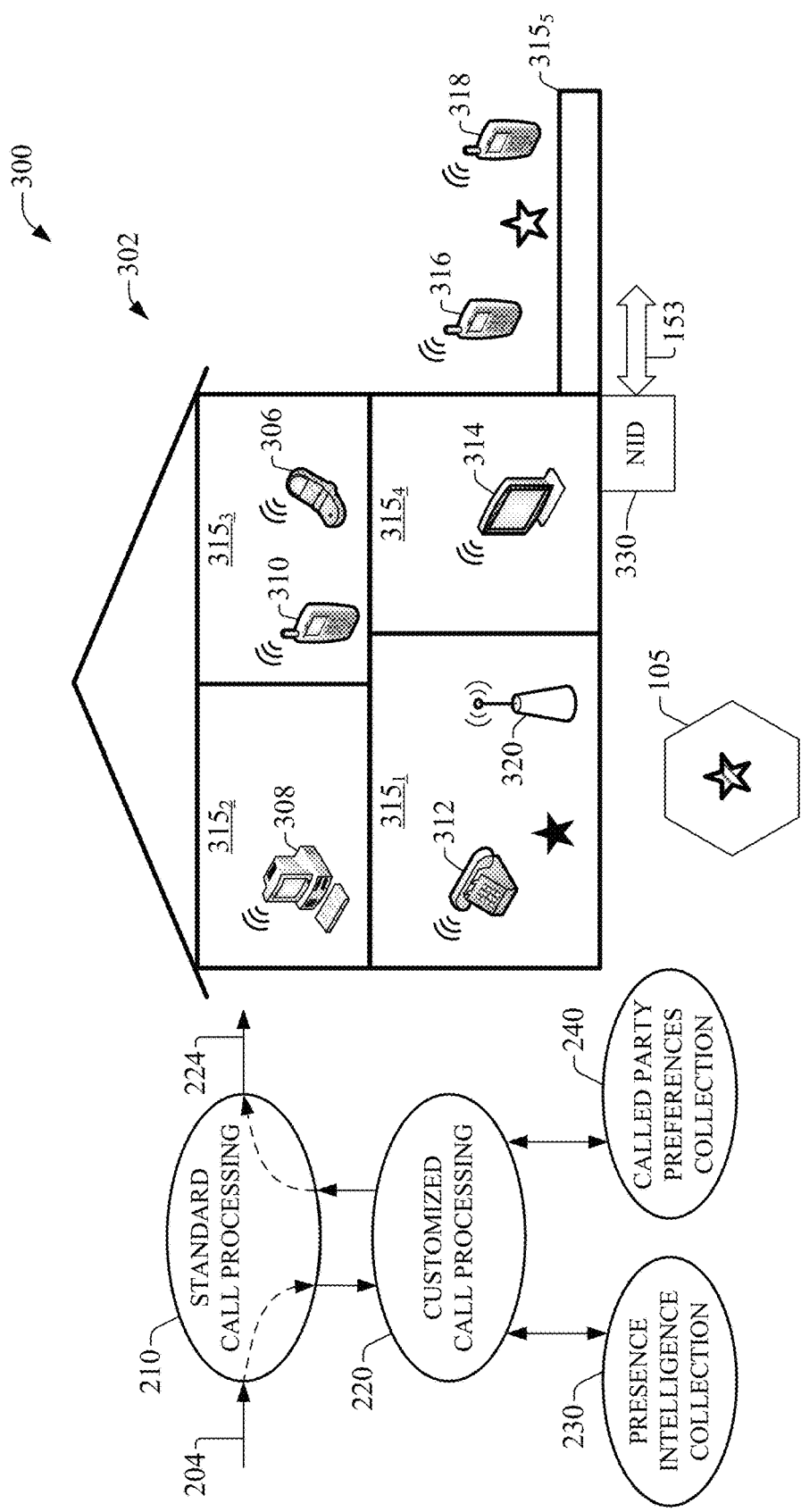
FIG. 3 illustrates an example communication scenario that can be enabled through implementation of the logic in FIG. 2 in accordance with aspects described herein.

In another aspect of the subject first communication scenario, the subscriber can be in a semi-open area, e.g., $315_5$, separated from mobile device 310 when incoming call 204 (e.g., voice call) directed to mobile device 310 is effected; the subscriber represented by an open star in FIG. 3. In view that the subscriber is distanced from the mobile device 310, in conventional communication scenarios that do not exploit customized call processing logic 220, the subscriber typically misses the incoming call 204. Yet, when customized call processing logic 220 is enabled and active (e.g., configured with a set of routing preferences) and based on at least one routing preference and a presence record, the incoming call 204 can be routed as a call session 224 to one or more devices, such as mobile stations 316 and 318, that are attached to femtocell AP 320. The at least one preference can be configured (e.g., generated, conveyed, or committed) by the subscriber via at least one functional element (e.g., a device or apparatus). Proximity of such mobile stations to the subscriber (represented by open star) and the subject customized routing prevent the subscriber from missing the incoming call 204 and enable the subscriber to engage in the call session 224 originating from incoming call 204. In an aspect, the subject disclosure allows simultaneous or substantially simultaneous ringing of mobile device 310 and mobile stations 316 and 318. Specific ringtones can alert the subscriber and bearers of mobile stations 316 and 318 that the established call session is intended for the subscriber. As an illustration, after entering confined area 302, the subscriber can leave the mobile device 310 in her purse in living space $315_3$ while bearers of mobile stations 316 and 318, who can be family members of the subscriber, carry such mobile stations with them while inside the confined area 302. If the subscriber (represented with an open star) and the bearers of mobile stations 316 and 318 are located in exterior space $315_5$ and incoming call 204 intended for mobile device 310 is effected by an end user linked to the subscriber, such as a friend of the subscriber, a call session 224 can be established with the mobile device 310 and mobile stations 316 and 318 based on at least one of one or more customized routing preferences linked to the subscriber and presence record that reveals mobile device is within confined area 302. Bearers of mobile stations 316 and 318 can identify the end user and provide the subscriber with one of the mobile stations 316 or 318 so the subscriber can respond to the call session 224 and thus not miss the incoming call.

In yet another aspect of the subject first scenario, incoming call 204 (e.g., voice call) can be a wireline call intended for a wireline device (e.g., telephone 312) within residential dwelling 302. Conventionally, in communication scenarios that do not exploit customized call processing logic 220, a subscriber misses the incoming call 204 when the subscriber is outside residential dwelling 302 and related femtocell service coverage area. In contrast, in accordance with aspects of the subject innovation, at a time customized call processing logic 220 is configured, such deficiency is mitigated or avoided if the subscriber is linked or associated to a mobile device (e.g., 310) or other one or more devices (not shown) with wireless capability that operate in close proximity of the subscriber. In particular, in an instance the subscriber is outside residential dwelling 302 and based on at least one routing preference, the incoming call 204 (e.g., voice call) intended for the wireline device (e.g., telephone 312) can be routed automatically, e.g., without human intervention, as a call session 224 to the mobile device (e.g., 310) or the other one or more devices with wireless capability that operate in close proximity of the subscriber. In an aspect, the at least one routing preference is associated with the subscriber; the association can be a one-to-one relationship or a one-to-many relationship. In another aspect, the one or more devices operating in proximity to the subscriber can include a wearable device with enabled wireless capability that is attached to the subscriber's garment or gear (goggles, helmet, etc.). In diagram 300, a dashed star within a coverage cell 105 represents the subscriber being outside area of femtocell coverage provide by femtocell AP 320 and associated with dwelling 302. As an illustration, such customized routing functionality can allow an end user to communicate with the subscriber while unbeknownst to the end user the subscriber is outside the residential dwelling 302 (e.g., shopping in grocery store) and despite the end user being memory challenged and attempting to communicate through the subscriber's home phone number, which the end user has used for the past several (e.g., 30) years, because the end user's fails to remember subscriber's mobile device number. It should be appreciated that for the end user, e.g., the subscriber's aging mother, with a perceived imperative need to contact the subscriber, as it may be the case when the end user is worried about results of her most recent doctor visit, enhanced connectivity can provide an increased perceived quality of service related to the telecommunication service provider.

The functionality afforded by implementation of customized call processing logic in the foregoing scenario results in at least the following advantages with respect to conventional communication scenarios: (i) Improved service experience for the subscriber and related customer satisfaction with the ensuing enhanced service provider commercial stickiness (e.g., lessened churn reduction), and (ii) increased connectivity and related service delivery.

Figure 4:
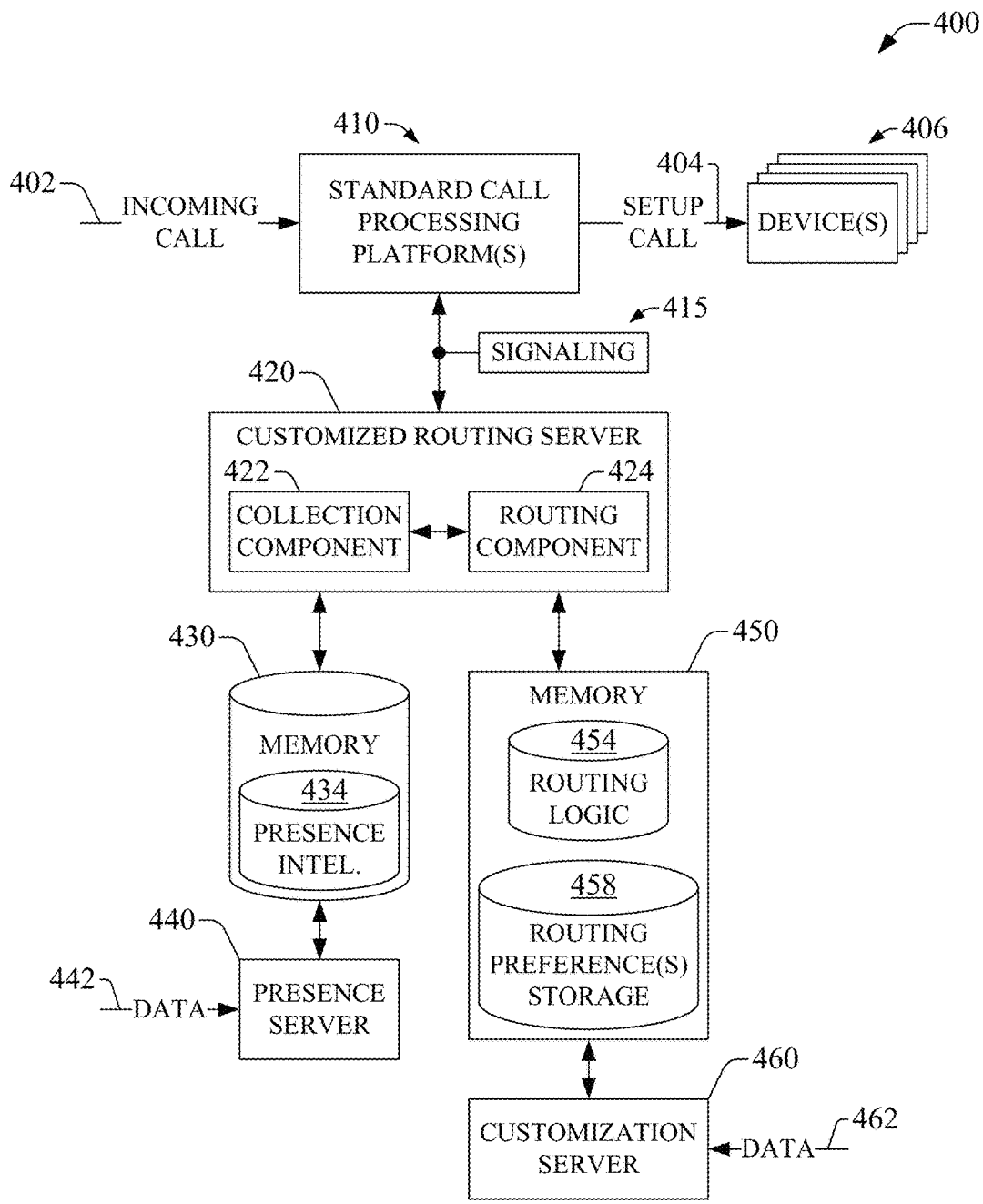
FIG. 4 is a block diagram of an example system that enables a customized routing service of communications, or calls, based in part on at least one of a femtocell presence condition and one or more routing preferences in accordance with aspects described herein.

FIG. 4 is a block diagram of an example system 400 that enables communication routing service of communications, or calls, based in part on at least one of a femtocell presence condition and one or more routing preferences in accordance with aspects described herein. Standard call processing platform(s) 410 includes a set of components that enable, in part, establishment of a call session 404 in response to an incoming call 402 (e.g., a telephone call) and in accordance with customized call routing processing; the call session 404 can be to one or more devices in a set of one or more devices 406. Standard call processing platform(s) 410, through at least one component in the set of components, can invoke, or initiate, customized call processing routing. To invoke customized call processing routing, the at least one component can apply a group of filter criteria or assess a set of trigger rules at one or more trigger points to convey an indication to effect customized communication routing; the indication can be delivered to customized routing server 420 as part of signaling 415 and related payload data. In an aspect, a filter criterion can be an IMS filter rule and a trigger point can be a Customized Applications for Mobile Enhanced Logic (CAMEL) trigger point or an Advanced Intelligent Network (AIN) trigger point. A CAMEL trigger point can be employed if incoming call 402 is received in the circuit-switched (CS) domain, whereas in case the incoming call 402 is placed in the packet-switched (PS) domain the IMS filter rule can be applied. The at least one component can be embodied in a CAMEL server in the CS domain and in an Application Server (e.g., a Telephony Application Server) within an IMS in the PS domain.

To provide customized communication routing invocation, the at least one component can execute one or more methods for implementing personalized handling of an incoming call, wherein the one or more methods can be embodied in at least one set of code instructions retained in a memory in the standard call processing platform(s) 410. In an embodiment, the one or more methods can be integrated in mechanisms conventionally employed to effect add-on communication services in order to modify such mechanisms and afford the one or more features and advantages of the subject disclosure. For example, the one or more methods, when implemented (e.g., executed by at least a processor), can exploit Serving Call Session Control Function (S-CSCF) to apply the IMS filter rule that can initiate customized communication routing.

Customized routing server 420 receives the indication to effect customized communication routing. In response, the customized routing server 420 retrieves, or otherwise accesses, (a) at least one routing preference for customized communication routing, and (b) femtocell presence information, e.g., a presence condition record, of a mobile device associated with the incoming call 402. The femtocell presence information establishes if a mobile device of a subscriber that consumes the customized communication routing service is inside a confined area of femtocell coverage service or outside the confined area. In an aspect, in an instance the mobile device is inside the confined area, the presence condition record can adopt an "At Home" value or "In Premises" value, whereas in other instances in which the mobile device is outside the confined area, the presence condition record can adopt a "Not At Home" value or "Not In Premises" value. Based on the at least one routing preference for customized communication routing and the femtocell presence information, the customized routing server 420 effects personalized communication routing, and establishes, in part, call session 404. In the illustrated embodiment of customized routing server 420 in example system 400, collection component 422 can retrieve, or otherwise access, the at least one routing preference from routing preference(s) storage 458. Collection component 422 also can extract, or otherwise access, the presence condition record from presence intelligence storage 434, also referred to as presence intelligence 434 in the subject disclosure. In addition, in the illustrated embodiment, customized server 420 includes a routing component 424 that directs the incoming communication 402 to one or more devices, e.g., device(s) 402, to establish, in part, setup call session 404 based in part on the at least one routing preference and the presence condition record. Device(s) 402 can include mobile devices (e.g., cellular telephone (cellphone), laptop computer with wireless connectivity card, netbook, DVR . . . ) and wireline devices (e.g., POTS telephone, home manager IP-based telephone . . . ) that utilize wireless network resources to telecommunicate voice or data.

Depending in part on the at least one routing preference, incoming communication 402 (e.g., a wireless call or a wireline call) can be routed to a wireless device, a wireline device, or any combination thereof, represented in example system 400 by device(s) 402. In an example, in a scenario the incoming communication 402 is intended to a mobile device, e.g., a wireless call, if the presence condition record has a value of "At Home," and if the at least one routing preference conveys a subscriber associated with the mobile device desires to receive the wireless call on both the mobile device and one or more wireless home devices and one or more wireline home devices; then, the incoming call 402 (e.g., the wireless call) is routed to at least one of a wireline number and a wireless number (e.g., a cellphone number). In another example, in a scenario the incoming communication 402 is intended to a wireline home telephone, e.g., a wireline call, if the presence condition record has a value of "Not At Home," and if the at least one routing preference conveys a subscriber associated with the wireline home telephone desires to receive the wireline call on a subscriber mobile device when the subscriber is not at home, and the subscriber does not desire their wireline calls to provide alerting when they are not at home; then, the wireline call is routed to the subscriber mobile device number and not the subscriber's wireline home telephone number.

Presence server 440 determines and maintains (generates, modifies, stores, etc.) dynamic femtocell presence information, which presence server 440 can store in presence intelligence storage 434 within memory 430. In an aspect, based on data 442, the presence server 440 automatically determines the femtocell presence information based in part on whether or not the mobile device is registered, or attached, to a femtocell AP that supplies wireless service to the confined area. To provide such functionality, the presence server 440 can execute a first set of procedures, which can be embodied in one or more sets of code instructions retained in a machine-readable or computer-readable storage medium. Presence server 440 can be part of a telecommunication network platform (e.g., macro network platform 108 or femto network platform 109) or a backend service platform thereof. In an embodiment, the presence server 440 can be an application server deployed external to other components of the telecommunication network platform or the backend service platform; conventional standardized or proprietary interfaces can be utilized to functionally connect (e.g., communicatively couple) presence server 440 to the other components. In another embodiment, the presence server 440 can be integrated within an existing node in the telecommunication network platform or the backend service platform. For example, the existing network node can be a CAMEL serving node in the circuit switched (CS) domain of the telecommunication network platform; a femtocell gateway node; or an internet protocol (IP) Multimedia Subsystem (IMS) Telephony Application Server (TAS).

Data 442 can be generated through execution of a second set of procedures, which determine the scope (e.g., data domain or data structure) of the data 442; various components within at least one of a telecommunication network platform (e.g., CN in UMTS-based technologies), an access network (AN), or a group of end-user devices can execute the second set of procedures. The second set of procedures also can be embodied in one or more sets of code instructions retained in a machine-readable or computer-readable storage medium. The first set of procedures and the second set of procedures form a group of presence procedures.

The second set of procedures can be categorized based on the component(s) that can execute such procedures: Network-based procedure(s), access-network-based procedure(s), and subscriber-device-based procedure(s). Network-based procedure(s) affects primarily one or more components in a telecommunication network platform, AN-based procedure(s) affects mainly a femtocell AP, while subscriber-device-based procedure(s) particularly impacts at least one user device (e.g., a mobile device linked to a subscriber that has customized routing service as described herein).

Network-based procedure(s).—The second set of procedures can be retained in a memory within the telecommunication network platform administered by a telecommunication carrier, or external network(s) functionally coupled thereto. A procedure in this category is determined in part by the underlying operational features of the telecommunication network platform or the external network(s); e.g., CS network platform (e.g., 2G, 2.5G networks) or PS network platform (e.g., 3G, 3.5G, or 4G networks). (1) A CS-based procedure can exploit Signaling System #7 (SS7) signaling, and related payload data. In an aspect, the CS-based procedure can include a group of code instructions, retained in memory (e.g., memory 430), that can be part of CAMEL. Presence server 440 can execute the group of code instructions in order to exploit the CAMEL functionality that discloses mobility management events, and related data, to a Service Control Function (SCF) component, and generate (e.g., determine and maintain) femtocell presence information. In an aspect, a wireless subscriber can be provisioned with CAMEL service(s), particularly with relevant CAMEL subscription information to support mobility management events. Example mobility management events that presence server 440 can consume to generate a presence condition record associated with femtocell presence information include the following. Location update within a Visited Location Register (VLR) service area; location update to a disparate VLR service area; IMSI attach; mobile device initiated IMSI detach, or explicit detach, e.g., the mobile device is powered off; or network initiated IMSI detach, or implicit detach. The foregoing location update events occur in response to movement of a mobile device between macrocell coverage area (e.g., 105) and femtocell coverage area (e.g., 125, 302), whereas IMSI attach occurs if a mobile device is powered on and explicit detach occurs if the mobile device is turned off. At least one of the example mobility events can trigger the CAMEL functionality that conveys data on the at least one of the example mobility events to the SCF component; based on this conveyance of data, the SCF component accesses femtocell presence information, which can be delivered to the presence server 440. Further to femtocell presence information, the SCF component can access, or otherwise acquire, information related to routing incoming calls (e.g., 402). An incoming call destined to a mobile telephone number (TN) provisioned with customized communication routing can invoke the CAMEL service(s). Service logic, which can be part of routing logic 454, can be exploited by the SCF component to determine how to route a call based at least on presence condition record(s). It should be noted that in certain embodiments, when SCF component is invoked and routing information is to be returned or exchanged, the SCF component returns a single destination address, or number, in response to the invocation; however, in such embodiments, various destination addresses can be supplied sequentially.

In addition or in the alternative, the group of code instructions that are part of the CS-procedure can be retained in VLR. As part of the CS-procedure, the VLR can receive a Location Update message when (e.g., at a time, or after a time) a mobile device of a subscriber that is provisioned customized routing service moves from macrocell coverage to femtocell coverage, or from femtocell coverage to macrocell coverage. The VLR can analyze Serving Area Information (SAI) and determined of the mobile device is attached to a femtocell AP owned or leased by the subscriber or a third party, and based on the analysis notify the presence server 440 that the mobile device is in "At Home" (or "In Premises") presence condition or "Not At Home" (or "Not In Premises") presence condition. In the alternative or in addition, the VLR can send the SAI to presence server 440, which can analyze the information to determine if the presence condition of the mobile device; either "At Home" or "Not At Home".

(2) A PS-based procedure, when executed by a functional element, can exploit at least one or more components of a PS domain in the telecommunication network; for example, the one or more components can be part of an IMS core network. As part of the PS-based procedure, presence server 440 can receive an indication to supply femtocell presence information in response to an incoming call attempt to a mobile device. The incoming call attempt is received by the one or more components, which, in response, apply a filter criterion or filter rule to convey the indication; in an aspect, the filter criterion can be provisioned in a Home Subscriber Server within the PS domain. The indication can be delivered as part of data 442. As discussed supra, to supply femtocell presence information, the presence server 440 can generate or update a presence condition record and deliver it.

An advantage of PS-based procedure(s) is that access to femtocell presence information can be integrated with various PS-based (e.g., IP-based) applications that support a myriad of interfaces such as APIs, and services, including web based services. Another advantage of PS-based procedure(s) is integration of one or more aspects of SS7 interfaces and related functionality; for example, presence server 440 can exploit SS7 signaling, are related payload data, to produce femtocell presence information and supply such information as part of the PS-based procedure(s).

AN-based procedure(s).—The second set of procedures can be retained within a femtocell AP, which can be owned or leased by the subscriber or a third party (3P), such as a relative, friend, colleague, vendor (e.g., a dentist), or employer of the subscriber. Data 442 includes femtocell presence information of the mobile device associated with a subscriber that consumes customized routing service. A femtocell AP conveys the femtocell presence information to presence server 440 through signaling delivered, in part, over a backhaul network (e.g., an IP broadband backhaul network, such as backhaul link(s) 153 and at least one component of access network(s) 152). In an aspect, a client component in the femtocell AP generates a presence information record at a time, or a predetermined period after the time, a mobile device registers on the femtocell AP or deregisters from the femtocell AP. For instance, when (e.g., at an instant, or after the instant) the mobile device registers on the femtocell AP, as part of the registration procedure and in response to registration, the client component generates a presence condition record with a value of "At Home" for the mobile device and delivers a notification message within data 442 to the presence server 440 to convey the presence condition record. When the mobile device de-registers from the femtocell AP, in response to de-registration, the client component updates the presence condition record for the mobile device, or generates a new presence condition record for the mobile device, to reflect a condition value of "Not At Home," and delivers a notification message to the presence server 440 to disclose the updated presence condition record or the new presence condition record. It should be appreciated that the response(s) of the client component to registration/de-registration of the mobile device with the femtocell AP can be enabled by execution of the second set of procedures. At least a portion of the second set of procedures can modify conventional registration procedures to accomplish the described aspects of the subject disclosure.

In one or more embodiments, the client component can be a Session Initiation Protocol (SIP) based client running on the femtocell AP and can alert (e.g., deliver signaling to) a SIP based AS in an IMS core network. The client component in the femtocell AP can execute the second set of procedures. In the alternative, at least one processor in the femtocell AP can execute the second set of procedures by executing the client component.

The subject AN-based procedure(s) can be advantageous in communication scenarios in which wireless devices that are not dual transfer mode (DTM) capable are expected to operate in the confined area(s) covered by femtocell wireless service. In such scenarios, femtocell presence information, and associated signaling to a presence server (e.g., 440) is not affected by the precedence of voice calls over data sessions in wireless devices that are not DTM capable.

Subscriber-device-based procedure(s).—The second set of procedures can be retained within a mobile device of a subscriber that consumes the customized communication routing service described herein. The subject procedure(s) are a client based approach. A client component that resides in the mobile device can execute at least a portion of the second set of procedures in response to detection of attachment to a femtocell AP, owned or leased by the subscriber or a third party, or detection of attachment to a macrocell base station. As a result, the client component can produce (e.g., generate or update) a presence condition record and deliver a notification message to the presence server 440 to supply the presence condition record. The presence condition record can adopt a value of "At Home" if attachment to the femtocell AP is detected, whereas detection of attachment to the macrocell base station leads to a "Not At Home" value for the presence condition record. The client component can deliver the notification message, as part of data 442, through various protocols or mechanisms; e.g., SIP signaling or H.323 signaling in PS domain, short message service (SMS) or conventional SS7 signaling in GSM-based or UMTS-based radio technology, peer-to-peer protocol such as Extensible Markup Language (XML) Document Management Server (XDMS) protocol.

In one or more embodiments, the client component can be SIP client executing on the mobile device, via at least one processor, to enable interaction of the mobile device with IMS operational environment, or platform, over an IP access network (e.g., AN(s) 152). In an aspect, the client component can perform a SIP registration over a femtocell AP data channel when (e.g., at a time) it detects that the mobile device is registered with the femtocell AP. Such registration attempt, and related attachment signaling, is relayed to presence server 440, which can be embodied in an IMS AS. In an additional or alternative embodiment, the client component can communicate with the presence server 440 in accordance with other packet-based (e.g., IP) protocol, or signaling mechanism, to convey femtocell presence information.

Memory 430 can be embodied in at least one of a Home Location Register (HLR) or a Home Subscriber Server (HSS), or a data repository functionally coupled to a femtocell gateway node in a femtocell network platform (e.g., 109). Memory 430 also can be embodied in a memory integrated or operationally coupled to a server in an external network functionally connected to a macro network platform 108 (a Core Network, in UMTS based radio technology). In an example, memory 430 can be functionally connected to an AS (the server) in an IMS (the external network). In another example, memory 430 can be functionally connected to a broadband remote access server (B-RAS; the server) and the internet (the external network); in this example, memory can be either a conventional data repository or a cloud web-based file server. In addition, in an embodiment, memory 430 can be part of a memory platform in a backend service infrastructure, such as a consolidated data repository that centralizes data of one or more network platforms that provide wireline or wireless service(s). The data can be operational data and administrative data.

In one or more additional or alternative embodiments, presence intelligence storage 434 can be part of (a) customer premises equipment (CPE), e.g., a femtocell AP, a component that aggregates one or more femtocell APs, a switch or router, or a private branch exchange (PBX) apparatus; or (b) a user device, e.g., a mobile device, a personal computer or other home networking component. Compared to storage in a memory deployed within a telecommunication network platform (e.g., 108, 109), storage of a presence condition record in a memory 430 in accordance with aspects (a) and (b) results in increased flexibility and accessibility to the presence condition record by an end-user or user device. The increased flexibility and accessibility is provided at the expense of call session processing efficiency in view of increased signaling that might be incurred in order to access data (e.g., the routing preference) remote to the telecommunication network platform. Specific operational scenarios can afford such tradeoff.

Routing logic storage 454, also referred to as routing logic 454 in the subject disclosure, can include default logic and exception handling logic; wherein logic is a set of one or more rules. For a subscriber that consumes customized communication routing service, example default logic can comprise the following rules. (1) Route all incoming calls to a mobile device of the subscriber and a set of wireline devices linked to a physical address of the subscriber if the presence condition for the mobile device is "At Home". (2) Route an incoming call intended for a mobile device of the subscriber and an incoming call intended for a wireline device linked to the physical address of the subscriber to the mobile device and not the wireline device if presence condition for the mobile device is "Not At Home." It should be appreciated that the foregoing rules are illustrative and additional or alternative rules can compose the default logic. In particular, default logic can route an incoming call 402 to one or more wireless devices (e.g., 316 and 318) registered on a femto AP (e.g., femto AP 320) utilized as a reference for presence intelligence associated with a mobile device (e.g., 310) of the subscriber. To implement such default logic, routing component 424 can convey a directive to collection component to extract one or more presence condition records for the one or more wireless devices and, based on the one or more presence condition records, direct the incoming call 402 to the one or more wireless devices. Routing component 424 can identify the one or more wireless device via at least one access control list that regulates access to the femto AP (e.g., 320); the ACL can be retained in a network-based memory, such as a subscriber database in HSS. It is noted that in one or more embodiments, routing of an incoming call to a set of mobile devices registered on a femtocell AP that establish presence condition can be effected only if the presence condition of the mobile device is in "At Home" (or "In Premises" or other suitable alphanumeric value). In addition, for the subscriber, exception-handling logic can route an incoming call in anomalous scenarios: For example, for the subscriber becomes hotlined for lack of service payment, a customized routing service deactivation notice (e.g., a SMS communication, or an automated voice recording) can be delivered to a mobile device utilized by the subscriber to convey the service anomaly.

In addition, routing logic storage 454 can include schedules or profiles that regulate application of at least one routing preference. For instance, for a specific mobile device, such as a business cellular phone, customized communication routing is inactive during weekends (e.g., from 8:00 p on Friday until 5:00 a on following Monday). Routing logic storage 454 also can include discriminator(s) that establish level of personalization of customized routing, e.g., customization for residential subscribers can be different from that for enterprise or business subscribers. At least one discriminator can be employed for security or safety: As an example, the at least one discriminator can trigger collection of data related to a routed incoming call (traffic, called numbers, calling numbers, etc.) as part of Communications Assistance for Law Enforcement Act (CALEA), employer monitoring, or parental control. As another example, the at least one discriminator can override a routing preference that includes a specific group of one or more devices, wireless or otherwise.

Routing logic storage 454 also can include criteria to manipulate an incoming communication. For example, the criteria can dictate that the incoming communication is to be reformatted prior to delivery, and select a specific device for certain types of communication: A digital picture frame can be selected for MMS communication; selection can be automatic or based on a ranking, which can be configured by a subscriber that exploits the customized routing service.

Customization server 460 manages, e.g., creates, modifies, receives, or delivers routing preferences of a subscriber that consumes customized communication routing service as described herein. The routing preferences enable, in part, the femtocell presence based routing or customized call processing, and can be retained in memory 450. As illustrated as a separate functional element, in one or more embodiments, memory 450 can be integrated in customization server 460. In an aspect, customization server 460 can be a dedicated server or it can be integrated in one or more servers that provide other functionality. In an aspect, the customization server 460 can be integrated in a server that is part of a macrocell network platform 108 or a femtocell network platform 109. In another aspect, the customization server 460 can be integrated in a server that is part of an external network functionally coupled to at least one of such network platforms; for instance, the external network can be an IP Multimedia Subsystem (IMS) and the server can be embodied in an Application Server (AS). In addition, customization server 460 can include a database management component (not shown) that administers, at least in part, data retained in memory 450.

Memory 450 and memory 430 have similar aspects and, in one or more embodiments, such memories can be integrated. Memory 450 can be embodied in at least one of a Home Location Register (HLR) or a Home Subscriber Server (HSS). In addition, memory 450 can be embodied in a data repository functionally coupled to a femtocell gateway node in a femtocell network platform (e.g., 109). Memory 450 also can be embodied in a memory integrated or operationally coupled to a server in an external network functionally connected to a macro network platform 108 (a Core Network, in UMTS based radio technology). As an example, memory 450 can be functionally connected to an AS (the server) in an IMS (the external network). As another example, memory 450 can be functionally connected to a broadband remote access server (B-RAS; the server) and the internet (the external network); in this example, memory can be a conventional data repository or a cloud, web-based file server. In addition, in an embodiment, memory 450 can be part of a memory platform in a backend service infrastructure, such as a consolidated data repository that centralizes data of one or more network platforms that provide wireline or wireless service(s). The data can be operational data and administrative data, and can be retained as part of one or more customer profiles (e.g., a Common Customer Profile (CPP)) for access to at least one service.

In one or more additional alternative embodiments, routing preference(s) storage 458 within memory 450 can be part of (i) customer premises equipment, e.g., a femtocell AP, a component that aggregates one or more femtocell APs, a switch or router, or a private branch exchange (PBX); or (ii) a user device, e.g., a mobile device, a personal computer or other home networking component. Compared to storage of a set of routing preferences in a memory deployed within a telecommunication network platform (e.g., 108, 109), it should be appreciated that storage of a routing preference in a memory 450 in accordance with aspects (i) and (ii) results in increased flexibility and accessibility to the routing preference by an end-user or user device. The increased flexibility and accessibility is provided at the expense of call session processing efficiency in view of increased signaling that might be incurred in order to access data (e.g., the routing preference) remote to the telecommunication network platform. Such tradeoff can be afforded in specific operational scenarios.

In scenarios in which routing preference(s) storage 458 is distributed across multiple platforms or devices, or a combination thereof, one or more functional elements can be deployed (e.g., configured, installed, tested, and accepted) to ensure service integration integrity. In one or more embodiments, an integrity component (not shown) can be included in example system 400 to resolve such conflicts; conflict resolution and improved telecommunication performance can offset additional complexity associated with deployment of the integrity component. Deployment of such functional elements (e.g., components, servers) can increase operational complexity of example system 400, or any other system(s) described herein for customized communication routing, but advantages associated with mitigation or eradication of service integration concerns, such as problems possibly conflicting call forwarding unconditional settings, can realize one or more operational efficiencies for a service provider or a subscriber.

Customization server 460 can receive or retrieve, or otherwise acquire, data 462 to commit at least one routing preference in routing preference(s) storage 458. Data 462 can include a set of preference parameters that define the at least one routing preference; the set of preference parameters can be generated by at least one system (not shown) that collects input data from a subscriber via a subscriber device. In an embodiment, the at least one system can be a user device (mobile station, PC, etc.) that executes an application (software or firmware) to configure the at least one routing preference. In another embodiment, the at least one system can be a functional element, such as a component or server, deployed (e.g., installed, configured, tested, and accepted) in a telecommunication network platform and that is communicatively coupled to a user device (mobile station, PC, etc.); the functional element executes an application (software or firmware) to configure the at least one routing preference. Data 462 also can be supplied by a customer support network component, as conveyed by a subscriber through personal interaction with a service provider representative, e.g. over the phone or at a service center.

In one or more embodiments of example system 400, one or more processors (not shown) configured to enable, or that enable, at least part of the functionality of the group of servers (e.g., 420, 430, and 450), and associated component(s), can be included in or functionally coupled to each server in the group of servers in the example system 400. To implement or provide at least part of the described functionality of at least a server in the group of servers, the one or more processors can execute one or more sets of code instructions (not shown) stored in one or more of memory 430 or memory 450, or other memory accessible to the one or more processors. The one or more sets of code instructions can include program module(s) or software application(s) or firmware application(s) that, when executed by the one or more processors (not shown), implement specific tasks which can be accomplished through at least one of the example methods described in the subject specification and that are associated, at least in part, with functionality of the at least one server in the group of servers in example system 400. In certain embodiments, a server in the group of servers (e.g., 420, 430, and 450) can be embodied, at least in part, in one or more sets of code instructions stored in a memory (e.g., 430 or 450) accessible to the one or more processors (not shown); when executed by the one or more processors, the one or more sets of code instructions implement the server and its functionality.

In one or more embodiments of example system 400, a server in the group of servers (e.g., 420, 430, and 450) in example system 400 can include input/output (I/O) interface(s) (not shown) that enable, at least in part, networked communication. Additionally, in example system 400, either memory 430 or memory 450, or both of these memories, can be a centralized element or a distributed element, and each can include any memory element described in connection with example system 400. In addition, memory 430 and memory 450 can be integrated, even though in the illustrated embodiment such memories are presented as separate entities.

Figure 5:
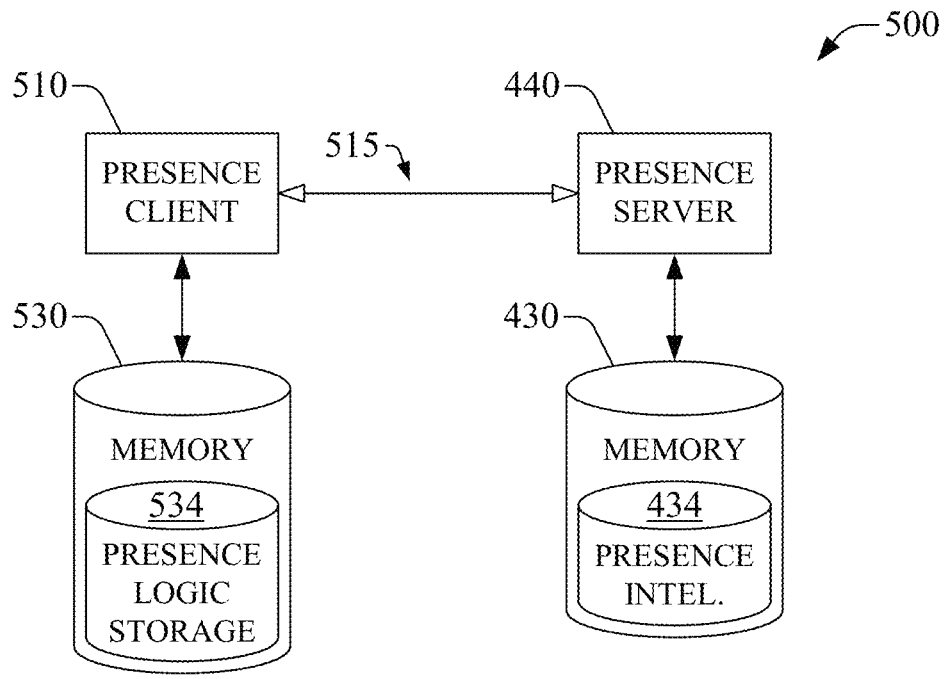
FIG. 5 is a block diagram of an example system to update presence intelligence in accordance with aspects described herein.
Figure 6:
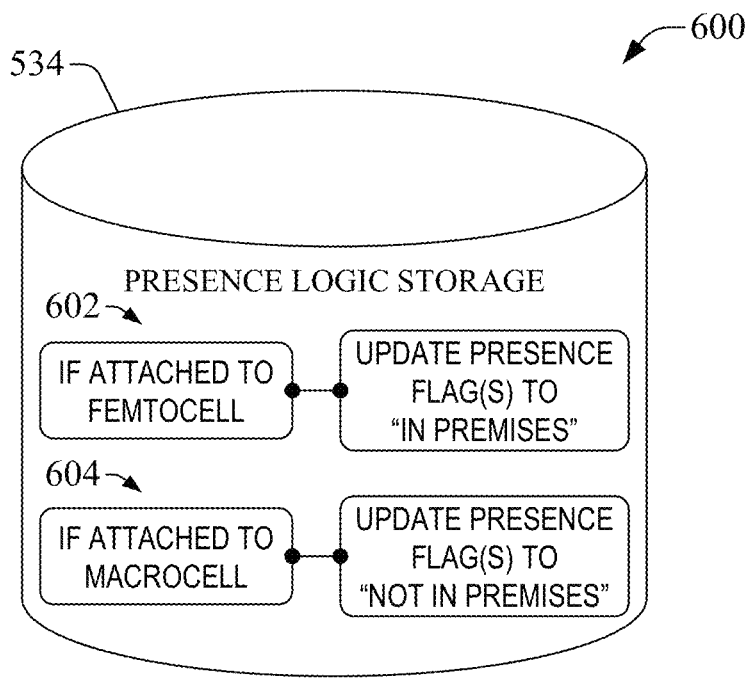
FIG. 6 is a diagram of an example presence logic storage in accordance with aspects of the subject disclosure.

FIG. 5 is a block diagram of an example system 500 to update femtocell presence intelligence in accordance with aspects described herein. An update to the femtocell presence intelligence includes creation or modification of the femtocell presence intelligence. Presence client component 510, also referred to as presence client 510 in the subject disclosure, can detect attachment of a mobile device of a subscriber that has access to a customized routing service to a femtocell access point (e.g., femto AP 320 or femto AP 430), and update a presence condition record within presence logic storage 534 in memory 530. Presence client 510 also can detect detachment of the mobile device from the femtocell AP, or attachment of the mobile device to a macrocell base station. As illustrated in diagram 600 of an example presence logic storage 634 in FIG. 6, attachment to femtocell results in update of a presence condition record to "In Premises" (or "At Home") value; see blocks 602. Attachment to a macrocell base station, or detachment from the femtocell AP, results in update of the presence condition record to "Not In Premises" (or "Not at Home") value; see blocks 604. A presence condition records can be a logical presence flags, as illustrated in diagram 600.

Presence client component 510 also can notify presence server 440, through interface 515, of an updated presence condition record. In an aspect, presence client component 510 can notify of the updated presence condition record through one or more communication protocols, proprietary or otherwise, such as SIP, XDMS, XML Configuration Access Protocol (XCAP), Hypertext Transfer Protocol (HTTP), or the like. As described supra, presence server 540 can retain payload data (e.g., data 542) available in the notification within memory element 534 in memory 530. In another aspect, interface 515 can be embodied in at least one of conventional link(s) (e.g., a fiber optic link, an Ethernet link, a T1/E1 line . . . ), reference link(s) (e.g., Gi, Gn . . . ), or one or more components of an access network or a core network.

In an aspect, presence client 510 can be embodied in a software application or firmware application comprising one or more sets of code instructions retained in a memory (e.g., memory 530) that when executed by at least one processor (not shown in FIG. 5) provide, at least in part, the described functionality of presence client 510. In an aspect, memory 530 can be part of the mobile device that attaches/detaches from the femtocell AP and the at least one processor can be a processor that provides functionality of such mobile device.

Figure 7:
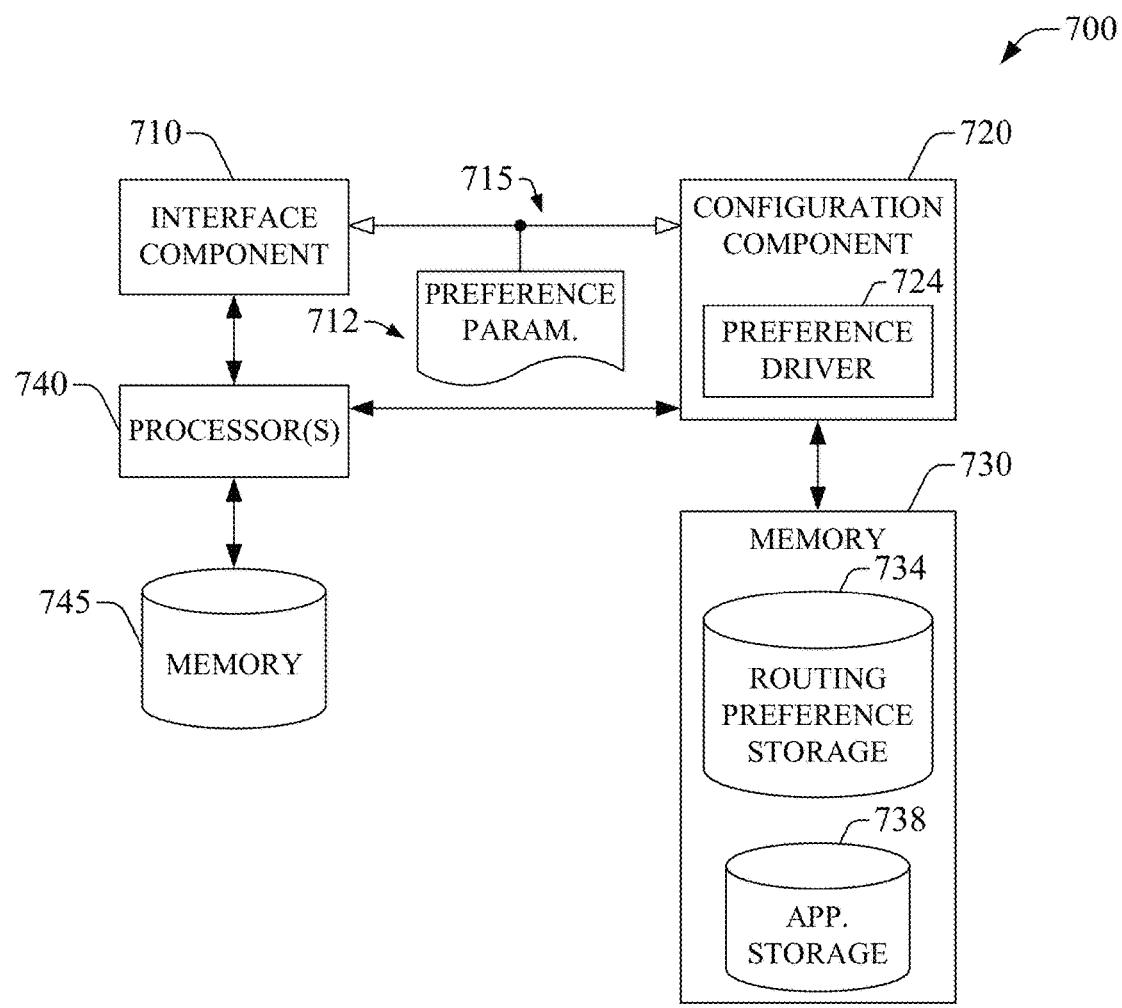
FIG. 7 is a block diagram of an example system that enables configuration of one or more routing preferences for customized call processing in accordance with features disclosed herein.

FIG. 7 is a block diagram of an example system 700 that enables configuration of a routing preference for customized call processing, or personalized call processing, in accordance with features disclosed herein. Configuration includes at least one of generation, deletion, or modification, and can be effected by a subscriber via, at least in part, a user device (e.g., a handset) or apparatus (e.g., a service kiosk computer in a service provider facility). Accordingly, such configuration results in routing preferences that are specific to the subscriber or that is personalized to the subscriber by the subscriber. Interface component 710 can supply at least one preference parameter 712 through interface 715; such preference parameter(s) can define a routing preference to be applied based at least on femtocell presence intelligence. Configuration component 720 receives the at least one preference parameter 712 and commits such parameter(s) to routing preference storage 734 within memory 730; to at least such ends, preference driver 724, or preference driver component 724, can execute a software application or a firmware application retained in application storage 738. The software application or the firmware application is stored as at least a set of one or more code instructions.

In an embodiment of example system 700, interface component 710 can be remote to configuration component 720, which can be part of configuration server 460. In such embodiment, interface component 710 can be part of a user device that (i) supplies and consumes data and signaling, and (ii) renders a configuration environment to define at least one routing preference in response to preference driver 724 executing the software application or firmware application. In an aspect, interface component 710 can be a display interface that is part of the user device. The user device can be a mobile device (e.g. cellphone) associated with a subscriber that configures at least one routing preference for personalized routing as described herein; a personal computer, pseudo-stationary or portable (laptop, notebook, netbook, etc.); a PDA, a television set top box for IP television (IPTV); or the like. In another aspect, configuration component 720 can be a web server that enables a configuration web portal when preference driver 724 executes the software application or the firmware application retained in application storage 738; the configuration environment rendered by the interface component 710 is at least a portion of the web portal. In such an embodiment, memory 730 is the same or substantially the same as memory 450 and memory element 734 is substantially the same or the same as routing preference(s) storage 458. In addition, interface 715 can be embodied in at least one of conventional link(s) (e.g., a fiber optic link, an Ethernet link, a T1/E1 line . . . ), reference link(s) (e.g., Gi, Gn . . . ), or one or more components of an access network or a telecommunication network platform (e.g., core network).

In another embodiment of example system 700, interface component 710, configuration component 720, memory 730, and memory 745 can be integrated in a single apparatus, e.g., a user device. Interface 715 can be at least one of a bus architecture or internal programming interfaces (not shown) retained in memory 730; the bus architecture can include at least one of a system bus, a memory bus, an address bus, or a message bus. In such an embodiment, configuration component 720 can deliver data (e.g., data 462) that includes the at least one preference parameter 712 to customization server 460 (not shown in FIG. 7); delivery can be effected in peer-to-peer modality in accordance with one or more communication protocols (e.g., XDMS, XCAP . . . ). In addition, routing preference storage 734 can operate as a data cache to store the at least one preference parameter 712 in accordance with a retention protocol (not shown) which can be stored in memory 730. The retention protocol can be configured statically or dynamically and includes a set of predetermined parameters (e.g. an inactivity period, priority ranking(s) . . . ) that dictate preservation or removal of data in memory element 734. In the subject embodiment, interface component 710 also can provide the functionality of a presence client component (e.g., 610).

Processor(s) 740 represent a set of one or more processors configured to enable, or that enable, at least part of the functionality of interface component 710 and configuration component 720. To implement or provide at least part of the described functionality of interface component 710 and configuration component 720, processor(s) 740 can execute one or more sets of code instructions (not shown) stored in one or more of memory 745 or memory 730. The one or more sets of code instructions can include program modules or software applications or firmware applications that, when executed by processor(s) 740, implement specific tasks which can be accomplished through at least one of the example methods described in the subject specification and that are associated, at least in part, with functionality of example system 700. While illustrated as stand-alone functional element(s), in certain embodiments of example system 700, processor(s) 740 can be distributed amongst interface component 710 and configuration component 720 to provide at least part of the described functionality thereof. Additionally, in an alternative or additional embodiment, interface component 710 can reside, at least in part, within memory 745 as one or more sets of code instructions that, when executed by processor(s) 740, implement each of such components and the described functionality thereof. Likewise, in such alternative or additional embodiment, configuration component 720, or at least one component thereof, also can reside within memory 730 (e.g., within application storage 738) as one or more sets of code instructions that, when executed by processor(s) 740, carry out the described functionality of configuration component 720, or the at least one component therein. Either memory 745 or memory 730, or both of these memories, can be a centralized element or a distributed element, and each can include any memory element described in connection with example system 700.

FIGS. 8A-8C illustrate a set of three example user interfaces 800-860 that can be rendered as part of configuration of a communication routing service based in part on at least one of a femtocell presence condition and one or more routing preferences in accordance with aspects described herein. Interface component 810, or one or more components therein or functionally coupled thereto, can render (e.g., display) the subject UIs. Example UI 800 illustrates a menu of options to configure a routing service for a specific device based on location, or presence condition. As illustrated, location menu 802 offers two alternatives compatible with available categories of presence condition records: "In Premises" and "Not in Premises." Example UI 830 presents selection 832 of "In Premises" category. Menu 834 renders a list of two mobile devices (Mobile 1 and Mobile 2); however, menu 834 can include additional optional mobile devices. Example UI 860 presents selections 832 and 834, wherein the latter indicates "Mobile 1" has been selected for configuration of a specific service (e.g., "Intrinsic" or "Other"), as rendered in selection 868. "Other" service category can include various wireless services supplied through femtocell wireless communication, e.g., integral control of networked home devices (e.g., on/off, timer, file sharing, etc.)

FIGS. 9-11 illustrates example user interfaces that can be rendered as part of configuration of a communication routing service based in part on at least one of a femtocell presence condition and one or more routing preferences in accordance with aspects described herein. In example UI 900, Indicia 904 indicates selection of "Not in Premises"

presence condition category, whereas indicia 908 presents an illustrative set of four devices (Mobile 2 and Auxiliary Device (Aux.) 1-Aux. 3) that can be employed to route an incoming communication in accordance with at least one routing preference and as part of an offloading service. In an aspect, based on presence intelligence, the offloading service can direct a specific incoming communication and content thereof to an auxiliary device better suited for a subscriber to consume the content. For example, a picture included an incoming communication directed to a mobile device can be offloaded to a digital media frame within the confined area served by a femtocell AP on which the mobile device is registered, and thus has an "In Premises" presence condition. As part of the offloading service, routing component 424 can analyze the content of an incoming call 402 in preparation for offloading the content in accordance with at least one routing preference and a femtocell presence condition record.

Example UI 1000 is directed to configuration of at least one routing preference for "Not in Premises" category of presence condition. Indicia 1004 illustrates a configured routing preference that establishes an incoming communication (e.g., incoming call 204) is routed to Mobile 1 (e.g., a subscriber's cellphone) if intended for Mobile 1. In addition, the configured routing preference establishes that the incoming communication is offloaded to device Aux. 1, which can be an auxiliary wireline device. A soft button 1008 allows to include an additional routing preference associated with a set of mobile devices (e.g., Mobile 1 and Mobile 2). Indicia 1012 conveys additional routing preferences the direct an incoming communication (e.g., incoming call 204) to Mobile 1 if the incoming call is intended to device Wireline 1 or to device Wireline 3. In an aspect, indicia 1016 illustrates rendition of content, or information, as a result of actuating soft button 1020 ("Add" button) to configure an additional routing preference; in an aspect, the actuating can be implemented via various gestures (touch, speech, movement, etc.). Indicia 1016 presents a set of wireline devices that can be selected as prospective destination addresses that result in routing of an incoming communication to wireless device "Mobile 1".

With respect to example UI 1100, various routing preferences are illustrated for wireless device "Mobile 1." Routing preferences 1104 establish that incoming communication(s) intended to Mobile 1 are to be routed to Mobile 1 and to Wireline 1 (e.g., home manager IP-based telephone). Indicia 1112 illustrate a menu of optional devices allowed to be utilized in a routing preference; the menu can be toggled on via actuation of soft button 1120. It should be noted that the menu presents "Mobile 2" as an optional device, such device can be a wireless device authorized to receive femtocell service through the femtocell AP that determines presence condition of the wireless device (e.g., "Mobile 1") for which the example UI 1100 is employed to configure a routing preference. Identity of the wireless device "Mobile 2" can be extracted from an access control list associated with the femtocell AP that determines presence condition; the identity can convey a number, code, or token for the wireless device and a tag the characterizes ownership (e.g., owned by fried, owned by employee, owned by relative) thereof. Characterization of ownership can guide, at least in part, configuration of a routing preference.

Example UI 1100 also enables generation of one or more routing preferences that direct an incoming communication (e.g., a SMS message) to all available wireline devices (e.g., POTS home telephones, home manager telephone, . . . ) in case "All Wireline" option is selected; in FIG. 11 such option is unchecked. Routing preferences 1108 disclose that an incoming communication intended to Mobile 1, Wireline 1, or Wireline 3 are routed to Mobile 1; for instance, a VoIP call session intended for PC 308 can be directed to mobile device 316. Soft button 1124 can be actuated to render support information for at least one of configuration of a routing preference, registration of a mobile device or wireline device to be included in menus of available devices, or the like. In an aspect, identity of a wireline device can be extracted through various mechanisms, which can be implemented by a configuration component, or a processor that enables, at least in part, the functionality of the configuration component: (1) Device handshake. The configuration component that transmits a directive to render a configuration environment can deliver a request for identification data to one or more devices provisioned in a wireline network (e.g., broadband network for packet-based services) with an associated physical address (e.g., billing address) that matches the physical address of a femto AP employed as reference for presence intelligence. In response, an active wireline device can acknowledge the request and deliver the identification data, which can be employed to populate a menu of available devices. (2) Identification data mining. The configuration component extracts identification data for a wireline device provisioned in the wireline network and that has a physical address that matches the physical address of the femto AP. It should be appreciated that in one or more embodiments, actuation of soft-button 1120 does not provide a set of pre-populated fields but rather an empty form field into which data can be entered to identify a device, wireless or otherwise, to which a communication is intended to or to which the communication is to be routed to. In addition, configuration of one or more routing preferences is specific to a subscriber that utilizes customized communication routing service; data received by a device that renders one or more of the user interfaces described herein (e.g., 900, 1000, 1100) is provided by the subscriber and thus the one or more routing preferences are personalized routing preference(s).

It should be appreciated that in FIGS. 9-11, mobile devices or wireline devices are identified with tags "Mobile 1," "Mobile 2;" "Wireline 1," "Wireline 2," "Wireline 3," "Wireline 4," "Wireline 5;" and "Aux. 1," "Aux. 2," and "Aux. 3." Each of those tags can be one of various device identifiers, codes or tokens that uniquely identify a device, such as an international mobile subscriber identity (IMSI), temporary IMSI (TIMSI), a mobile subscriber integrated services digital network (MSISDN), an international mobile equipment identifier (IMEI), a mobile directory number (MDN), a mobile identification number (MIN), a Telecommunications Industry Association (TIA) electronic serial number (ESN), or a multi-bit identification number like the mobile identity number (MEID).

Figure 12:
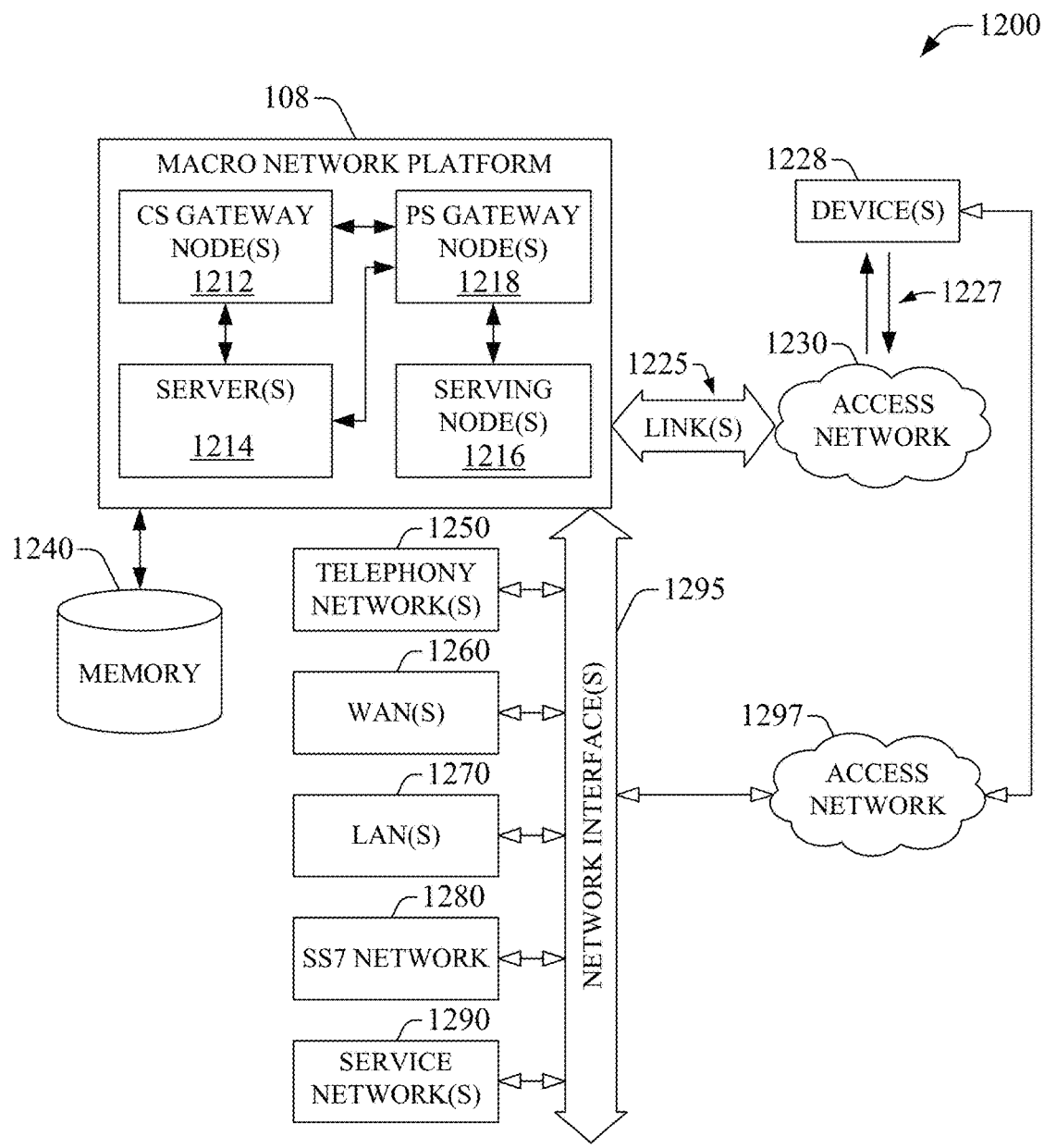
FIG. 12 presents a high-level block diagram of an example network environment that can enable aspects described herein.

FIG. 12 presents a high-level block diagram of an example network environment 1200 that can enable implementation and exploitation of various aspects described in the subject disclosure. Macrocell (macro) network platform 108 can include one or more functional elements, e.g., component(s), node(s), gateway node(s), interface(s), server(s), or platform(s) that enable both packet-switched (PS) (e.g., internet protocol (IP), frame relay, asynchronous transfer mode (ATM)) and circuit-switched (CS) traffic (e.g., voice and data) and control generation for networked communication, wireless or otherwise. It should be appreciated that in cellular wireless technologies (e.g., 3GPP UMTS, HSPA, 3GPP LTE, 3GPP UMTS, 3GPP2 UMB), macro network platform 2810 embodies a core network. PS gateway node(s) 1218 can embody at least part the PS domain.

Functional element within the PS domain can enable exchange of notifications, indications, and directives in accordance with various networked communication protocols indicated herein, including one or more peer-to-peer transport protocol(s). With respect to CS communication, macro network platform 108 includes CS gateway node(s) 1212, which can interface CS traffic received from legacy networks like telephony network(s) 1250 (e.g., public switched telephone network (PSTN), or public land mobile network (PLMN)) or a SS7 network 1280. CS gateway node(s) 1212 also can enable exchange of messaging communications in SMS protocol. In addition, CS gateway node(s) 1212 can authorize and authenticate traffic (e.g., voice) arising from such networks. Moreover, CS gateway node(s) 1212 can access mobility, or roaming, data generated through SS7 network 1260 in response to various mobility events as described herein; for instance, the mobility data can be stored in a VLR, which can reside in memory 1240. Furthermore, CS gateway node(s) 1212 can interface CS-based traffic or signaling with PS gateway node(s) 1218. As an example, in a 3GPP UMTS network, CS gateway node(s) 1212 can be embodied, at least in part, in gateway GPRS support node(s) (GGSN).

In the subject disclosure, in addition to receiving and processing CS-based traffic and signaling data, PS gateway node(s) 1218 can authorize and authenticate PS-based data sessions (e.g., an incoming call 204, or setup call 224) with device(s) 1228 served through access network 1230 via link(s) 1225 and link(s) 1227, which include wireline links (e.g., reference links) or wireless link(s) (e.g., line-of-sight (LOS) links). Device(s) 1228 is a set of devices that includes wireless device(s), wireline device(s), or a combination thereof. For example, device(s) 1228 can include a mobile device of a subscriber that exploits customized communication routing as described herein, and a set of wireline devices (e.g., 308, 312, 214) that operate within service coverage area (e.g., 302) served by a femtocell AP (e.g., 320).

Access network(s) 1230 can include one or more components that enable transmission of data and signaling, including related payload data, amongst device(s) 1228 and macro network platform 108; access network(s) 1220 can be part of access network(s) 152 and operate in substantially the same or the same manner thereof. Access network(s) 1230 can include a radio access network (RAN), and associated component(s). The RAN comprises one or more outdoor-based (or outdoor) base stations, and associated electronic circuitry, and respective deployment site(s) of the one or more outdoor base stations. In addition, the RAN includes the air-interface, which comprises a least one wireless radio link operated in accordance with the base station(s) radio technology. It should be noted that the RAN comprises various coverage cells such as cell 105. For a wireless device served by base station(s) (not shown), one or more network components that are part of a radio access network in access network 1230 enable transmission of data and signaling. For wireline devices, one or more components that are part of a wireline network (e.g., service network(s) 1290) enable the transmission of data and signaling. Link(s), represented with open arrows, operationally connected to network interface(s) 1295 can deliver data and signaling to the wireline device via the one or more components of the wireline network, for example represented by access network 1297, and related link(s) represented with open arrows connecting the access network 1297 to device(s) 1228. Data sessions (e.g., an incoming call 204, or setup call 224) can include traffic exchange with networks external to network platform 1210, such as wide area network(s) (WAN(s)) 1260 or service network(s) 1290; local area network(s) (LAN(s)) 1270 (e.g., enhanced 911) also can be interfaced with macro network platform 108 through PS gateway node(s) 1218. Network interface(s) 1295 enable the traffic exchange; such interface(s) can include conventional wireline or wireless links, or reference links specific to each of the external network(s) that interface with PS gateway node(s) 1218, or other portions of the PS domain in macro network platform 108. In an aspect, PS gateway node(s) 1218 can generate packet data protocol (PDP) contexts when a data session is established. To at least that end, in an aspect, PS gateway node(s) 1218 can include a tunnel interface (e.g., tunnel termination gateway (TTG) in 3GPP UMTS network(s) (not shown)) which can facilitate packetized communication with disparate wireless network(s), which can be part of access network(s) 1220 and can include Wi-Fi networks, femtocell network(s), macrocell network(s) and associated radio access network(s) (RAN(s)) based on various radio technology generations, etc. It should be further appreciated that packetized communication can include multiple flows of data that can be generated through server(s) 1214, such as management server(s) (e.g., a provisioning server, a MSC) or application server(s), which can implement at least a part of the functionality of customized routing server 420, presence server 440, or customization server 460. It is to be noted that in 3GPP UMTS network(s), PS gateway node(s) 1218 (e.g., GGSN) and tunnel interface (e.g., TTG) comprise a packet data gateway (PDG).

In network environment 1200, network platform 1210 also includes serving node(s) 1216 that conveys the various packetized flows of data streams that can be directed to device(s) 1228, and that are received through PS gateway node(s) 1218 from server(s) 1214. In turn, server(s) 1214 can receive the communication(s), such as request for data intended to service network(s) 1280, which can include an IMS core or other packet-based cores, from user equipment within device(s) 1228 or network elements (e.g., customized routing server 420 requests presence information from a HSS). As an example, in a 3GPP UMTS network, serving node(s) 1216 can be embodied in serving GPRS support node(s) (SGSN). As another example, in a 3GPP LTE network, service node(s) 1216 can be embodied in a Mobility Management Entity (MME).

Server(s) 1214 can operate in various layers of macro network platform 108. For example, server(s) 1214 can operate as part of Operations Support Systems (OSS), Business Support Systems (BSS), or network subsystems such as IMS core network. In addition to embodying one or more of customized routing server 420, presence server 440, or customization server 460, and enabling functionality thereof as described herein, server(s) 1214 can execute numerous applications, which can include consumer-oriented application(s), such as messaging services, location services, online gaming, wireless banking, or system-oriented applications, e.g., wireless device management, scheduling or queuing of network traffic, or the like. Such application(s), either consumer-oriented or system-oriented, can generate sets of packetized data streams or flows, and manage (e.g., schedule, queue, format . . . ) such flows. Such application(s), for example can include add-on features to standard services provided by mobile network platform 1210; in an aspect, the add-on features can include the customized communication processing described herein. Data streams generated by server(s) 1214 can be conveyed to PS gateway node(s) 1218 for authentication/authorization and initiation of a data session (e.g., an incoming call 204, or setup call 224), and to serving node(s) 1216 for communication to device(s) 1228 thereafter.

Server(s) 1214 also can effect security (e.g., implement one or more firewalls) of macro network platform 108 to ensure network's operation and data integrity in addition to authentication and authorization procedures that CS gateway node(s) 1212 and PS gateway node(s) 1218 can enact. In addition, server(s) 1214 can implement timing protocols (e.g., Network Time Protocol (NTP)) that supply timing framework(s) for various operation(s) of macro network platform 108. Moreover, server(s) 1214 can provision services from external network(s), e.g., WAN 1260, LAN(s) 1270, IMS core network, which can be part of service network(s) 1290, or Global Positioning System (GPS) network(s) (not shown). Server(s) 1214 can include one or more processors (not shown) configured to provide or that provide, in part, the functionality of macro network platform 108. To that end, the one or more processors can execute one or more sets of code instructions (not shown) stored in memory 1240, for example.

In example network environment 1200, memory 1240 can store information related to operation of macro network platform 108. Information can include content(s), such as subscriber-generated content or from various other sources; subscriber account(s) and associated credential(s); pricing schemes, e.g., promotional rates, flat-rate programs, couponing campaigns; and so forth. Memory 1240 also can store data related to implementation of customized communication routing described in the subject disclosure; for instance, in an aspect, memory 1240 can retain at least part of one or more of presence intelligence 434, routing preference(s) storage 458, or routing logic 454. In addition, memory 1240 can store information from at least one of telephony network(s) 1250, WAN(s) 1260, LAN(s) 1270, SS7 network 1280, or service network(s) 1290. While illustrated as a single entity, memory 1240 can be distributed amongst one or more of the described external networks, server(s) 1214, or other functional elements of network platform 1210. Memory 1240 can be embodied at least in part in a VLR, a HSS, or storage available within a consolidated data repository that centralizes data (administrative data, operational data, etc.) for at least macro network platform 108.

Figure 13:
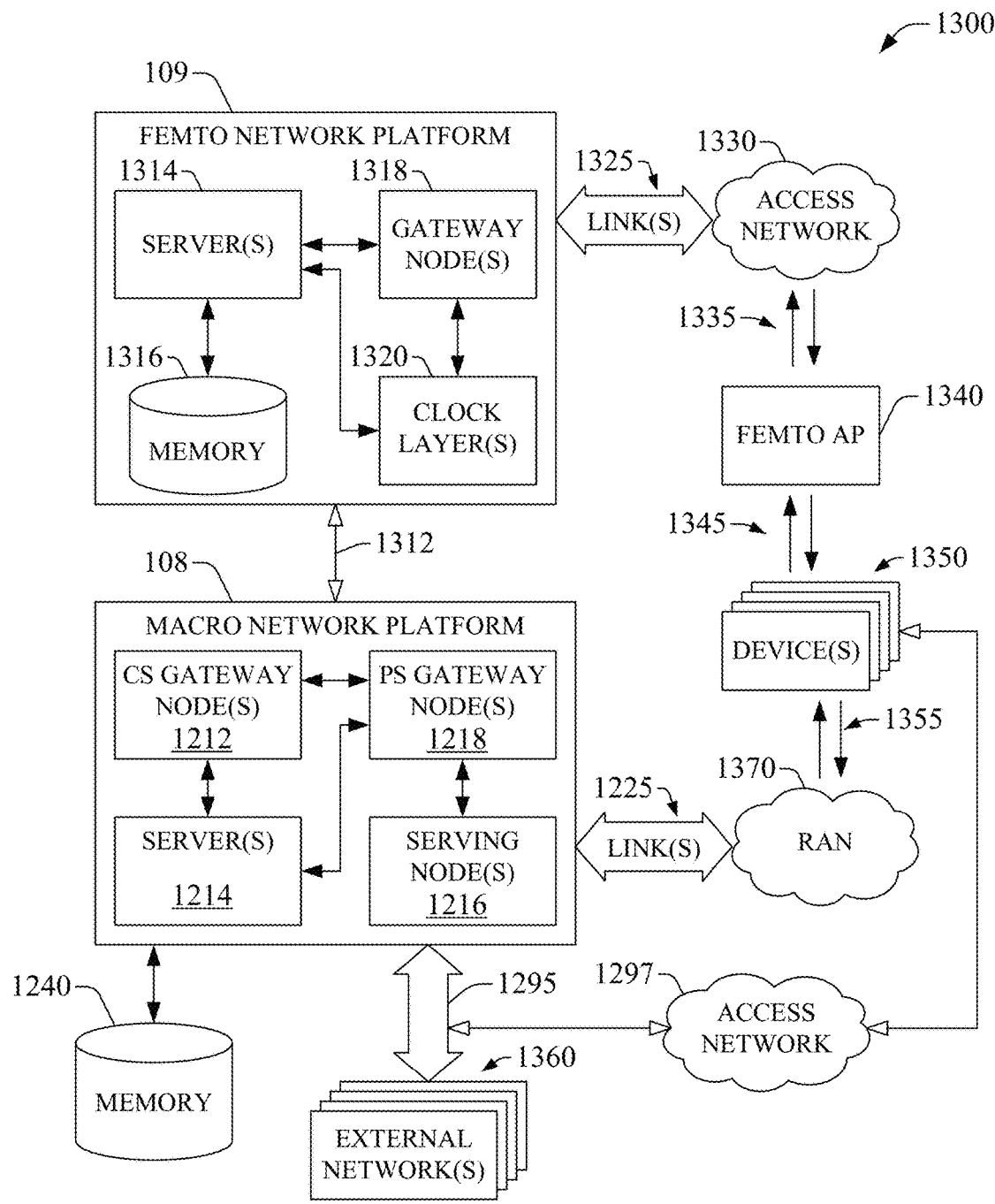
FIG. 13 illustrates an example wireless network environment that includes femtocell and macrocell platforms that can enable aspects or features described herein.

FIG. 13 illustrates an example wireless network environment 2800 that includes a femto network platform and a macro network platform that can enable aspects or features described in the subject disclosure. Macro network platform 108 operates as described supra, and can serve or exchange traffic and signaling communication with wireless devices in the set of one or more devices 1350 via macro radio access network (RAN) 1370 and associated link(s) 1225 and wireless link 1355. As indicated supra, the macro RAN comprises one or more outdoor-based (or outdoor) base stations, and associated electronic circuitry, and respective deployment site(s) of the one or more outdoor base stations; the outdoor-based base stations serve or are intended to serve outdoor areas. The macro RAN also includes the air-interface, which comprises a least one wireless radio link operated in accordance with the base station(s) radio technology. Femto network platform 109 can serve or exchange traffic and signaling with a mobile device in the set of one or more devices 1350 through access network 1330, which is linked to the femto network platform 109 via backhaul link(s) 1325, and a femtocell (femto) AP 1340 and associated wireless link(s) 1345 and wired link(s) 1335. Access network 1330 is part of access network(s) 152, and femto AP 1340 can operate in accordance with aspects described herein. It should be appreciated that femto AP 1340 can be part of access network 1330; however, in the illustrated embodiment, femto AP 1340 is represented as customer premise equipment separate from the access network 1330.

Femto network platform 109 includes component(s), node(s), gateway node(s), interface(s), server(s), or platform(s) that enable both packet-switched (PS) communication (e.g. IP-based communication, frame relay communication, ATM communication . . . ) and generation of control signaling for networked wireless communication. In an aspect, femto network platform 109 includes femto gateway node(s) 1318, which have substantially the same functionality as PS gateway node(s) 1218. Femto gateway node(s) 2884 also can include substantially all or all functionality of serving node(s) 1216. In an aspect, disparate femto gateway node(s) 2884 can control or operate disparate sets of deployed femto APs. Femto network platform 109 also includes clock layer(s) 1320, which can include the clock strata of network time protocol (NTP) and thus supply various time-based utilities and one or more time records.

Server(s) 1314 have substantially the same functionality as described in connection with server(s) 1214. In an aspect, server(s) 1314 can execute multiple application(s) that provide service (e.g., voice and data) to wireless devices served through access network 1330 and associated femto AP(s). Server(s) 1314 also can provide security features to femto network platform 109. Moreover, server(s) 1314 can manage (e.g., schedule, queue, format . . . ) substantially all packetized flows (e.g., IP-based flows, frame-relay-based flows, ATM-based flows . . . ) the server(s) 1314 generates in addition to data received, via interface 1312 (reference link(s), wireless link(s), various bus architectures, etc.), from macro network platform 108. Furthermore, server(s) 1314 can provision, at least in part, femtocell service and exchange signaling, and related payload data, with one or more network components that effect activation of the femtocell service. Further yet, server(s) 1314 also implement operations and maintenance (O&M) procedures associated with at least one femto AP and one or more functional elements in femto network platform. In one or more embodiments, server(s) 1314 can include one or more processors configured to enable or that enable, at least in part, the functionality of femto network platform 109. To that end, the one or more processors can execute one or more sets of code instructions stored in memory 1316, for example.

Memory 1316 also can retain information relevant to operation of the various components of femto network platform 109 and femtocell service provided to one or more subscribers. For example operational information that can be stored in memory 1316 can comprise subscriber intelligence, such as physical address(es), billing preference(s) and plan(s), one or more records of incidents; contracted services, which can include media entertainment, gaming, or the like; maintenance and service records related to femtocell service; femtocell configuration, including devices authorized for femtocell service and authorized subscribers (e.g., access control list(s)) associated with one or more deployed (e.g., provisioned and active) femto APs; service policies, such as service priority for a device attached to a deployed femto AP, and equipment specifications; privacy policies; add-on features, which can include parental controls; and so forth. In one or more embodiments, memory 1316 can retain at least part of one or more of presence intelligence 434, routing preference(s) storage 458, or routing logic 454.

Figure 14:
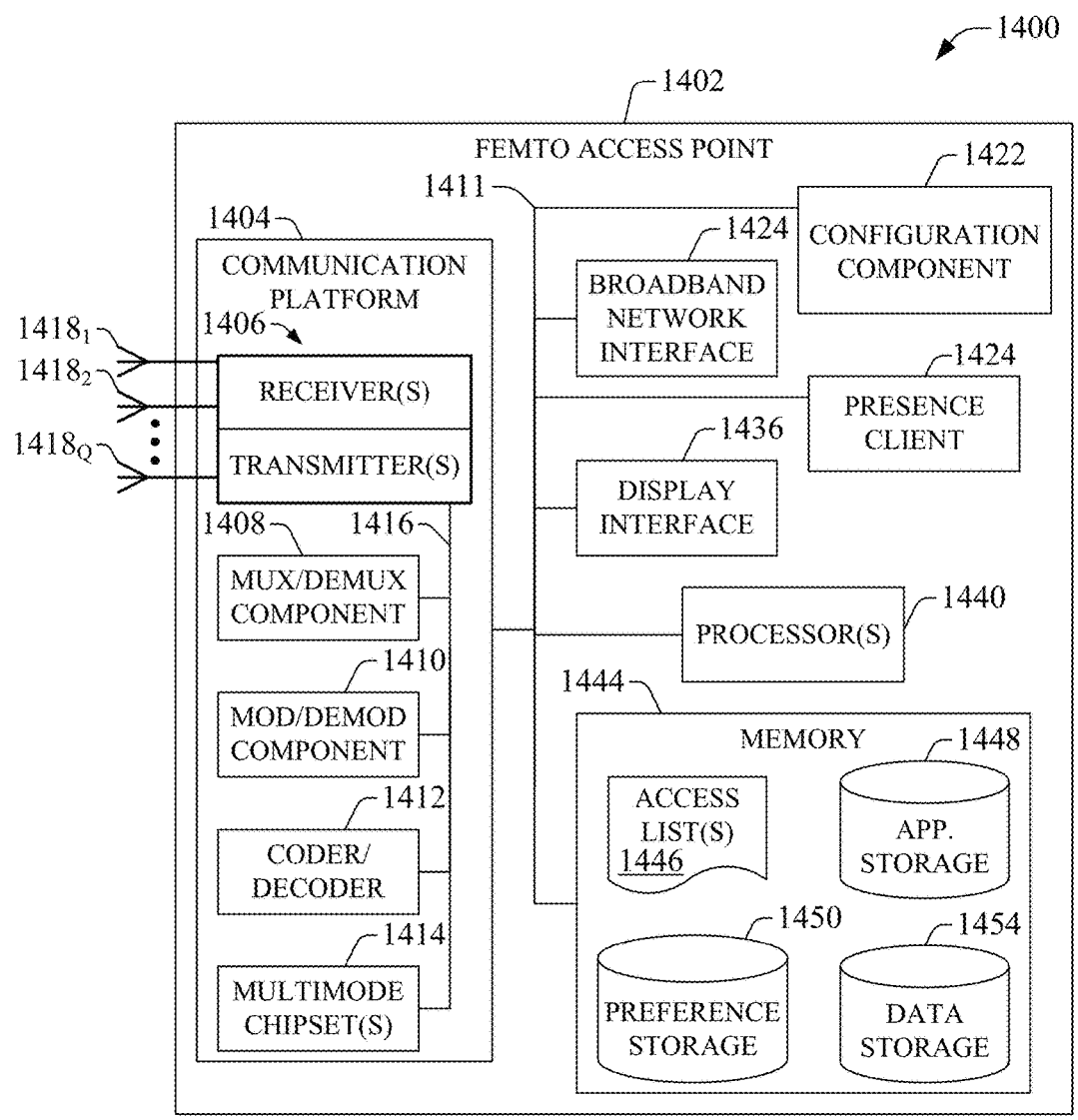
FIG. 14 illustrates an example embodiment of a confined-coverage access point that can operate in accordance with aspects of the subject disclosure.

FIG. 14 illustrates an example embodiment 1400 of a femtocell AP 1402 that can operate in accordance with aspects of the subject disclosure. Femtocell AP 1402 can embody one or more femto AP, or any other confined-coverage access point referred to and described herein. To enable wireless service, femto AP 1402 includes communication platform 1404. Communication platform 1404 comprises a set of receiver(s)/transceiver(s) 1406. While each transceiver in the set includes an antenna $1418_\kappa$, with $\kappa=1, 2, \ldots Q$, with Q a natural number greater or equal than unity. In the subject disclosure, receiver(s)/transceiver(s) 1406 can transmit and receive signal via broadband network interface 1432 and antennas $1418_\kappa$.

Communication platform 1404 comprises electronic components and associated circuitry that enable processing and manipulation, e.g., coding/decoding, deciphering, modulation/demodulation, of signal(s) received by femto AP 1402 and signal(s) to be transmitted by femto AP 1402; received or transmitted signal(s) are modulated and coded, or otherwise processed, in accordance with various radio technology protocols (e.g., 3GPP UMTS, 3GPP LTE . . . ). Components, or functional elements, in communication platform 1404 exchange information through a bus 1416; information includes data, code instructions, signaling and related payload data, or the like, and the bus 1416 can be embodied in at least one of a system bus, and address bus, a data bus, a message bus, or a reference link or interface. The electronic components and circuitry can include the set of Q receiver(s)/transmitter(s) 1406 and component(s) therein, a multiplexer/demultiplexer (mux/demux) component 1408, a modulator/demodulator component 1410, a coder/decoder 1412, and a set of one or more chipsets, e.g., multi-mode chipset(s) 1414. Receiver(s)/transmitter(s) 1406 can convert signal from analog to digital and vice versa. In addition, receiver(s)/transmitter(s) 1406 can divide a single data stream into multiple parallel data streams, or perform the reciprocal operation; such operations are typically conducted in various multiplexing schemes. Functionally coupled to receiver(s)/transmitter(s) 1406 is a multiplexer/demultiplexer (mux/demux) component 1408 that enables processing or manipulation of signal(s) in time and frequency space or domain. Electronic mux/demux component 1408 can multiplex and demultiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1408 can scramble and spread information (e.g., codes) according to substantially any code; e.g., Hadamard-Walsh codes, Baker codes, Kasami codes, polyphase codes, and so on. A modulator/demodulator (mod/demod) component 1410 also is a part of communication platform 1404, and can modulate and demodulate information according to various modulation techniques, such as frequency modulation (e.g., frequency-shift keying), amplitude modulation (e.g., M-ary quadrature amplitude modulation (QAM), with M a positive integer; amplitude-shift keying (ASK)), phase-shift keying (PSK), and the like. In embodiment 1400, mod/demod component 1410 is functionally coupled to mux/demux component 1408 via bus 1416. In addition, processor(s) 1440 enables, at least in part, femto AP 1402 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc.

Communication platform 1404 also includes a coder/decoder 1412 that operates on data in accordance with one or more coding/decoding schemes suitable for communication, at least in part, through one or more receivers(s)/transmitter(s) 1406. In an aspect, the coding/decoding schemes, or related procedures, can be retained as a group of one or more code instructions in memory 1444. When telecommunication through one or more transmission point(s) (not shown) associated with femto AP exploits multiple-input multiple-output (MIMO), multiple-input single-output (MISO), single-input multiple-output (SIMO) or single-input single-output (SISO) operation, coder/decoder 1412 can implement at least one of space-time block coding (STBC) and associated decoding; or space-frequency block (SFBC) coding and associated decoding. Coder/decoder 1412 also can extract information from data streams coded in accordance with spatial multiplexing scheme. To decode received information, e.g., data or control, coder/decoder 1412 can effect at least one of computation of log-likelihood ratios (LLR) associated with constellation realization for a specific demodulation; maximal ratio combining (MRC) filtering, maximum-likelihood (ML) detection, successive interference cancellation (SIC) detection, zero forcing (ZF) and minimum mean square error estimation (MMSE) detection, or the like. In addition, to operate in the manner described herein, coder/decoder 1412 can employ, at least in part, mux/demux component 1408 and mod/demod component 1410.

In addition, communication platform 1404 can process (code, decode, format, etc.) signal(s) originated in a wireless environment within a set of one or more electromagnetic (EM) radiation frequency bands, also referred to as frequency bands in the subject specification. The set of EM frequency bands can comprise radio frequency (RF) portion(s) and microwave portion(s) of the EM spectrum, although other spectral regions such as infrared (IR) also can be included. In addition, in one aspect, the set of EM radiation frequency bands can include at least one of (i) all or substantially all licensed EM frequency bands, or (ii) all or substantially all unlicensed frequency bands currently available for telecommunication. It is noted that the set is configurable and can be upgraded to incorporate frequency bands, or frequency carriers therein, as such bands or carriers become available for telecommunication, e.g., auctioned for utilization or authorized for free-of-charge utilization. Communication platform 1404 also can operate in accordance with a configurable set of radio technologies, or communication protocols thereof; procedures that when executed, for example, by a processor, implement the communication protocols can be retained in memory 1444. As new radio technologies become standardized, or available, a network operator that provides telecommunication service via femtocell network can introduce such technologies in the set of radio technologies that can be utilized for telecommunication through a femto AP 1402 deployed in a confined restricted area.

In embodiment 1400, multimode chipset(s) 1414 can enable femtocell AP 1402 to operate in multiple communication modes through various radio network technologies (e.g., second generation (2G), third generation (3G), fourth generation (4G)) or deep-space satellite-based communication in accordance with disparate technical specifications, or standard protocols, for the radio network technologies or satellite communication. The various radio network technologies being part of the set of radio technologies indicated supra. In an aspect, multimode chipset(s) 1414 can enable, at least in part, communication platform 1404 to operate in accordance with standard protocols specific to a telecommunication mode of operation, e.g., Long Term Evolution (LTE)-based communication. In another aspect, multimode chipset(s) 1414 can be scheduled to operate concurrently in various modes or within a multitask paradigm in which the multimode chipset(s) 1414 operates in a dedicated mode for a specific time interval.

Communication platform 1404 can receive and deliver attachment signaling, which can be exchanged with a mobile device as a result of a mobility event. In one or more embodiments, presence client component 1424 can collect, via a scanner component (not shown) and through communication platform 1404, the attachment signaling. To collect attachment signaling, presence client component 1424, via, for example, the scanner component (not shown), can decode the attachment signaling based at least in part on blind decoding of received signal(s), computation of log-likelihood ratios (LLR) associated with constellation realization for a specific demodulation; maximum likelihood (ML) estimation, minimum mean square equalization (MMSE), zero forcing (ZF) filtering, or maximal ratio combining (MRC) filtering. In response to the attachment signaling, presence client component 1424 can generate a notification of attachment (e.g., IMSI attachment) to femto AP 1402, or a notification of detachment (e.g., implicit detachment or explicit detachment) from femto AP 1402. Presence client component 1424 also can generate a notification of attachment based on signaling exchanged with a mobile device as part of location area update (LAU) or a notification of routing area update (RAU). Presence client component 1424 can supply the foregoing notifications of attachment for delivery through communication platform 1404; to provide a notification of attachment, presence client component 1425 can generate, format or encoded, and convey the notification based on attachment signaling. The foregoing notifications of attachment can be provided by presence client component 1424, or presence client 1424, as described supra (see, e.g., FIG. 6 and related discussion).

In embodiment 1400, femto AP 1402 also includes display interface 1436, which can render various indicia associated with functions that control operation of femto AP 1402 or reveal operation conditions thereof, e.g., available connectivity to backhaul broadband network. In addition, display interface 1436 can convey information to an end user, such as number of currently served mobile devices. Moreover, display interface 1445 can receive one or more directives to render an environment (e.g., display a user interface) to configure at least one routing preference associated with customized communication routing as described herein. The one or more directives can be issued (e.g., generated and delivered) by configuration component 1422, which operates in substantially the same or the same manner as configuration component 820.

Figure 15:
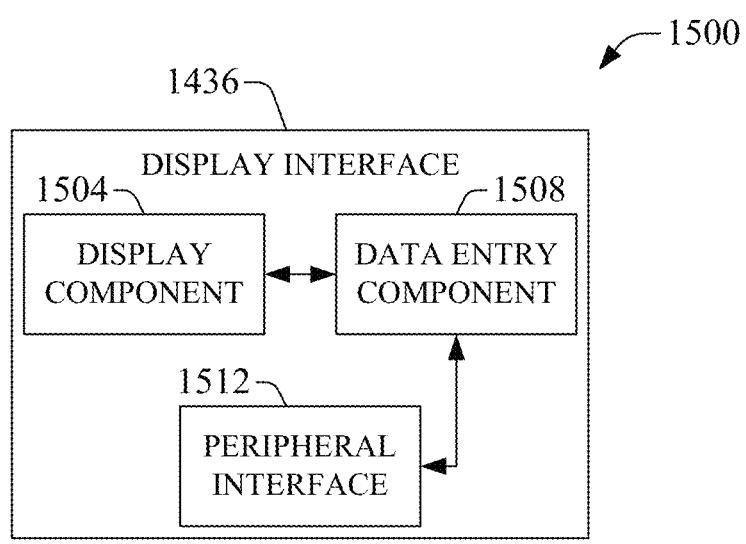
FIG. 15 is a block diagram of a display interface that operates in a confined-coverage access point or other wireless or wireline devices.

Display interface 1436 can convey the environment to configure the at least one routing preference via visual or aural indicia. In an example embodiment 1500 of display interface 1436, see FIG. 15, display component 1504 can render such environment or other content(s) associated with configuration of a routing preference; to at least such end, display component 1504 can convey visual or aural indicia. Various schemes can be employed to render the environment to configure the routing preference, such as, but not limited to, windows-based schemes, e.g., iconic representation, pop-up representation; or text-based representation, with scroll-down or scroll-sideways delivery, or static rendering. In an aspect, display component 1504 can be embodied, at least in part, in a display element within a monitor such as a cathode ray tube (CRT) monitor, a Liquid Crystal Display (LCD) monitor, a plasma monitor, a light emitting diode (LED) monitor, an electrochromic monitor, or the like. Display component 1436 also can enable communication of aural indicia, for example, via speaker(s) (not shown).

In response to rendering a configuration environment to define a set of routing preferences (see, e.g., FIGS. 9-12 and related description), display interface 1436 enables entry of data that defines one or more routing preferences in the set of routing preferences. Display interface 1436 can collect entry of data, through data entry component 1508, that can enable femto AP 1402 to receive external commands (e.g., restart operation) or configuration information (e.g., edit access control list(s) within femto AP 1402 or in administration component within a core network). Display interface 1436 can process (e.g., decode/code), at least in part, received input data and convey it as signaling to one or more functional elements (component(s), platform(s), etc.) or memory 1444 within femto AP 1402. To mitigate fraudulent transaction(s), entry of data can be secured through various credential-based mechanisms, such as password protection, biometric protection, or the like, and an associated secured transport protocol(s) that can include data encryption. In an aspect, one or more sets of code instructions that can be executed to implement such mechanisms can be retained within application (app.) storage 1448.

Various functional elements and associated circuitry that can embody, at least in part, data entry component 1508 enable data input through one or more gestures (e.g., touch, speech, motion), one or more communication protocols. Such functional elements can include a keypad, a touch screen, a microphone, a camera(s); a bar code reader, radio frequency ID (RFID) reader, infrared (IR) wireless-based reader; or the like. In addition, data entry component 1508 also can be functionally coupled to peripheral interface 1512 that enables connection to a peripheral device and communication therewith. As an example, peripheral interface 1512 can allow connection of an external antenna to receive global navigation data, e.g., global positioning system (GPS) data; the antenna can reside in an outer location of a confined restricted area in which example femto AP 1402 is deployed, so the antenna is exposed to open sky. As another example, peripheral interface 1512 can enable connection to disparate femto AP(s). In an aspect, peripheral interface 1512 can include a set of ports, which comprises at least one of parallel ports, serial ports, Ethernet ports, V.35 ports, X.21 ports, wherein parallel ports can comprise General Purpose Interface Bus (GPIB), IEEE-1284, while serial ports can include Recommended Standard (RS)-232, V.11, Universal Serial Bus (USB), FireWire or IEEE-1394.

Femto AP 1402 includes processor(s) 1440 which can be configured to provide or that can provide, at least in part, functionality to substantially any or any component(s), platform(s), interface(s), node(s), and so forth, within femto AP 1402 in accordance with one or more aspects of the described operation of femto AP 1402. Processor(s) 1440 is functionally coupled to each functional element within femto AP 1402 and to memory 1444 through bus 1411, which can be embodied in at least one of a memory bus, a system bus, an address bus, a message bus, or one or more reference link(s) or interface(s). In embodiment 1400, processor(s) 1440 is illustrated as external to the various functional elements (e.g., component(s), interface(s), platform(s), node(s)) of femto AP 1402; however, in additional or alternative embodiment(s), processor(s) 1440 can be distributed amongst a plurality of such functional elements. In some embodiment(s), one or more functional elements that comprise femto AP 1402 can reside within memory 1440 as one or more sets of code instructions that, when executed by processor(s) 1440, implement the various functional elements and described functionality thereof.

Processor(s) 1440 also can supply information to and retrieve information from memory 1444. Such information can enable, at least in part, operation of or can provide, at least in part, functionality to communication platform 1404, and at least a portion of functional elements therein; display interface and functional element(s) therein; as well as other operational components (not shown) of femto AP 1402. The information can include at least one of code instructions, code structure(s), data structures, or the like.

Processor(s) 1440 can execute code instructions stored in memory 1444, for example within app. storage 1448, or other memory(ies) functionally coupled to femto AP 1402, to provide, at least in part, the described functionality of femto AP 1402. Such code instructions can include program modules or software applications or firmware applications that implement various methods described in the subject specification and associated, at least in part, with functionality or operation of femto AP 1402.

Memory 1444 also can retain, at least in part in application storage 1448, at least one of data structures (e.g., objects, classes, metadata); code structure(s) (e.g., modules, procedures) or code instructions; or substantially any type of software application(s) or firmware application(s) that processor(s) 1440 can execute to enable, at least in part, functionality associated with substantially any or any component(s), platform(s), interface(s), or functional element(s) within femto AP 1402 in accordance with aspects described herein. In addition, memory 1444 can store network or device information, e.g., within data storage 1454, such as one or more communication protocol(s) or technical specification(s); code sequences for scrambling or spreading; blind decoding hypotheses; semi-persistent scheduling parameters; frequency offsets, macrocell base station identifiers and femtocell AP identifiers (IDs); address book(s); or the like. Moreover, memory 1444 can retain content(s) such as multimedia files or subscriber-generated data. Furthermore, memory 1444 can retain, e.g., within data storage 1454, security credentials (e.g., passwords, encryption keys, digital certificates, biometric keys such as voice recordings, iris patterns, fingerprints, deoxyribonucleic acid (DNA) profiles); hardware identifying tokens or codes such as at least one of an IMSI, a temporary international mobile subscriber identity (TIMSI), packet TIMSI (P-TIMSI), an IMEI, an MDN, a MIN, a TIA ESN, or a multi-bit identification number such as MEID. It is noted that memory 1444 can include affixed or removable elements such as a subscriber identification module (SIM) card storage, a universal integrated circuit card (UICC) storage, or a removable user identity module (RUIM). In one or more embodiments, at least a portion of memory 1444 and content thereof can be external to femto AP 1402 and linked thereto via a peripheral interface (e.g., 1512).

Memory 1444 also includes access control list(s) (ACL(s)) 1446, which can be employed at least to configure default logic for customized routing of an incoming call, as discussed supra. ACL(s) 1446 enable, at least in part, regulation of access to wireless service supplied through femto AP 1402 and features of supplied wireless service. To at least that end, ACL(s) 1446 can comprise a set of access attributes, which identify devices that can communicate wirelessly and are authorized to receive telecommunication service through femto AP 1402. An access attribute uniquely identifies a device.

An access control list associated with a femtocell AP can enable regulation of access thereto in at least the following manner. If a femtocell AP, e.g., 110, receives attachment signaling (e.g., LAU signaling or RAU signaling in UMTS-based radio technology) originated by a device, e.g., a handset in set 102, the femtocell AP validates an identity of the device, as conveyed in the attachment signaling, against the access control list, e.g., ACL(s), associated with the femtocell AP. If the identity of the device matches a device identifier in the ACL, the attachment procedure associated with received attachment signaling is completed and the femtocell AP allows the device to camp therein and establish call sessions normally. In the alternative, if validation against the ACL results in no match amongst the identity of the device and a device identity retained in the ACL, the femtocell AP rejects the attachment signaling and the device is allowed only to establish emergency calls. An owner or lessee of a femtocell AP can determine access attributes to be recorded in or removed from an access control list associated with the femtocell AP.

More than one ACL can be retained in memory 1444; however, a single ACL can be active at a time in order to regulate access and provide wireless services. Memory 1444 also can retain service attributes that control logic for provision of service to a wireless device identified in an ACL. Service attributes can be specific to a femto AP 1402. The logic for provision of service can establish at least one of the following features: (i) Supplied service(s), e.g., voice-only service, data-only service and available applications, voice and data service and provided applications associated with the service(s). In addition, radio technology employed to supply service(s) also can be set. (ii) Service priority, e.g., ranking of access to radio resources such as radio technology (3G or 4G), bandwidth, dedicated channels. (iii) Access schedule or time constraints, such as time of day considerations, or expected duration of provided service. (iv) Level of service or access quality of service, e.g., quality of service (QoS) profile such as best effort, conversational, real-time. It should be appreciated that service attributes also can determine other service features.

A configuration of service attributes, also referred to as a profile of service attributes or access profile, is specific to a mobile device identified in an access control list, even though it should be noted that a particular configuration of service attributes can display a one-to-many relationship with identified devices in an ACL. Accordingly, specification of a service attribute profile can customize provision of wireless service through a femto AP 1402.

Figure 16:
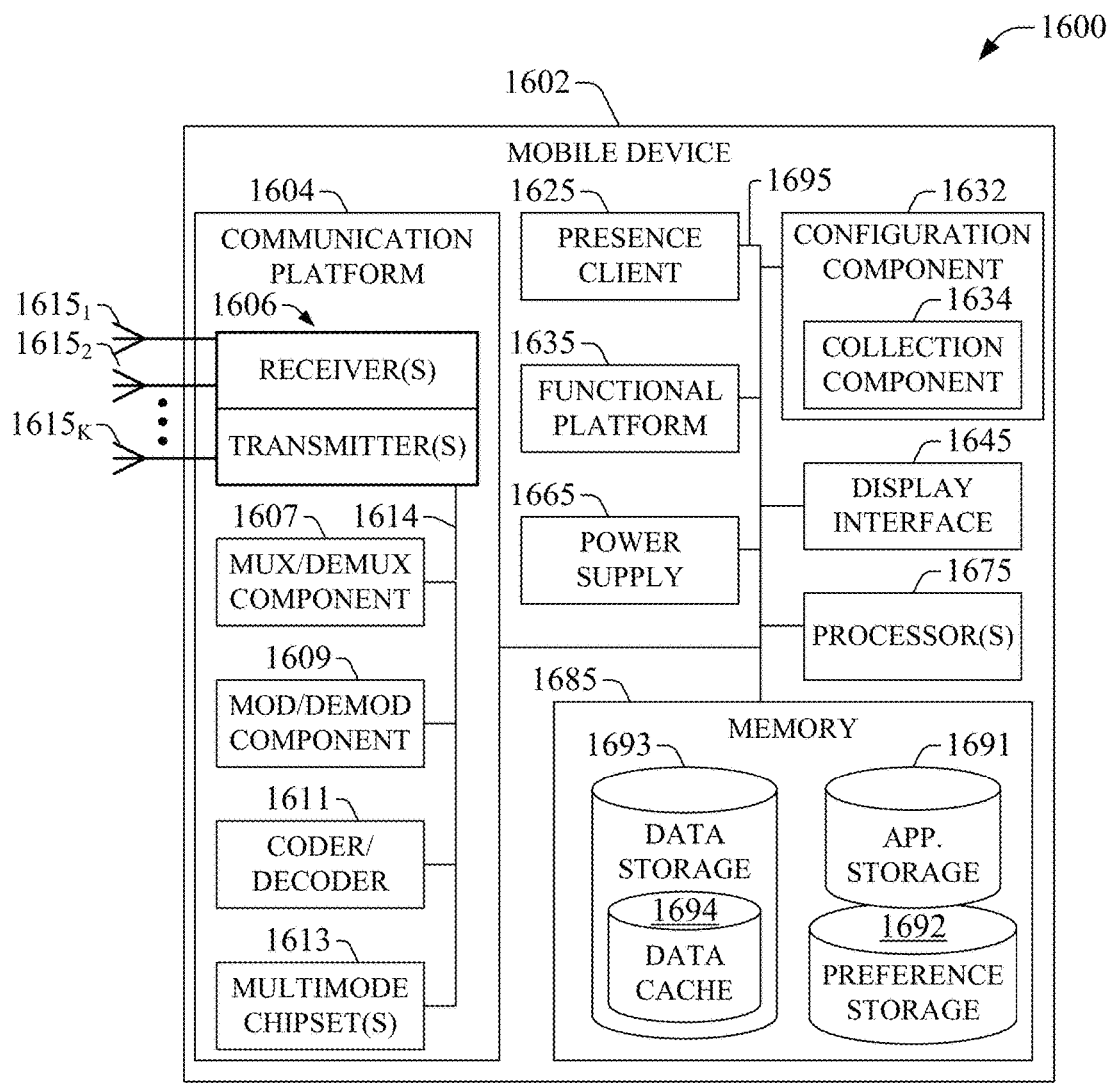
FIG. 16 displays a block diagram of an example embodiment of a mobile device that operates in accordance with aspects described herein.

FIG. 16 illustrates a block diagram of an example embodiment 1600 of a mobile device 1602 that can be leased in accordance with aspects described herein. Mobile device 1602 also can embody certain aspects a wireline device (e.g., a pseudo-stationary or tethered device) that can communicate wirelessly. To enable wireless communication, and transmit and receive data and signaling wirelessly, mobile device 1602 includes a communication platform 1604, which comprises a set of receiver(s)/transceiver(s) 1606; each transceiver in the set includes an antenna 1615$_\lambda$, with $\lambda = 1, 2, \ldots, K$, with K a natural number greater or equal than unity. One or more of receiver(s)/transmitter(s) 1606 can be configured, e.g., by a base station or component(s) therein, to operate in various telecommunication modes: MIMO mode, MISO mode, SIMO mode, or SISO mode. Receiver(s)/transmitter(s) 1606 include respective filter(s) and amplifiers. The filters are installed between antenna(s)

1615$_\lambda$ and the amplifier(s), and tune specific portions of electromagnetic (EM) radiation spectrum available for telecommunications.

Communication platform 1604 comprises electronic components and associated circuitry that enable processing and manipulation, e.g., coding/decoding, deciphering, modulation/demodulation, of wireless signal(s) received by mobile device 1602 and wireless signal(s) to be transmitted by mobile device 1604; the wireless signal(s) modulated and coded, or otherwise processed, in accordance with various radio technology protocols. Components, or functional elements, in communication platform 1604 exchange information through a bus 1614; information includes data, code instructions, signaling, or the like, and the bus 1614 can be embodied in at least one of a system bus, and address bus, a data bus, a message bus, or a reference link or interface. The electronic components and circuitry can include the set of K receiver(s)/transmitter(s) 1606 and component(s) therein, a multiplexer/demultiplexer (mux/demux) component 1607, a modulator/demodulator component 1609, a coder/decoder 1611, and a set of one or more chipsets, e.g., multi-mode chipset(s) 1613. As indicated above, the transceivers includes receiver(s)/transmitter(s) 1606 that can convert signal from analog to digital upon reception, and from digital to analog upon transmission. Receiver(s)/transmitter(s) 1606 also can divide a single data stream into multiple parallel data streams, or perform the reciprocal operation; such operations typically conducted in various multiplexing schemes. Functionally coupled to receiver(s)/transmitter(s) 1606 is a multiplexer/demultiplexer (mux/demux) component 1607 that enables processing or manipulation of wireless signal(s) in time and frequency space or domain. Electronic mux/demux component 1607 can multiplex and demultiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1607 can scramble and spread information (e.g., codes) according to substantially any code; e.g., Hadamard-Walsh codes, Baker codes, Kasami codes, polyphase codes, and so on. A modulator/demodulator (mod/demod) component 1609 also is a part of communication platform 1604, and can modulate and demodulate information according to various modulation techniques, such as frequency modulation (e.g., frequency-shift keying), amplitude modulation (e.g., M-ary quadrature amplitude modulation (QAM), with M a positive integer; amplitude-shift keying (ASK)), phase-shift keying (PSK), and the like. In embodiment 1600, mod/demod component 1609 is functionally coupled to mux/demux component 1607 via bus 1614. In addition, processor(s) 1675 enables, at least in part, mobile device 1602 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc.

Communication platform 1604 also includes a coder/decoder 1611 that operates on data in accordance with one or more coding/decoding schemes suitable for telecommunication through one or more receivers(s)/transmitter(s) 1604. When communication platform 1604 exploits MIMO, MISO, SIMO modes of operation, coder/decoder 1611 can implement at least one of space-time block coding (STBC) and associated decoding; or space-frequency block (SFBC) coding and associated decoding. Coder/decoder 1611 also can extract information from data streams coding in accordance with spatial multiplexing scheme. To decode received information, e.g., data or control signaling, coder/decoder 1611 can effect at least one of computation of log-likelihood ratios (LLR) associated with constellation realization for a specific demodulation; maximal ratio combining (MRC) filtering, maximum-likelihood (ML) detection, successive interference cancellation (SIC) detection, zero forcing (ZF) and minimum mean square error estimation (MMSE) detection, or the like. In addition, to operate in the manner described herein, coder/decoder 1611 can employ, at least in part, mux/demux component 1607 and mod/demod component 1609.

A network operator can configure, as part of provisioning of mobile device 1602, a set of electromagnetic (EM) radiation frequency bands and a set of radio technologies that communication platform 1604 and components therein can exploit for wireless communication. The set of EM radiation frequency bands, also referred to herein as frequency bands, can comprise radio frequency (RF) portion(s) and microwave portion(s) of the EM spectrum, although other spectral regions such as infrared (IR) also can be included. In an aspect, the set of EM radiation frequency bands can include at least one of (i) all or substantially all EM frequency bands licensed by the network operator (e.g., PCS bands, AWS bands, GWCS bands, and so forth); or (ii) all or substantially all unlicensed frequency bands currently available for telecommunication (e.g., the 2.4 GHz Industrial, Scientific and Medical (ISM) band or one or more of the Unlicensed National Information Infra-structure (UNII) bands in the 5 GHz range). It is noted that as part of network upgrades, the network operator can add frequency bands, or frequency carriers therein, to the set of EM radiation frequency bands as such bands or carriers become available for telecommunication, e.g., auctioned for utilization or authorized for free-of-charge utilization. Similarly, as new radio technologies become standardized, or available, the network operator can introduce such technologies in the set of radio technologies that can be utilized for telecommunication by mobile device 1602.

Additionally, in embodiment 1600, multimode chipset(s) 1613 can allow mobile device 1602 to operate in multiple communication modes through various radio network technologies (e.g., 2G, 3G, or 4G) or deep-space satellite-based communication in accordance with disparate technical specifications, or standard protocols, for the radio network technologies or satellite communication. In an aspect, multimode chipset(s) 1613 can enable, at least in part, communication platform 1604 to operate in accordance with standard protocols specific to a telecommunication mode of operation, e.g., 3GPP Long Term Evolution (LTE)-based communication. In another aspect, multimode chipset(s) 1613 can be scheduled to operate concurrently (e.g., when K>1) in various modes or within a multitask paradigm in which the multimode chipset(s) 1613 operates in a dedicated mode for a specific time interval. In yet another aspect, multi-mode chipset(s) enable communication platform 1604 to receive global positioning system (GPS) pilot signals, e.g., timing message(s), orbit information, from one or more deployed global navigation satellite systems (GNNSs).

Communication platform 1604 can exchange (e.g., received and transmit) attachment signaling with at least one confined-coverage AP (e.g., a femtocell AP) or outdoor-based base station (e.g., an eNode B or other type of macrocell base station), and deliver notification of attachment (e.g., IMSI attachment) to the confined-coverage AP, or a notification of detachment (e.g., implicit detachment or explicit detachment) from the confined-coverage AP. Moreover, based on exchange of attachment signaling, communication platform 1604 can deliver notification of attachment to the outdoor-based base station (e.g., an eNode B), or a notification of detachment therefrom. In one or more embodiments, for example in UMTS-based radio technology, communication platform 1604 also can deliver a notification of location area update (LAU) or a notification of routing area update (RAU). In an aspect, the foregoing notifications of mobility events can be provided by presence client component 1625, or presence client 1625, as described supra (see, e.g., FIG. 6 and related discussion); to provide a notification, presence client component 1625 can generate, format or encoded, and convey the notification based on attachment signaling.

In an aspect, display interface 1645 can receive one or more directives to render an environment (e.g., display one or more user interfaces) to configure at least one routing preference, as described supra. In addition, display interface 1645 can receive and process (e.g., decode, encode, format, or deliver) data from a subscriber via one or more gestures (e.g., touch, speech, motion). In response to rendering the environment to configure the at least one routing preference, the display interface can receive and process data that defines the at least one routing preference; a data entry interface, and associated circuitry, within display interface 1645 can cast such input into data. Display interface can deliver the data, either raw or processed, to memory 1685 to be retained in memory element 1692 or data cache 1694. To mitigate fraudulent or undesired configuration of the at least one routing preference, in an embodiment, a security component (not shown) can secure input data that defines the at least one routing preference through various credential-based mechanisms, such as password protection, biometric protection, or the like, and associated secured transport protocol(s) which include data encryption.

Further to enabling wireless communication of voice or data, mobile device 1602 can provide a specific functionality; for instance, device 1602 can be a mobile phone, a photography camera, a video camera, a wireless dedicated computer (such as a device in an industrial environment), a navigation device, a printer or photocopier, a scanner, a fax machine, a television set, a digital picture frame, or the like. Such specific functionality can be supplied primarily through a functional platform 1635 that comprises a set of components (not shown) that enable, at least in part, one or more specific functionalities that can complement or supplement wireless communication. It should be appreciated that functional platform 1635 can exploit an application (either a software application or a hardware application) retained in application storage 1691 in order to provide one or more functionalities of mobile device 1602; the application is retained as one or more sets of code instructions. As an example, in an aspect of the subject innovation, application storage 1691 can include an application that, when executed, can provide tutorial(s) for operation of mobile device 1602. As another example, when mobile device 1602 is a telephone, functional platform 1635 can include functional elements such as a data entry interface (e.g., a touch screen, a keyboard, a biometric pad for biometric-based access, a microphone, a loud speaker), a camera, peripheral connectors (e.g., a universal serial bus (USB) port or an IEEE 1394 port for transferring data to, or exchanging data with, a disparate device), a voice coder-decoder, which can be part of coder/decoder 1611; intelligent component(s) that can respond to voice activated command(s); and so on.

Display interface 1645 also can render visual or aural indicia that control functionality of mobile device 1602 as supplied through functional platform 1635, or reveal operational conditions of mobile device 1602; for example, battery level, radio technology employed for communication, or the like.

Mobile device 1602 includes processor(s) 1675 configured to enable or that enable, at least in part, functionality to substantially any or any component(s) or platform(s), interface(s), and so forth, within mobile device 1602 in accordance with one or more aspects of the subject disclosure. In embodiment 1600, processor(s) 1675 is illustrated as external to the various functional elements (e.g., component(s), interface(s), platform(s)) of mobile device 1602; however, in additional or alternative embodiments, processor(s) 1675 can be distributed amongst a plurality of such various functional elements. Processor(s) 1675 is functionally (e.g., communicatively) coupled to each functional element within mobile device 1602 and to memory 1685 through bus 1695, which can be embodied in at least one of a memory bus, a system bus, an address bus, a message bus, or one or more reference link(s) or interface(s). In addition, processor(s) 1675 can supply information to and retrieve information from memory 1685, wherein the information can enable, at least in part, operation and/or can provide, at least in part, functionality to communication platform 1605 and at least a portion of component(s) therein; presence client component 1625; configuration component 1632 and component(s) therein; functional platform 1635 and component(s) therein; as well as other operational components (not shown) of mobile device 1602. The information can include at least one of code instructions, code structure(s), data structures, or the like.

Processor(s) 1675 can execute code instructions stored in memory 1685, for example within application storage 1691, or other memory(ies) functionally coupled to mobile device 1602, to provide the described functionality of mobile device 1602. Such code instructions can include program modules or software applications or firmware applications that implement various methods described in the subject disclosure and that are associated, at least in part, with described functionality of mobile device 1602.

Memory 1685 can retain, at least in part in an application storage 1691, at least one of data structures (e.g., objects, classes, metadata); code structure(s) (e.g., modules, procedures) or instructions; or substantially any type of software or firmware that processor(s) 1675 can execute to provide functionality associated with substantially any or any component(s), platform(s), interface(s), or functional element(s) within mobile device 1602 in accordance with aspects of the subject innovation. In addition, memory 285 can store network or device information, e.g., within data storage 1693, such as encoded pilot signal(s); one or more communication protocol(s) or technical specification(s); code sequences for scrambling or spreading; blind decoding hypotheses; semi-persistent scheduling parameters; frequency offsets, macrocell and femtocell identifiers (IDs); address book(s); or the like. Moreover, memory 1685 can retain content(s) such as multimedia files or subscriber-generated data; security credentials (e.g., passwords, encryption keys, digital certificates, biometric keys such as voice recordings, iris patterns, fingerprints, deoxyribonucleic acid (DNA) profiles); hardware identifying tokens or codes such as at least one of an IMSI, a temporary mobile subscriber identity (TMSI), packet TMSI (P-TMSI), an IMEI, an MDN, a MIN, a TIA ESN, or a multi-bit identification number such as MEID. It is noted that memory 1685 can include affixed or removable elements such as a subscriber identification module (SIM) card storage, a universal integrated circuit card (UICC) storage, or a removable user identity module (RUIM).

Mobile device 1602 also includes power supply 1665, which can provide power to one or more components or functional elements that operate within mobile device 1602. In an aspect, power supply 1665 can be rechargeable, e.g., it can be embodied in a rechargeable battery. In addition, power supply 1665 can include one or more transformers to achieve power level(s) that can operate mobile device 1602 and components or functional elements, and related circuitry therein. In an aspect, power supply 1665 can attach to a conventional power grid to recharge, or ensure mobile device 1602 is operational; power supply 1665 can include input/output (I/O) interface(s) (not shown), or connector(s) (not shown), to functionally attach to the conventional power grid. Power supply 1665 also can include an energy conversion component(s) (not shown) such as a solar panel or a thermoelectric device or material, which can be external or internal to the mobile device 1602, in order to provide additional or alternative power resources or autonomy to mobile device 1602.

In view of the example systems described above, example methods that can be implemented in accordance with the disclosed subject matter can be better appreciated with reference to FIGS. 17-30. For purposes of simplicity of explanation, various methods disclosed herein are presented and described as a series of acts; however, it is to be understood and appreciated that the claimed subject matter is not limited by the order of acts, as some acts may occur in different order and/or concurrently with other acts from that shown and described herein. It is noted that not all illustrated acts may be required to implement a described method in accordance with the subject specification. In addition, for example, one or more methods disclosed herein could alternatively be represented as a series of interrelated states or events, such as in a state diagram. Moreover, interaction diagram(s) or call flow(s) represent several of the example methods disclosed herein in accordance with the described subject matter; particularly in instances when disparate entities, or functional elements, enact disparate portions of one or more of the several methods. Furthermore, two or more of the disclosed example methods can be implemented in combination, to accomplish one or more features or advantages described in the subject disclosure.

Methods disclosed throughout the subject specification and annexed drawings are capable of being stored on an article of manufacture (e.g., a removable volatile memory or non-volatile memory) to facilitate transporting and transferring such methods to computers for execution, and thus implementation, by a processor, or for storage in a memory. In an aspect, one or more processors, such as processor(s) that enact the one or more method described herein, can be employed to execute code instructions retained in a memory (volatile or non-volatile), or any computer- or machine-readable storage medium, to implement one or more of the method described herein. Such code instructions provide a computer- or machine-executable framework to enact the various methods described herein.

Figure 17:
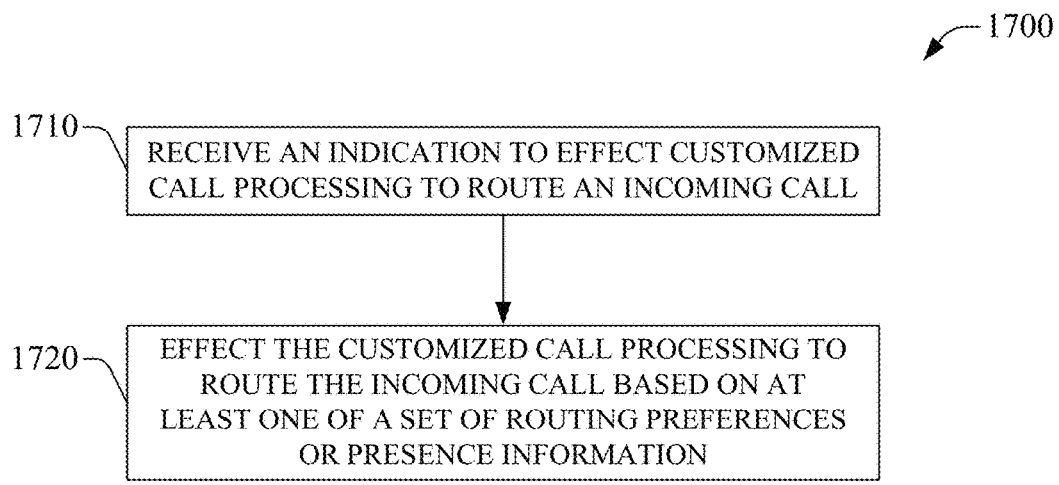
FIG. 17 is a flowchart of an example method for routing a communication to a user device, wireless or otherwise, based on femtocell presence information according to an aspect of the subject disclosure.

FIG. 17 is a flowchart of an example method 1700 for routing a communication to a user device, wireless or otherwise, based on femtocell presence information according to an aspect of the subject disclosure. In an aspect, a routing server (e.g., customized routing server 420) or one or more component(s) therein can implement, at least in part, the subject example method. In another aspect, one or more processors configured to provide or that provide at least part of the functionality to the routing server (e.g., customized routing server 420) also can enact, at least in part, the subject example method. In yet another aspect, in scenarios in which the routing server is embodied in one or more sets of code instructions stored in a memory, at least one processor that executes the routing server, or the one or more sets of code instructions, can enact the subject example method.

At act 1710, an indication to effect customized call processing to route an incoming call is received. In an aspect, the indication can be received in response to invoking a CAMEL service when the incoming call is intended for a mobile device associated with (e.g., owned or leased by) a subscriber that consumes personalized communication routing service described in the subject disclosure. In another aspect, the indication can be received as a result of invoking an AS within an IMS core network when the incoming call is directed to the mobile device of the subscriber.

Figure 18:
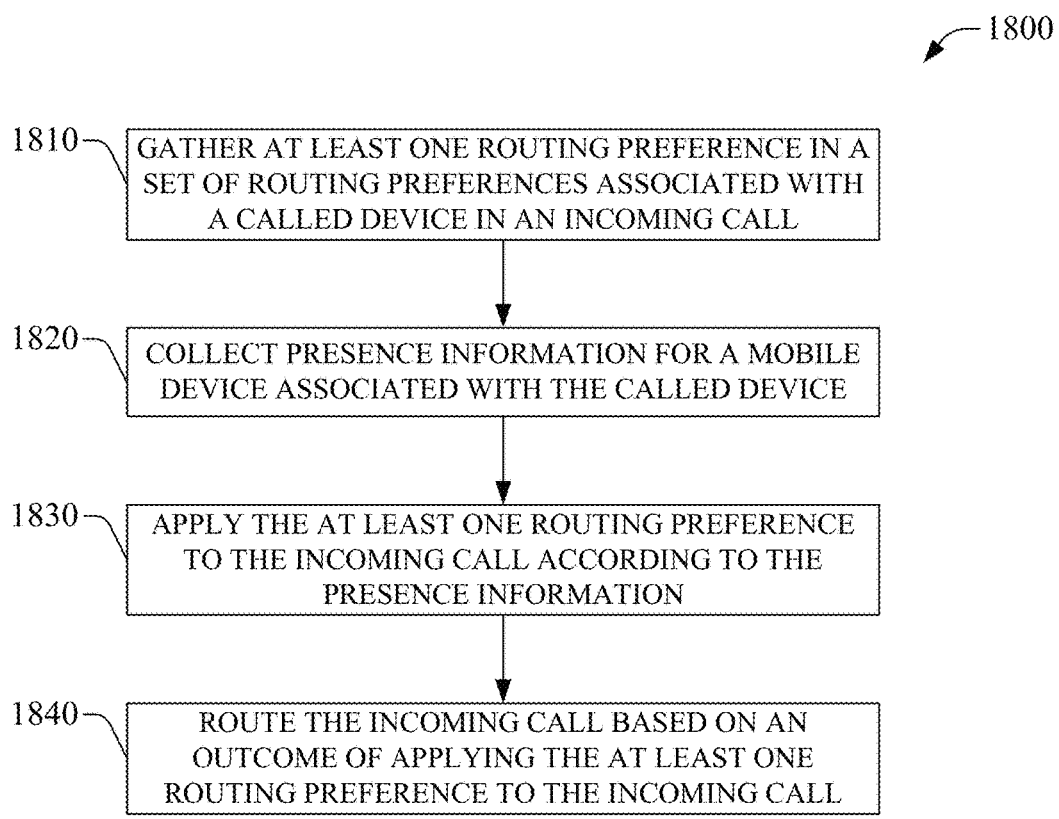
FIG. 18 is a flowchart of an example method for effecting customized call processing based on at least one of presence information or one or more routing preferences according to aspects described herein.

At act 1720, customized call processing to route the incoming call based on at least one of presence information or a set of routing preferences is effected. In an embodiment, act 1720 can include various acts, as illustrated in FIG. 18, which presents a flowchart of an example method 1800 for effecting customized call processing according to aspects described herein. Server(s), component(s), or processor(s) that effect at least act 1720 also can effect the subject example method. At act 1810, at least one routing preference in a set of routing preferences associated with the called device is gathered. At act 1820, presence information for a mobile device associated with the called device is collected. In an aspect, the association can be derived from device ownership as revealed by one or more records in a subscriber database in a telecommunication network platform (e.g., 108, 109). A mobile device can be associated with one or more devices, wireless or otherwise, if a physical address (e.g., an address for billing) of the mobile device matches a physical address of the one or more devices. In another aspect, presence information can be characterized a one or more presence condition records, which can be persisted in a memory, that indicate whether the mobile device is attached to a femtocell access point or any other type of confined-coverage access point. At act 1830, the at least one routing preference is applied to the incoming call according to the presence information for the called device. At act 1840, the incoming call is routed based on an outcome of applying the at least one routing preference to the incoming call.

Figure 19:
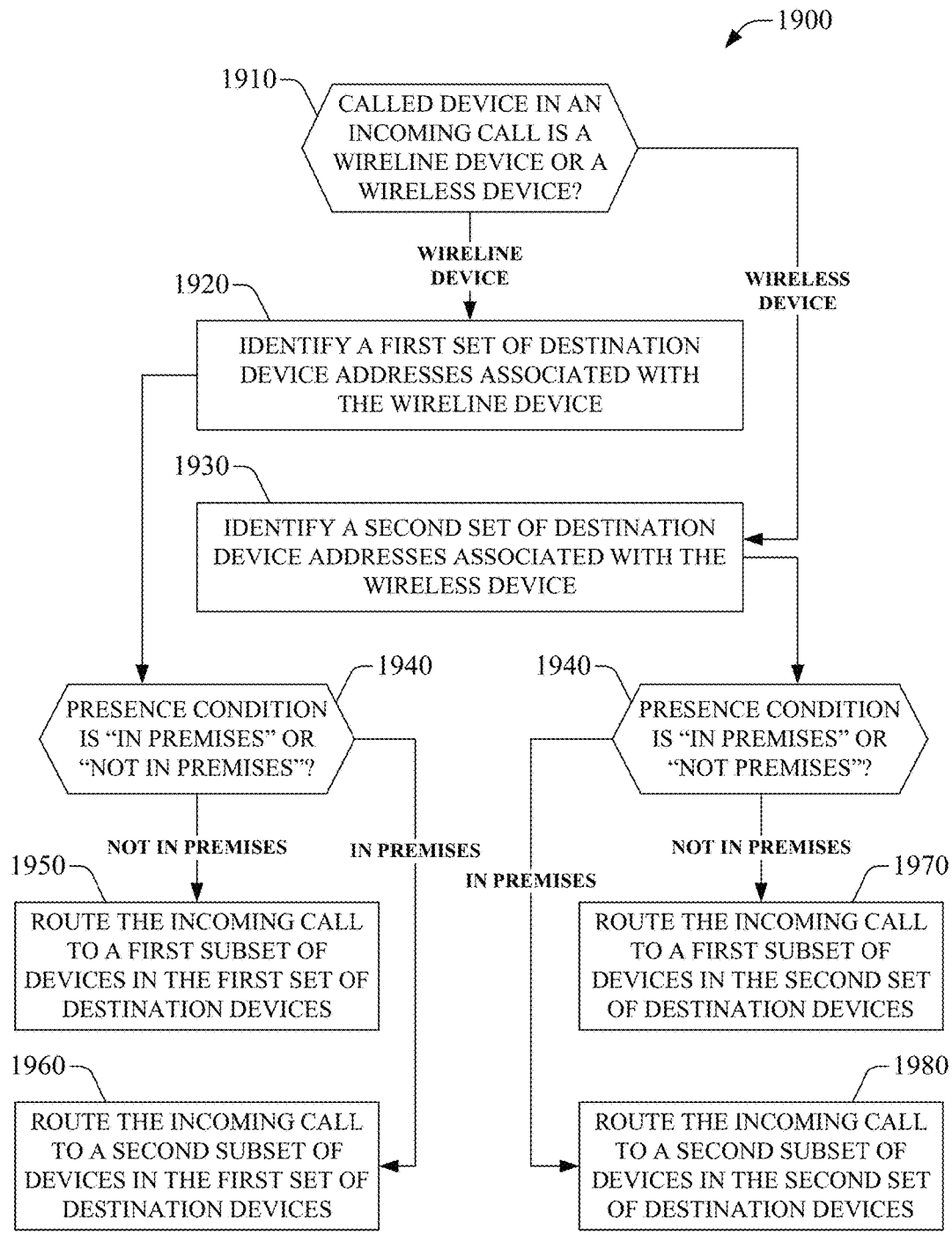
FIG. 19 illustrates a flowchart of an example method for routing a communication based on presence information according to aspects described herein.

FIG. 19 is a flowchart of an example method 1900 for routing a communication based on presence information and at least one routing preference according to aspects described herein. Server(s), component(s) or processor(s) that effect example methods 1700 or 1800 also can implement the subject example method. At act 1910, it is established whether a called device is a wireline device or a wireless device. In case of a wireline device, a first set of destination devices associated with the wireline device is extracted is identified at act 1920; identifying a device in the first set of destination devices includes extracting an address (e.g., device number(s), internet protocol (IP) address(es), or a combination thereof) of the device. In case the outcome of act 1910 establishes the called device is a wireless device, a second set of destination devices associated with the wireless device is identified at act 1930; identifying a device in the second set of destination devices includes extracting an address (e.g., device number(s), internet protocol (IP)

address(es), or a combination thereof) of the device. At act 1940, it is determined if the presence condition of a mobile device of a subscriber linked to the incoming call is "In Premises" or "Not in Premises." For the wireline device, if the presence condition is "Not in Premises," the incoming call is routed to a first subset of devices in the first set of destination devices at act 1950, whereas in the presence condition is "In Premises," the incoming call is routed to a second subset of devices in the first set of devices at act 1960. For the wireless device, if the presence condition is "Not in Premises," the incoming call is routed to a first subset of devices in the second set of destination devices at act 1970, whereas in the presence condition is "In Premises," the incoming call is routed to a second subset of devices in the second set of devices at act 1980.

Figure 20:
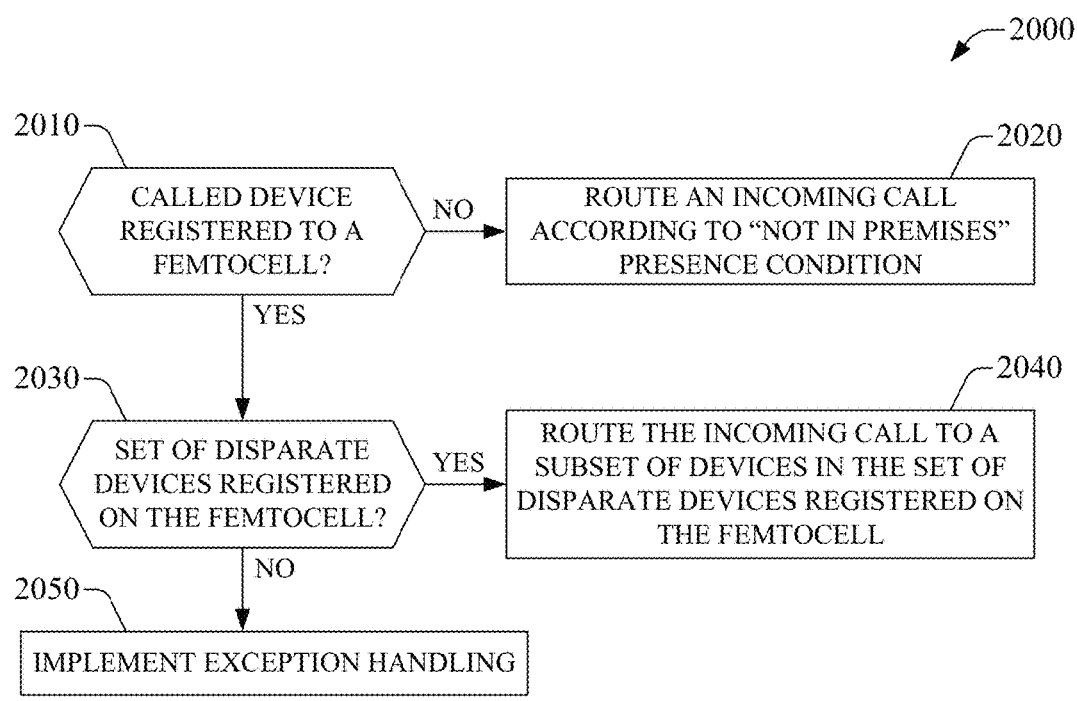
FIG. 20 is a flowchart of another example method for routing an incoming call based on presence information according to aspects described herein.

FIG. 20 is a flowchart of another example method 2000 for routing an incoming call based on presence information and at least one routing preference according to aspects described herein. Server(s), component(s) or processor(s) that effect example methods 1700, 1800, or 1900 also can implement the subject example method. At act 2010, it is determined if a called device is registered to a femtocell. In the negative case, the incoming call is routed according to "Not In Premises" presence condition. Conversely, in case the called device is registered with the femtocell, it is determined if a set of disparate devices is registered on the femtocell at act 2030. A negative determination leads to act 2050, in which exception handling is implemented, but a positive determination leads to act 2040 in which the incoming call is routed to a subset of the set of devices registered on the femtocell.

Figure 21A:
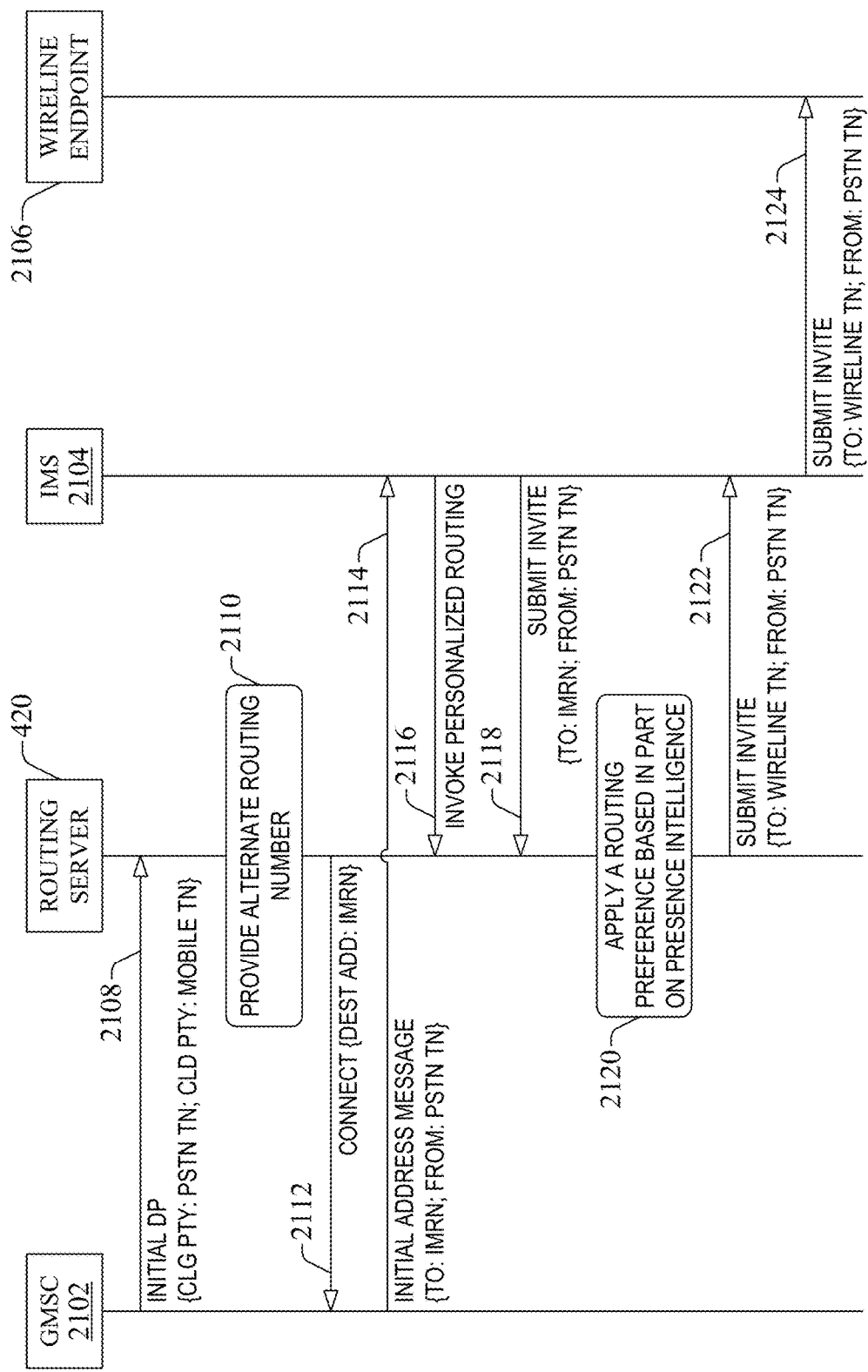
FIGS. 21A-21B illustrate call flows of example methods for directing a wireless incoming call based on customized call routing according to aspects described herein.
Figure 21B:
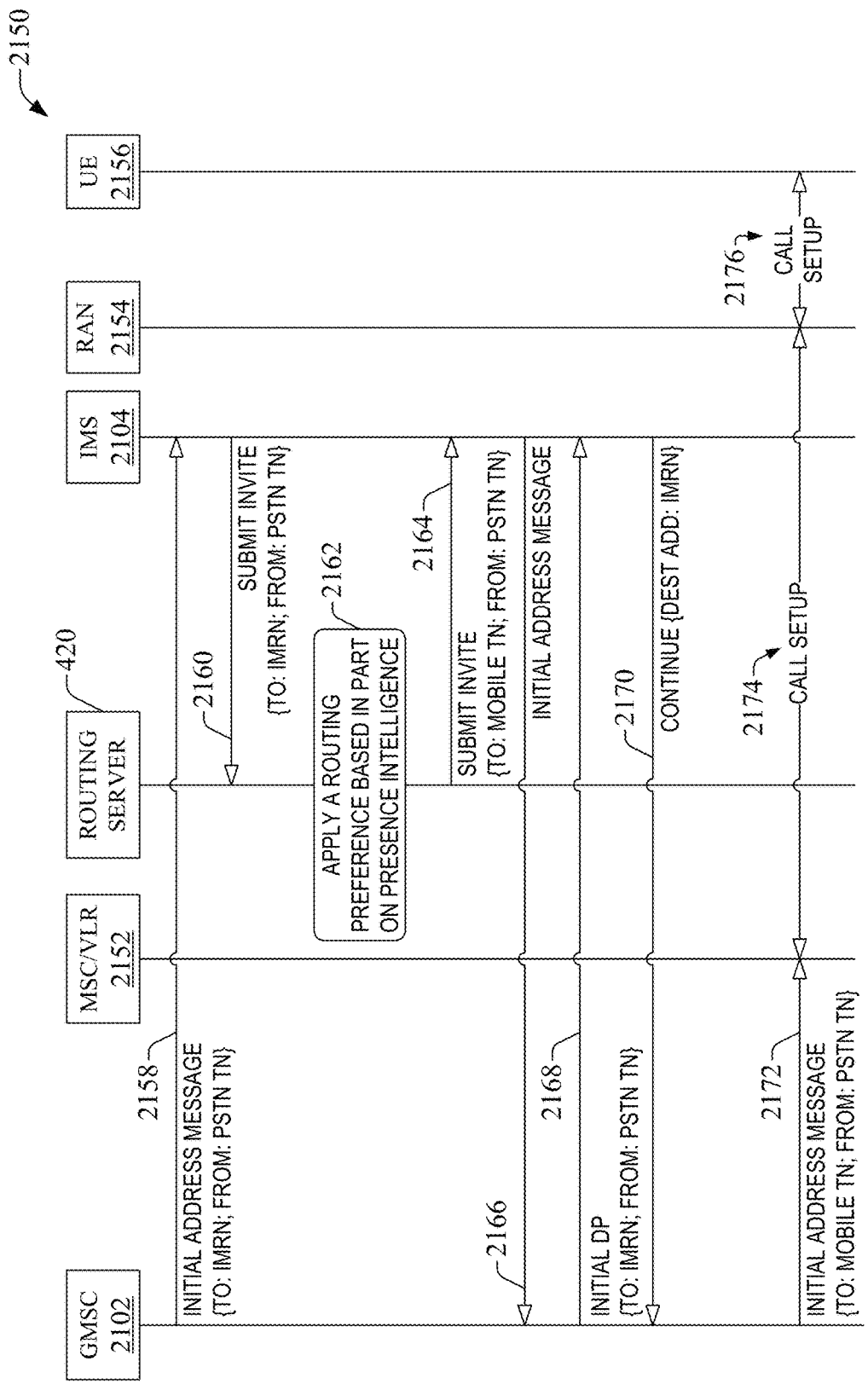

FIGS. 21A-21B illustrate call flows of example methods 2100 and 2150, respectively, for directing a wireless incoming call based on customized call routing according to aspects described herein. In connection with FIG. 21A, the incoming call is directed, or routed, to a wireline endpoint (e.g., a wireline device or a pseudo-stationary device). At act 2108, an initial DP is conveyed to a customized routing server 420 from a gateway mobile switching center (GMSC) 2102, which includes one or more servers. As in conventional telecommunication systems, the initial DP includes a reference to a calling party, e.g., a PSTN telephone number, and a called party, e.g., a mobile telephone number (TN). The routing server 420, at act 2110, provides an alternate routing number, based at least in part on routing criteria. Routing logic retained in a memory element (e.g., routing logic store 454) in a memory functionally coupled to routing server 420 can include the routing criteria. At act 2112, the customized routing server 420 delivers a connect message that references an alternate destination address as the alternate destination number (e.g., an IP Multimedia Routing Number (IMRN)). In response, at act 2114, the GMSC 2102 conveys an initial address message with IMRN as destination and PSTN as source as the incoming call. In an aspect, the initial address message is conveyed to an IP multimedia subsystem (IMS) 2104, which invokes personalized routing at act 2116. In an aspect, to invoke personalized routing, the IMS 2104, or a network node therein, conveys an indication to effect customized call processing; IMS 2104 can deliver such indication in accordance with an IMS TAS trigger point or filter rule. In addition, IMS 2104 submits an INVITE message at act 2118; the INVITE message is delivered in accordance with session initiation protocol (SIP) and it includes IMRN as destination address and PSTN TN as source address. It should be appreciated, however, that packet-based network platforms other than IMSs can provide the functionality described herein and administer telecommunication services as part of the subject customized call routing. Other protocols for session initiation, such as H.323, also can be employed.

At act 2120, customized routing server 420 applies a routing preference based in part on presence intelligence. The routing preference can be retained within a memory element (e.g., routing preference(s) storage 458) functionally connected to customized routing server 420. The customized routing server 420 can receive presence intelligence from a repository (e.g., presence intelligence storage 434) functionally linked thereto. At act 2122, the customized routing server 420 submits an INVITE message, with PSTN TN as source address and a wireline TN as the destination address, to the IMS 2104. It is noted that in one or more embodiments, a plurality of INVITE messages can be delivered. At act 2124, the IMS 2104 initiates a call session with the wireline endpoint 2106 identified by the destination address by relaying the INVITE message received from the customized routing server 420.

Regarding FIG. 21B, the incoming call is directed, or routed, to a wireless device (UE 2156). At act 2158, an initial address message is delivered to IMS 2104 from GMSC 2102. The address message includes references to a destination number (IMRN) and a source number (PSTN TN). In response, at act 2160, the IMS 2104 submits an INVITE message to customized routing server 420; the invite message is directed to IMRN from PSTN TN. At act 2162, the routing server 420 applies a routing preference based in part on presence intelligence—this act is substantially the same as act 2120—and conveys an INVITE to IMS 2104. The INVITE is directed to the wireless device, through a reference to a mobile telephone number (TN) associated with the wireless device. The INVITE message has a reference to the source number (PSTN TN). In view of the reference to the mobile TN, IMS 2104 delivers an initial address message to GMSC 2102 at act 2166. The GMSC 2102 responds by supplying an initial DP, with references to IMRN and PSTN TN, to IMS 2104 at act 2168. IMS 2104 conveys, at act 2170, signaling to continue the call session towards destination address IMRN. GMSC 2102 receives such signaling and validates destination address with a mobility management component, such as a Home Location Register (HLR) (validation acts not depicted in FIG. 21B). After validation, GMSC delivers, at act 2172, an initial address message, with references to mobile TN as source and PSTN TN as destination; the initiation address message is delivered to mobility switching center (MSC)/Visited Location Register (VLR) 2152. In response to the initial address message, MSC/VLR 2152 exchanges signaling, and related payload data, through various acts 2174 with at least one component of a radio access network (RAN) 2154 for call setup. The RAN 2154 exchanges signaling, and related payload data, with the intended wireless device (UE 2156) via one or more acts 2176. The various acts 2174 and the at least one component of RAN 2154 are specific to the radio technology employing for wireless communication.

Figure 22A:
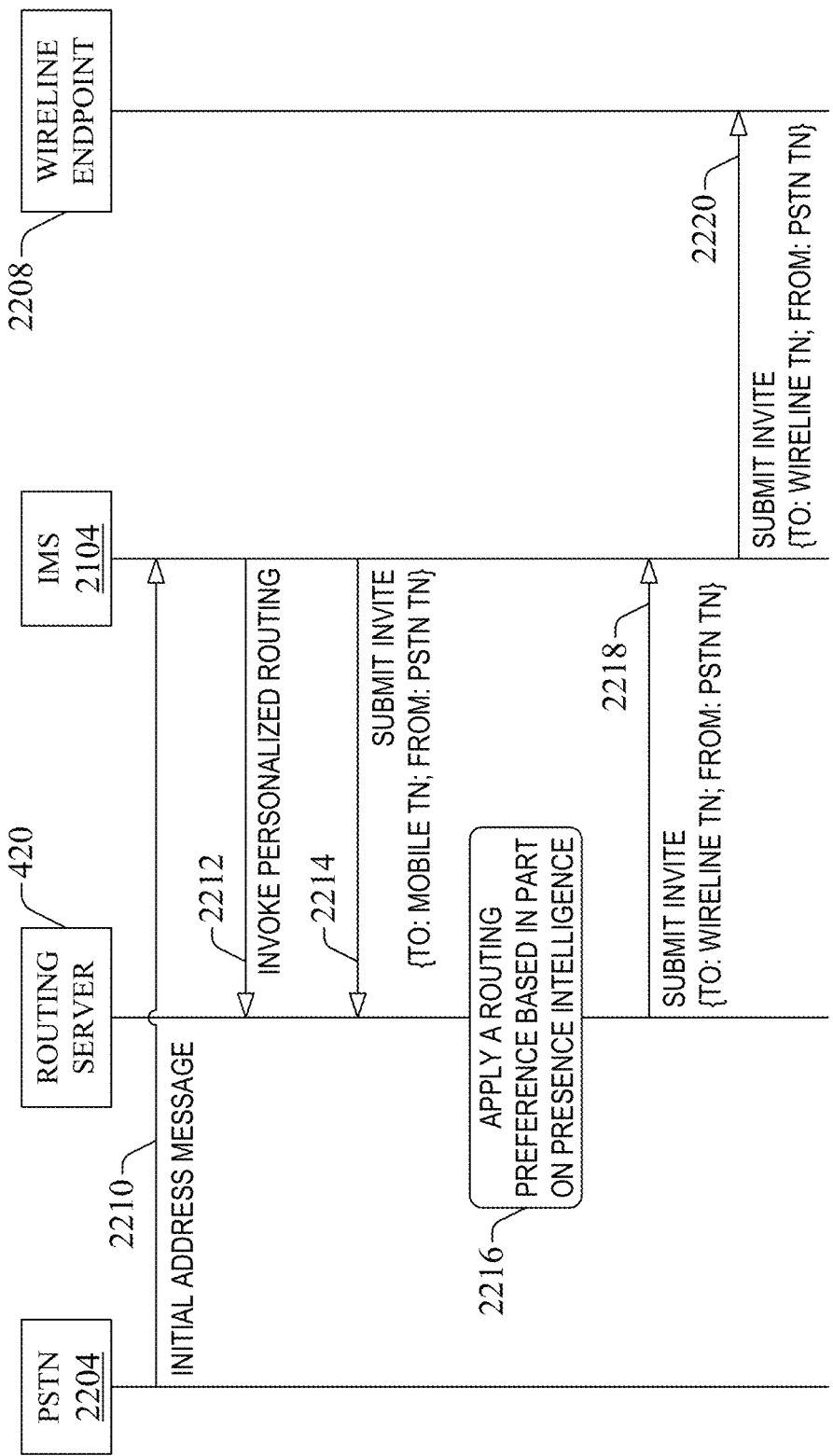
FIGS. 22A-22B illustrate call flows of example methods for directing a wireline incoming call based on customized call routing according to aspects described herein.
Figure 22B:
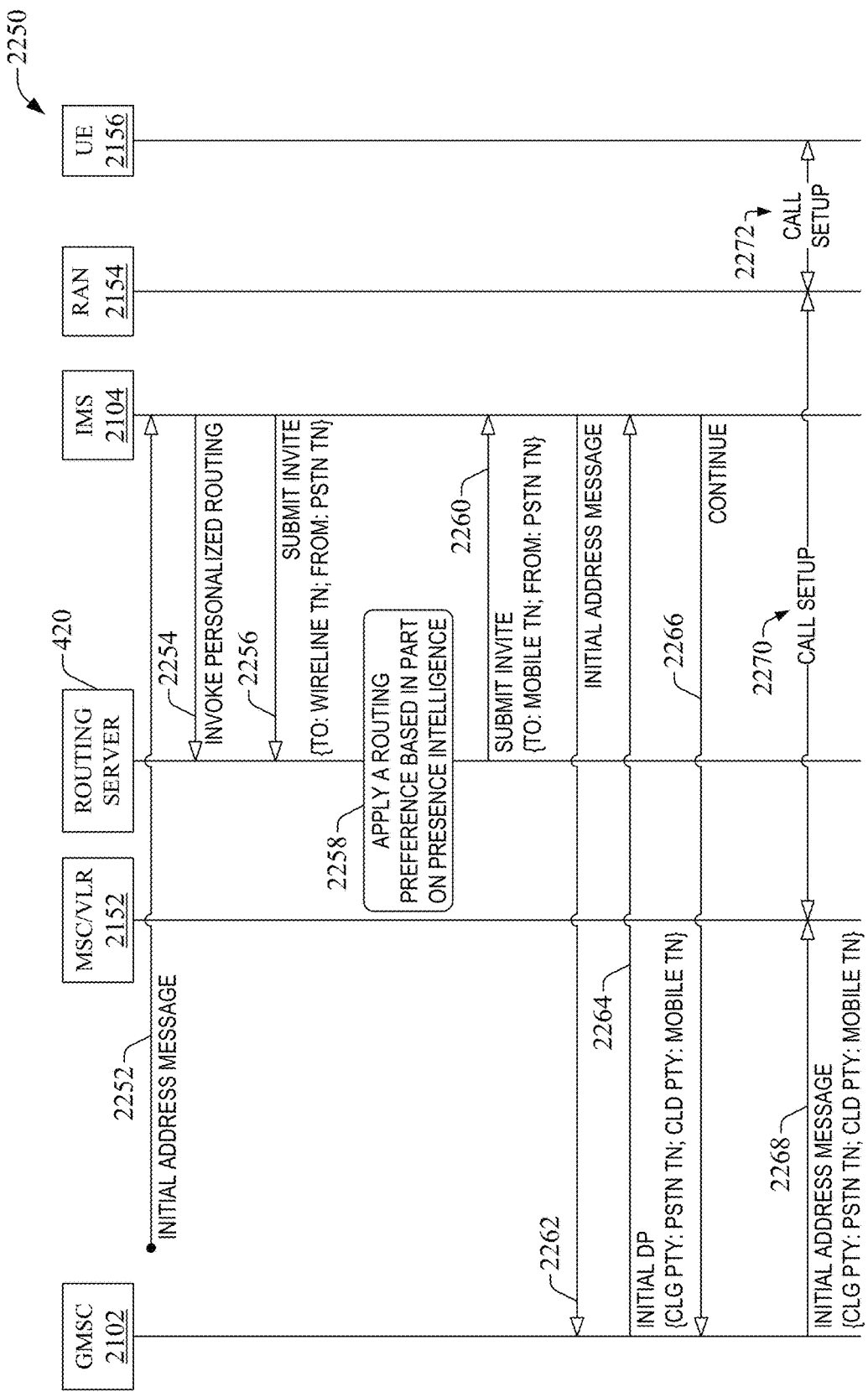

FIGS. 22A-22B illustrate call flows of example methods 2200 and 2250, respectively, for directing a wireline incoming call based on customized call routing according to aspects described herein. With respect to example method 2200, at act 2204, one or more components of PSTN 2204 delivers an initial address message to IMS 2104, which invokes personalized routing at act 2212 and submits an INVITE message to routing server 420 at act 2214; the INVITE message includes references to destination address, e.g., mobile TN, and source address, PSTN TN. IMS 2104 can invoke personalized routing by delivering a directive in accordance with an IMS TAS trigger point or filter rule. At act 2216, routing server 420 applies a routing preference based in part on presence intelligence. In an aspect, as a result of applying the routing preference, routing server 420 submits an INVITE message to IMS 2104. The INVITE message includes a reference to a disparate destination address, wireline TN, arising from applying the routing preference, and a reference to source address, PSTN TN. To set up the incoming call, at act 2220, IMS 2104 relays the INVITE message to wireline endpoint 2208 identified by the disparate destination address in the INVITE message.

In example method 2250, at act 2252 an initial address message is delivered to IMS 2104 by one or more components within PSTN 2204 (not shown; represented with a solid circle in the drawing). In response, at act 2256, IMS 2104 invokes personalized routing and delivers an INVITE message to routing server 420 at act 2256; the INVITE message includes references to destination address (wireline TN) and source address (PSTN TN). At act 2258, the routing server 420 applies a routing preference based in part on presence intelligence. In an aspect, in the illustrated scenario, a routing destination address is a mobile device address (mobile TN), and customized routing server 420 submits, at act 2260, an INVITE message to IMS 2104 with references to mobile TN as destination address and PSTN TN as source address. In response to the received INVITE message and since the destination address is a mobile device address, IMS 2104 delivers an initial address message to GMSC 2102 at act 2262. After the initial address message is received, at act 2264, GMSC 2102 conveys an initial DP message with references to PSTN TN as the calling party and mobile TN as the called party. IMS 2104 recognizes the destination address as the wireless device address and conveys a CONTINUE message to GMSC 2102 to proceed with call session establishment towards the wireless device.

Subsequent to routing validation (not shown), GMSC 2102 responds, at act 2268, by delivering an initial address message with references to PSTN TN as calling party and mobile TN as called party to MSC/VLR 2152. It should be appreciated that in one or more embodiments such initial address message can be delivered to a MM component determined by a specific radio technology utilized to establish wireless call session(s). In one or more acts 2270, MSC/VLR 2152 exchanges a set of messages for call set up with one or more components of RAN 2154. Likewise, in one or more acts 2272, the one or more components of the RAN 2154 exchanges messages for call setup with UE 2156. As discussed supra, packet-based network platforms other than IMSs can provide the functionality described herein and administer telecommunication services as part of the subject customized call routing. Other protocols for session initiation, such as H.323, also can be employed.

Figure 23:
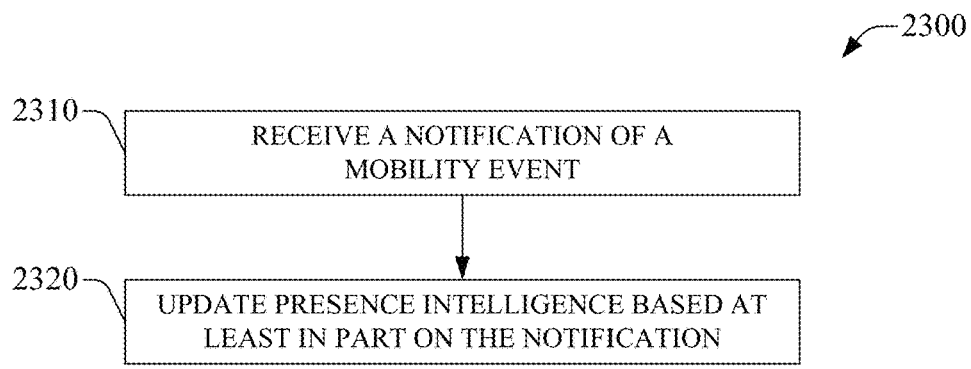
FIG. 23 is a flowchart of an example method for generating presence intelligence according to aspects described herein.

FIG. 23 is a flowchart of an example method 2300 for generating presence intelligence according to aspects described herein. A presence server (e.g., 440) can effect the subject example method, by executing code instructions that implement the acts that are part of the subject example method. In an aspect, one or more processors that are part of the presence server can execute the code instructions, which can be retained in a memory that is functionally coupled to or a part of the presence server. Alternatively or additionally, in scenarios in which the presence server is embodied in one or more sets of code instructions stored in a memory, at least one processor that executes the presence server, or the one or more sets of code instructions, can enact the subject example method 2300.

At act 2310, a notification of a mobility event is received. The mobility event includes attachment towards either a macrocell base station or a femtocell AP, and the notification can include information that characterizes the location of the macrocell base station or the femtocell AP. Receiving the notification can include receiving a notification message, or message, according to a peer-to-peer communication protocol, as described supra. At act 2320, presence intelligence based at least in part on the notification is updated. In an aspect, updating the presence intelligence includes creating or modifying at least one record in a presence intelligence database or memory element.

Figure 24:
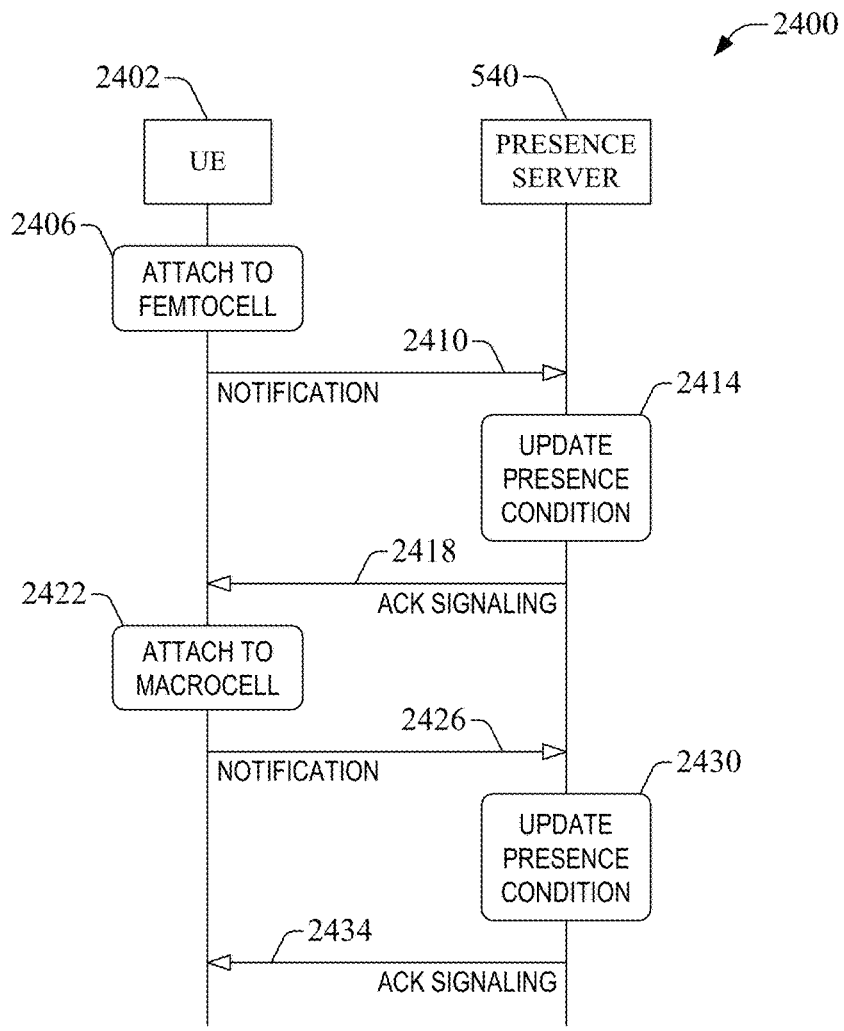
FIG. 24 is a call flow, or interaction diagram, of a method for generating presence intelligence according with aspects described herein.
Figure 25:
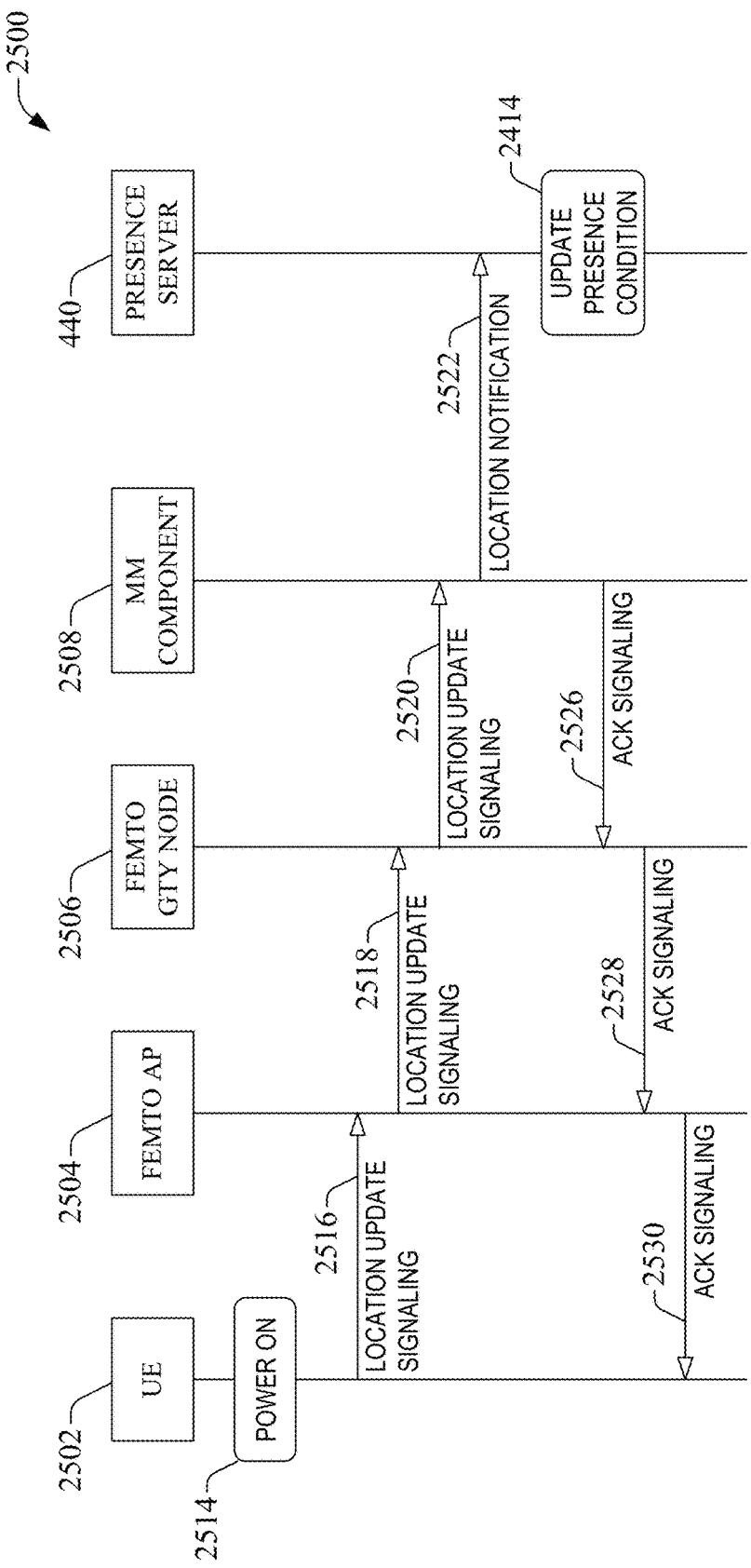
FIGS. 25-28 illustrate various call flows of example methods for updating presence intelligence according to aspects of the subject disclosure.
Figure 26:
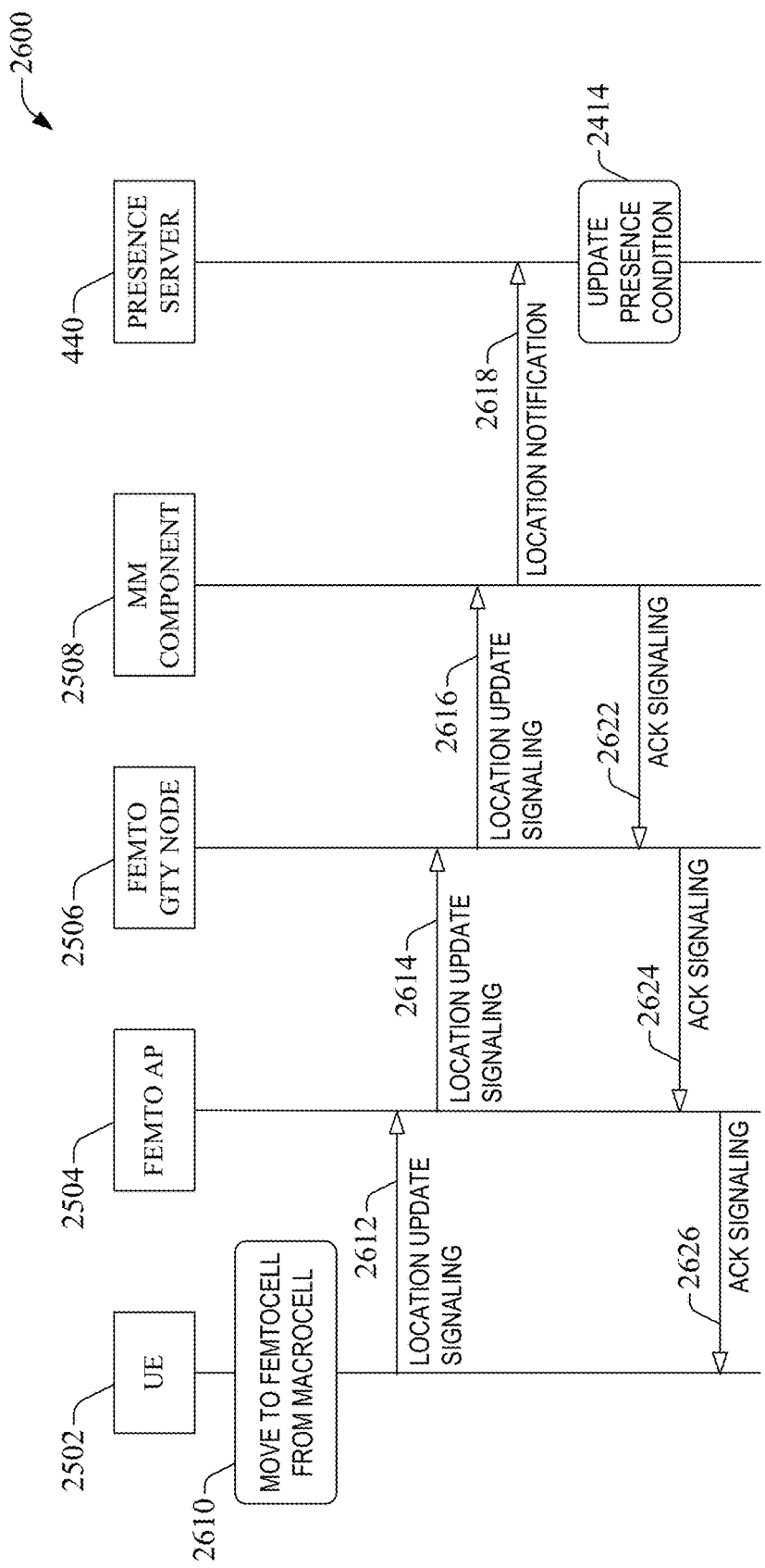
Figure 27:
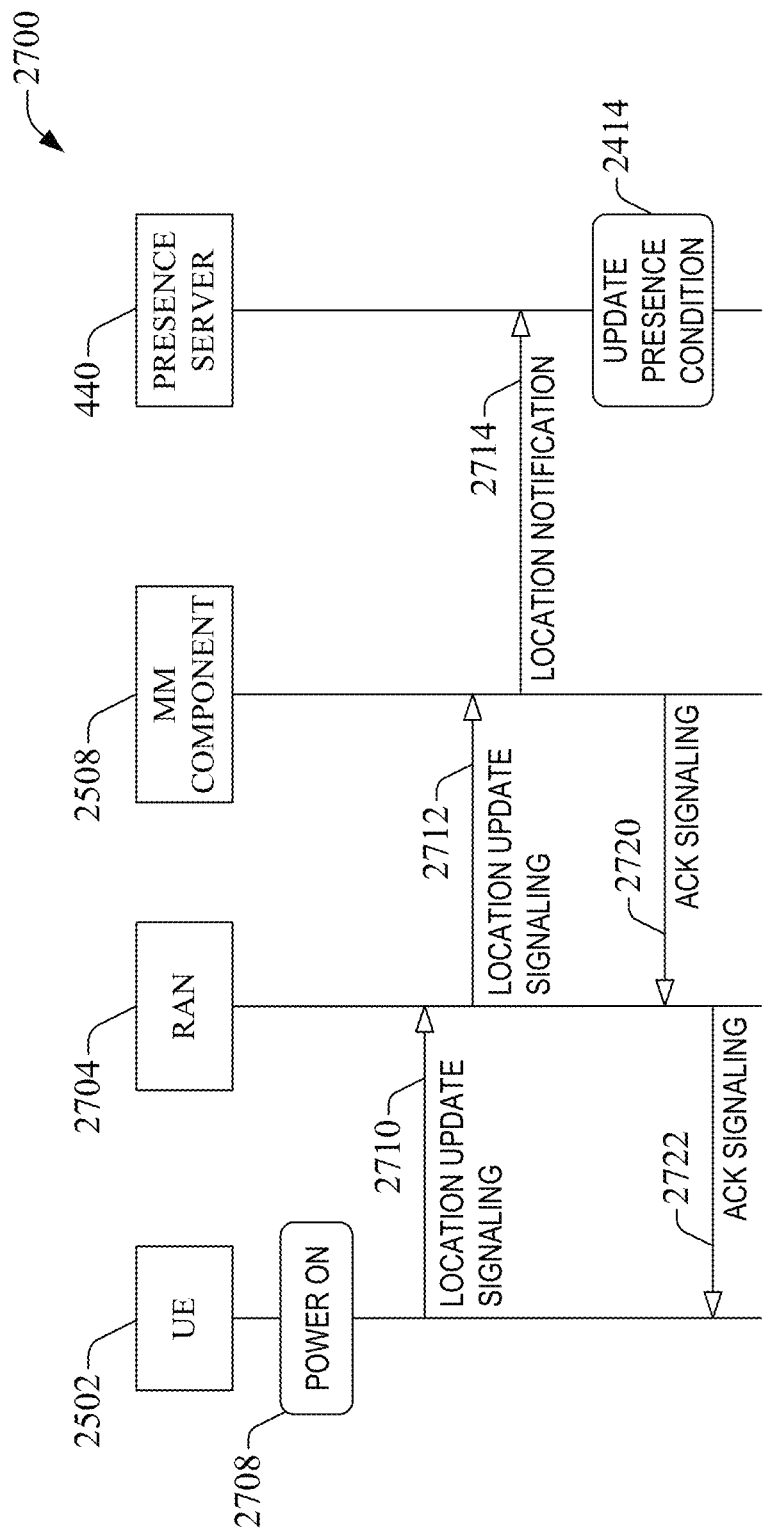
Figure 28:
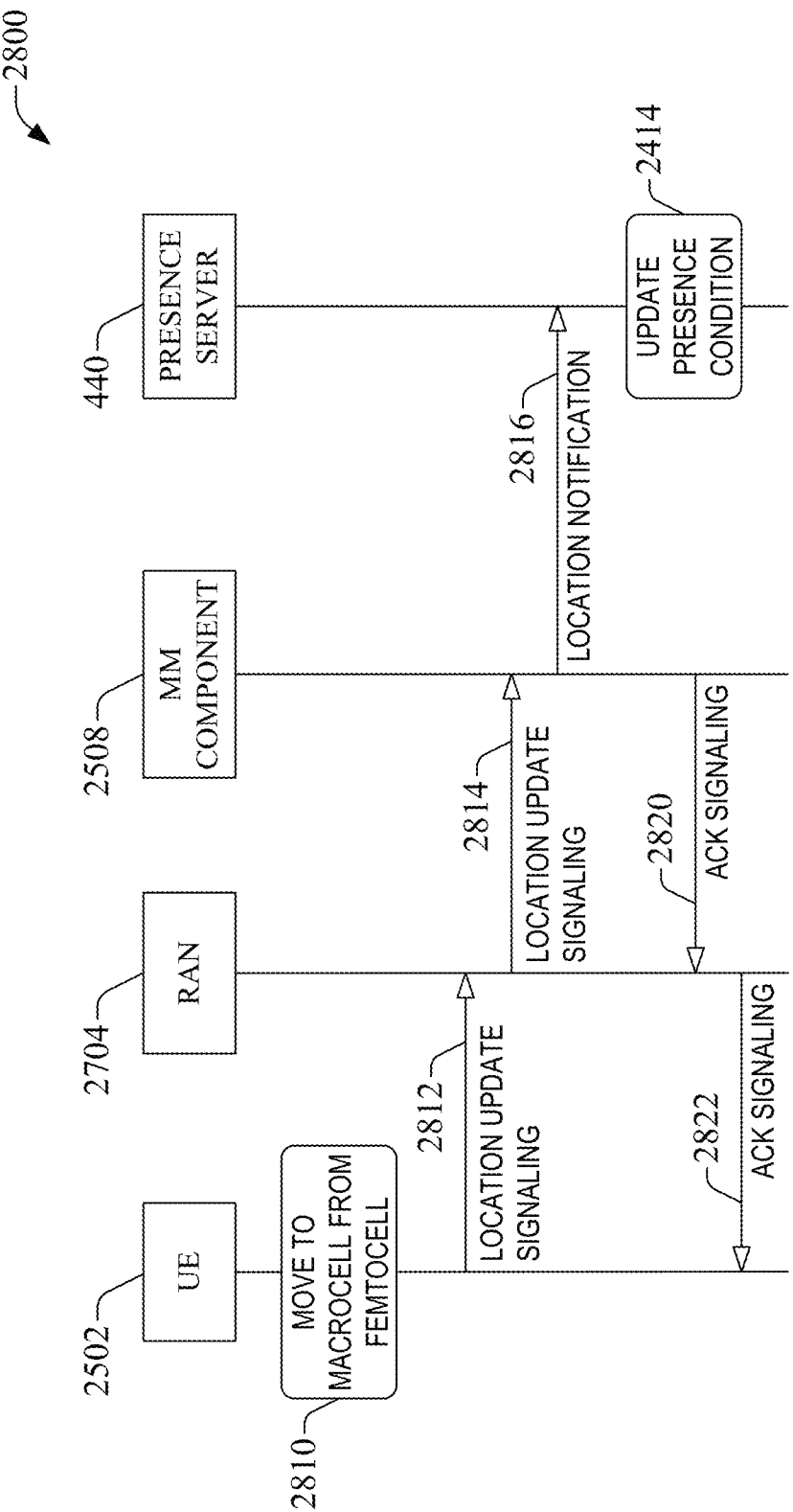

FIG. 24 is a call flow, or interaction diagram, of a method 2400 for generating presence intelligence according with aspects described herein. In the subject example method UE (e.g., 1600) exchanges information, such as signaling and related payload data, with a presence server (e.g., 440) based on a mobility event; the presence server can be a core network component, as described supra, that manages (e.g., creates, modifies) subscriber femtocell presence intelligence. In addition, in an aspect, the information exchanged amongst the UE and the presence server can be based, in part, on one or more packet based (e.g., IP based) peer-to-peer signaling mechanism or protocol.

At act 2406, user equipment 2402 attaches to a femtocell access point and delivers, at act 2410, a notification of the attachment to presence server 440. As indicated supra, the notification can be delivered according to a proprietary data delivery protocol or one or more standardized data delivery protocol, such as XDMS, XCAP, HTTP, or the like. In an aspect, UE 2402 can deliver the notification via a presence client component or a processor that executes the presence client component and resides within the UE 2402. At act 2414, the presence server 440 updates a presence condition, which can be retained in a presence record (e.g., a logical flag, a database entry) stored in a memory (e.g., presence intelligence store 434) accessible to the presence server 440. After the update is completed (e.g., upon completion, substantially upon completion, or after a predetermined period subsequent to completion), presence server 440 delivers acknowledgement signaling 2418 to UE 2402.

At act 2422, the UE 2402 attaches to a macrocell base station and delivers, at act 2426, a notification of attachment to presence server 440. Attachment to the macrocell base station can arise as a result of UE 2402 moving outside the area of coverage afforded by the femtocell AP. In response, the presence server 540 updates the presence condition at act 2430. As described supra, after the update is completed (e.g., upon completion, substantially upon completion, or after a predetermined period subsequent to completion), presence server 440 delivers acknowledgement (ACK) signaling 2434 to UE 2402.

FIGS. 25-28 illustrate various call flows of example methods 3500-3800 for updating presence intelligence according to aspects of the subject disclosure. The subject example methods 3500-3800 are particular illustrations of example method 3400. Various components in one or more telecommunication network platforms (e.g., 108 or 109) exchange one or more messages as part of notification and acknowledgement discussed supra. Messages in example methods 3500-3800 can be delivered according to a proprietary data delivery protocol or one or more standardized data delivery protocol, such as XDMS, XCAP, HTTP, or the like.

Example method 2500 can be implemented in a scenario a mobile device attaches to, or registers in, a femtocell upon powering on. At act 2514, UE 2502 powers on within area of coverage of femtocell AP 2504, and delivers location update signaling thereto at act 2516. The location update signaling is specific to the radio technology utilized by the femtocell AP; e.g., in UMTS-based technology, attachment signaling can include location area update (LAU) or routing area update (RAU). Since UE 2502 powers on, the location update signaling can include an IMSI attach request; the updated location can be area information. Femtocell AP 2504 relays, at act 2518, the location update signaling to femtocell gateway (GTY) node 2506, which conveys, at act 2520, the location update signaling to mobility management (MM) component 2508. In turn, at act 2522, MM component 2508 delivers a location notification to presence server 440. It should be appreciated that MM component 3508 can be specific to the radio technology implemented for telecommunication through macro network platform; for instance, in 3GPP LTE networks, MM component 3508 can be embodied in a mobility management entity (MME), whereas in the 3GPP UMTS network, MM component 3508 can be embodied in a MSC. In an aspect, acts 2506 through 2512 embody notification act 3410; the location notification embodies notification of attachment delivered in act 3410. At act 3414, presence server 440 updates presence condition, or presence intelligence, for UE 2502 by creating or modifying values of a presence flag to "In Premises." While the subject example method 3500 is illustrated for a femtocell AP and related access network element(s), the subject example method 3500 can be advantageously exploited for other types of confined-coverage access points (Wi-Fi AP, picocell AP, etc.).

At act 2516, MM component 540 delivers ACK signaling to femtocell GTY node 2506, which relays, at act 2518, the ACK signaling to femtocell AP 2504. At act 2520, the femtocell AP 2504 conveys the ACK signaling to UE 2502. It is noted that the order of acts 2522 and 2526 can be reversed without affecting the functionality provided by the subject example method. In addition, in one or more additional or alternative embodiments, presence server 440 can receive the location notification from femtocell GTY 2506; in such embodiments, the presence server 440 can be embodied in one or more servers within a femtocell network platform (e.g., 109).

Example method 2600 can be implemented in a scenario a mobile device attaches to a femtocell AP as a result of a mobility event that leads the mobile device into the coverage area of the femtocell AP. At act 2610, UE 2502 moves from femtocell to macrocell and, at act 2612, delivers location update signaling to femtocell AP 2504, which relays, at act 2614, the location update signaling to femtocell gateway node 2506. As indicated supra, the location update signaling is specific to the radio technology utilized by the femtocell AP; e.g., in UMTS-based technology, attachment signaling can include location area update (LAU) or routing area update (RAU). Since UE 3502 moves into femtocell service coverage, the location update signaling can include LAU request. In turn, the femtocell GTY node 2506 delivers, at act 2616, the location update signaling to MM component 2508, which conveys, at act 2618, a location notification to presence server 440. In an aspect, acts 3506 through 2512 embody notification act 2410; the location notification embodies notification of attachment delivered in act 2410. In response to receiving (e.g., collecting and processing) the location notification, at act 3414, presence server 440 updates presence condition, or presence intelligence, for UE 3502 by creating or modifying a value of a presence flag to reflect "In Premises." In a scenario extrinsic forwarding service is enabled, "In Premises" value can be composite, including a field attribute that identifies femtocell AP 3504 as a "home" femto AP or a "3P" femto AP. Similarly to example method 3500, while the subject example method 3600 is illustrated for a femtocell AP and related access network element(s), example method 3600 can be advantageously exploited for other types of confined-coverage access points (Wi-Fi AP, picocell AP, etc.)

In response to receiving (e.g., collecting and processing) the location update signaling, MM component 2508 delivers, at act 2622, ACK signaling to femtocell GTY node 2506, which transmits, at act 2624, the ACK signaling to femtocell AP 2504. In turn, femtocell AP 2504 delivers, at act 2626, the ACK signaling to UE 2502. In an aspect, acts 2526 through 2530 embody acknowledgement act 2418.

As discussed supra, it is noted that the order of acts 2618 and 2622 can be reversed without affecting the functionality provided by the subject example method. In addition, in one or more additional or alternative embodiments, presence server 440 can receive the location notification from femtocell GTY 3506; in such embodiments, the presence server 440 can be embodied in one or more servers within a femtocell network platform (e.g., 109).

Example method 2700 can be implemented in a scenario a mobile device powers on in an area of coverage of a macrocell base station and attaches thereto. At act 2708, UE 2702 powers on within area of coverage of a macrocell base station that is part of RAN 2704, and delivers location update signaling thereto at act 3516. The signaling is specific to the radio technology utilized by the femtocell AP; e.g., in UMTS-based technology, attachment signaling can include location area update (LAU) or routing area update (RAU). Since UE 3502 powers on, the location update signaling can include an IMSI attach request; the updated location can be area information. At act 2712, one or more components of the RAN 2704, e.g., the macrocell base station, deliver the location update signaling to MM component 2506. In turn, at act 2714, MM component 2508 delivers a location notification to presence server 540. In an aspect, acts 2710-2714 embody notification act 2410; the location notification embodies notification of attachment delivered in act 2410. In response to receiving (e.g., collecting and processing) the location notification, at act 2414, presence server 440 updates presence condition, or presence intelligence.

At act 2720, MM component 2508 delivers ACK signaling to one or more components of RAN 2704, e.g., the macrocell base station, which relay the ACK signaling to UE 2702 at act 2722. In an aspect, acts 2720 and 2722 embody acknowledgement act 2418. As discussed supra, the order of acts 2714 and 2720 can be reversed without affecting the functionality provided by the subject example method.

Example method 2800 for updating presence intelligence according to aspects of the subject innovation can be implemented in a scenario in which a mobile device attaches to a macrocell base station as a result of a mobility event that leads the mobile device into the coverage area of the macrocell base station. At act 2810, UE 2502 moves to macrocell from femtocell and, at act 2812, delivers location update signaling to one or more component of RAN 2704, e.g., the macrocell base station, which relays, at act 2814, the location update signaling to MM component 2508. The signaling is specific to the radio technology utilized by the femtocell AP; e.g., in UMTS-based technology, attachment signaling can include location area update (LAU) or routing area update (RAU). In turn, MM component 2508 conveys, at act 2816, a location notification to presence server 440. In an aspect, acts 2812 through 2816 embody notification act 2410; the location notification embodies notification of attachment delivered in act 2410. In response to receiving (e.g., collecting and processing) the location notification, at act 3414, presence server 440 updates presence condition, or presence intelligence, for UE 2502.

In response to receiving (e.g., collecting and processing) the location update signaling, MM component 2508 delivers, at act 2820, ACK signaling to one or more components of RAN 2704, e.g., the base station, which transmits, at act 2822, the ACK signaling to the UE 2502. In an aspect, acts 2820 and 2822 embody acknowledgement act 2418. As discussed supra, it is noted that the order of acts 2816 and 2820 can be reversed without affecting the functionality provided by the subject example method.

Figure 29:
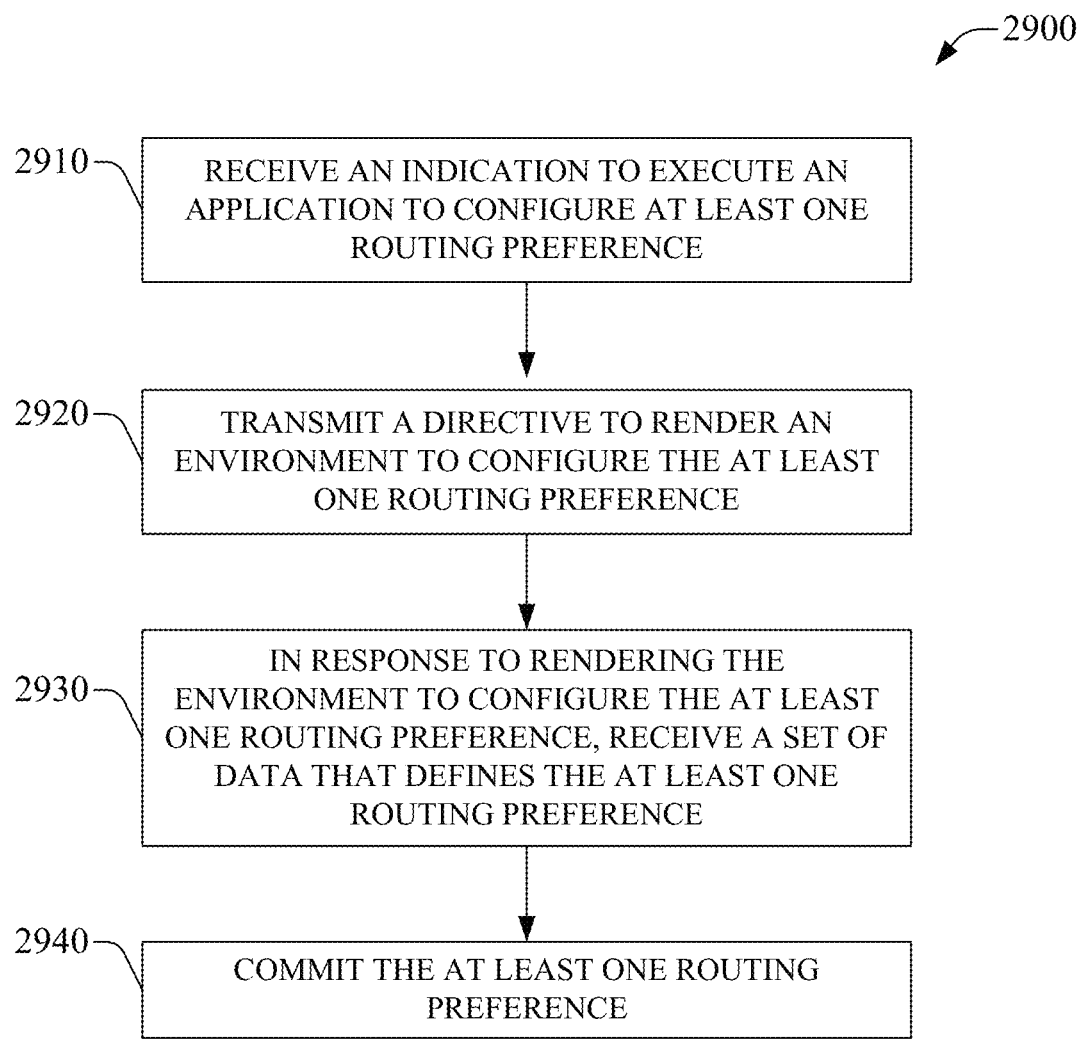
FIG. 29 is a flowchart of an example method for configuring a set of routing preferences according to aspects described herein.

FIG. 29 is a flowchart of an example method 2900 for configuring a set of routing preferences according to aspects described herein. In an aspect, a server (e.g., customization server 460) or one or more component(s) therein can implement, at least in part, the subject example method. In another aspect, one or more processors configured to enable or that enable at least part of the functionality to the server (e.g., customization server 460) also can enact, at least in part, the subject example method. In yet another aspect, in scenarios in which the server or the one or more component(s) therein are embodied in one or more sets of code instructions stored in a memory, at least one processor that executes the one or more sets of code instructions that embody the server or the one or more component(s) therein can enact the subject example method.

At act 2910, an indication to configure at least one routing preference is received. Receiving the indication can include receiving an instruction to execute an application, e.g., a software application or a firmware application. At act 2920, a directive to render an environment to configure the at least one routing preference is transmitted as a result, in part, of executing the application. At act 2930, a set of input data that defines the at least one routing preference is received. At act 2940, the at least one routing preference is committed. In an aspect, committing the at least one routing preference includes storing the at least one routing preference in one or more memories (removable or affixed) accessible by component(s) or processor(s) that enact the subject example method or other methods described herein. For instance, the at least one routing preference can be retained in routing preference storage 458 within memory 450.

Figure 30:
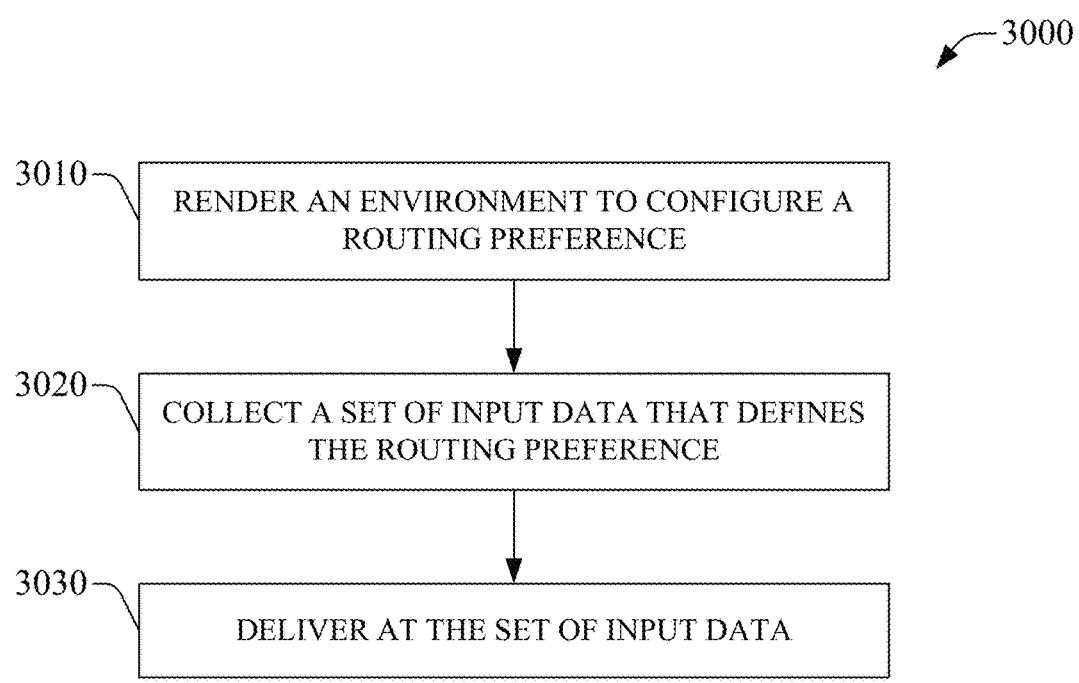
FIG. 30 is a flowchart of an example method for collecting information to configure routing preference(s) or one or more screening criteria according to aspects described herein.

FIG. 30 is a flowchart of an example method 3000 for collecting information to configure routing preference(s) or one or more screening criteria according to aspects described herein. In an aspect, a mobile device (e.g., UE 1602), or one or more components therein, can implement, at least in part, the subject example method. In another aspect, customer premise equipment, such as a personal computer or a femtocell AP, or one or more components therein, can implement, at least in part, the subject example method. In yet another aspect, a network-based component, such as customization server or configuration component, also can effect the subject example method. In still another aspect, one or more processors that enable, at least in part, functionality of the mobile device, the customer premise equipment, or the customization server, also can implement the subject example method.

At act 3010, at least one of a first environment to configure a routing preference or a second environment to configure a screening criterion is rendered; it should be appreciated that in one or more scenarios, both the first and second environments can be rendered concurrently. At act 3020, at least one of a first set of input data that defines the routing preference or a second set of input data that defines the screening criterion is collected. At act 3030, at least one of the first set of input data or the second set of input data is delivered.

As it is employed in the subject disclosure, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification and annexed drawings, terms such as "store," "data store," "data storage," "database," "repository," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory elements described herein can be affixed, removable, or a combination thereof.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. In addition, various aspects disclosed in the subject specification can also be implemented through code instructions, or program modules, stored in a memory and executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disc (CD), digital versatile disc (DVD), blu-ray disc (BD) . . . ), smart cards, and flash memory devices (e.g., card, stick, key drive . . . ).

It should be appreciated that while various aspects, features, or advantages described herein have been illustrated through femtocell access point(s) and associated coverage, such aspects or features also can be exploited in confined-coverage access point(s) that provide wireless coverage through substantially any or any disparate telecommunication technologies, such as for example Wi-Fi (wireless fidelity) or picocell telecommunication. Moreover, aspects, features, or advantages of the subject disclosure can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Furthermore, substantially all aspects of the subject disclosure can include legacy telecommunication technologies.

What has been described above includes examples of systems and methods that provide advantages of the subject disclosure. It is, of course, not possible to describe every conceivable combination of components or methodologies for purposes of describing the subject disclosure, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   receiving, by a system comprising a processor, an incoming call associated with a called device;
   in response to the receiving and in response to a determination that the called device is a mobile device, analyzing, by the system, a routing preference associated with the called device, wherein the routing preference comprises personalized data representative of a preference to route the incoming call based on a first condition associated with a presence of an access point device;
   receiving, by the system, a second condition associated with the presence of the access point device, wherein the second condition comprises proximity data related to a capability of a candidate destination device to connect to the access point device, wherein the capability is based on a coverage range of the access point device and a confined coverage range of the access point device, and wherein the candidate destination device is located between the coverage range and the confined coverage range of the access point device;
   in response to determining that the first condition has been determined to have been satisfied, selecting, by the system, the candidate destination device of candidate destination devices;
   based on the second condition associated with the capability of the candidate destination device being determined to have been satisfied, routing, by the system, the incoming call to the candidate destination device;
   in response to the mobile device being determined to have moved outside of the coverage range of the access point device and attaching to a base station device, updating, by the system, the second condition associated with the presence of the access point device, resulting in an update; and
   based on a third condition associated with a predetermined period of time subsequent to the updating being determined to have been satisfied, facilitating, by the system, sending acknowledgement data representative of the update to the mobile device.

2. The method of claim 1, wherein the first condition is related to a distance between the candidate destination device and the access point device.

3. The method of claim 2, wherein the determination is a first determination, further comprising:
   in response to a second determination, different than the first determination, that the called device has been registered with the access point device, routing, by the system, the incoming call to the candidate destination device.

4. The method of claim 2, wherein the candidate destination device is a first candidate destination device, and wherein the determination is a first determination, and further comprising:
   in response to a second determination, different than the first determination, that the called device is not registered with the access point device, identifying, by the system, a second candidate destination device of the candidate destination devices.

5. The method of claim 2, wherein the determination is a first determination, and further comprising:
   in response to a second determination, different than the first determination, that the called device is not registered with the access point device, performing, by the system, an exception handling for the routing of the incoming call.

6. The method of claim 5, wherein the performing the exception handling comprises sending message data related to a deactivation of service to the called device.

7. The method of claim 5, wherein the performing the exception handling comprises sending voice data representative of a voice recording related to a deactivation of service to the called device.

8. The method of claim 1, wherein the candidate destination devices comprise the called device.

9. A system, comprising:
   a processor; and
   a memory that stores executable instructions that, when executed by the processor, facilitate performance of operations, comprising:
   receiving routing preference data related to a routing preference of a mobile device, wherein the routing preference defines a candidate group of destination devices associated with the mobile device, wherein the routing preference comprises route data representing a preferred route associated with an incoming call to a called device of the candidate group of destination devices, and wherein the called device is the mobile device;
   receiving first presence condition data related to a first presence condition associated with the mobile device, wherein the first presence condition data indicates whether the mobile device is in a defined range of an access point device;
   receiving second presence condition data associated with a second presence condition of the access point device, wherein the second presence condition comprises proximity data related to a proximity of a candidate device, of the candidate group of destination devices, to the access point device, wherein the proximity is based on a coverage range of the access point device and a confined coverage range of the access point device, and wherein the candidate device is located between the coverage range and the confined coverage range of the access point device;
receiving the incoming call that is determined to be directed to the called device of the candidate group of destination devices;
based on the routing preference data and the second presence condition data, selecting the candidate device, from the candidate group of destination devices associated with the mobile device, as a destination device;
directing the incoming call to the destination device;
in response to the mobile device transitioning outside of the coverage range of the access point device and attaching to a base station device, updating the second presence condition of the access point device, resulting in an update; and
based on a third presence condition associated with a predetermined period of time subsequent to the updating being determined to have been satisfied, sending acknowledgement data representative of the update to the mobile device.

10. The system of claim 9, wherein the operations further comprise:
determining that the candidate device is a wireless device.

11. The system of claim 10, wherein the candidate group of destination devices is a first candidate group of destination devices, and wherein the operations further comprise:
based on the determining that the called device is the mobile device, identifying a second candidate group of destination devices associated with the mobile device.

12. The system of claim 9, wherein the operations further comprise:
in response to the mobile device being determined to be between the coverage range and the confined coverage range of the access point device, updating a presence condition record associated with the access point device.

13. The system of claim 9, wherein the operations further comprise:
in response to the mobile device being determined not to be between the coverage range and the confined coverage range of the access point device, updating a presence condition record associated with the access point device.

14. The system of claim 13, wherein the updating the presence condition record comprises updated presence flag data associated with the presence condition record.

15. The system of claim 9, wherein the operations further comprise:
in addition to the directing the incoming call to the destination device, directing the incoming call to the mobile device.

16. The system of claim 9, wherein the operations further comprise:
configuring the routing preference based on input received via a display screen interface of a display screen.

17. A non-transitory machine-readable storage medium, comprising executable instructions that, when executed by a processor, facilitate performance of operations, comprising:
receiving an incoming call that is determined to have been directed to a first device, wherein the first device is a mobile device;
receiving routing preference data associated with a routing preference of the first device wherein the routing preference comprises personalized data representative of a preference to route the incoming call based on an access point device presence condition associated with an access point device, candidate destination devices, and the mobile device,
receiving access point data related to the access point device presence condition, wherein the access point data indicates whether the mobile device is in communication with the access point device, and wherein the access point data indicates that a candidate destination device, of the candidate destination devices, is between a coverage range of the access point device and a confined coverage range of the access point device;
based on the routing preference data, and the access point data, identifying the candidate destination device;
in response to identifying the candidate destination device, routing the incoming call to the candidate destination device;
in response to determining the mobile device has moved outside of the coverage range of the access point device and has attached to a base station device, updating the access point device presence condition, resulting in an updated access point device presence condition; and
based on a time condition associated with a predetermined period of time subsequent to the updating the access point device presence condition being determined to have been satisfied, transmitting acknowledgement data representative of the updated access point device presence condition to the mobile device.

18. The non-transitory machine-readable storage medium of claim 17, wherein the operations further comprise:
determining that the candidate destination device is a wireless device.

19. The non-transitory machine-readable storage medium of claim 18, wherein the operations further comprise:
in response to receiving an indication that the mobile device is no longer in communication with the access point device, implementing exception handling for the routing of the incoming call to the candidate destination device.

20. The non-transitory machine-readable storage medium of claim 19, wherein the incoming call is a first incoming call, wherein the candidate destination device is a first candidate destination device, and wherein the operations further comprise:
in response to the implementing exception handling, directing a second incoming call, different than the first incoming call, to a second candidate destination device different from the first candidate destination device.

* * * * *